United States Patent
Kurata et al.

(10) Patent No.: US 7,921,281 B2
(45) Date of Patent: Apr. 5, 2011

(54) PROCESSOR AND PROGRAM EXECUTION METHOD CAPABLE OF EFFICIENT PROGRAM EXECUTION

(75) Inventors: Kazushi Kurata, Takatsuki (JP);
Tetsuya Tanaka, Souraku-gun (JP);
Nobuo Higaki, Kobe (JP); Kunihiko Hayashi, Takatsuki (JP); Hiroshi Kadota, Toyonaka (JP); Tokuzo Kiyohara, Osaka (JP); Kozo Kimura, Toyonaka (JP); Hideshi Nishida, Nishinomiya (JP); Kazuya Furukawa, Ibaraki (JP); Shigeki Fujii, Neyagawa (JP); Toshio Sugimura, Takarazuka (JP)

(73) Assignee: Panasonic Corporation, Osaka (JP)

( * ) Notice: Subject to any disclaimer, the term of this patent is extended or adjusted under 35 U.S.C. 154(b) by 182 days.

(21) Appl. No.: 12/110,513

(22) Filed: Apr. 28, 2008

(65) Prior Publication Data
US 2008/0209192 A1 Aug. 28, 2008

Related U.S. Application Data

(62) Division of application No. 10/338,408, filed on Jan. 8, 2003, now Pat. No. 7,386,707.

(30) Foreign Application Priority Data

Jan. 9, 2002 (JP) ................................. 2002-002816
Jan. 7, 2003 (JP) ................................. 2003-001616

(51) Int. Cl.
*G06F 9/48* (2006.01)
*G06F 9/52* (2006.01)
(52) U.S. Cl. ....................................... 712/228; 712/244
(58) Field of Classification Search .................. 712/227, 712/228, 244
See application file for complete search history.

(56) References Cited

U.S. PATENT DOCUMENTS 5,021,993 A 6/1991 Matoba et al.
(Continued)

FOREIGN PATENT DOCUMENTS

JP 55-115155 9/1980
(Continued)

OTHER PUBLICATIONS

Notification of Reasons for Refusal mailed on Nov. 2, 2004 for Japanese Patent Application No. 2003-001616 by the JPO, verified English translation.

(Continued)

*Primary Examiner* — Daniel Pan
(74) *Attorney, Agent, or Firm* — Panasonic Patent Center; Dhiren Odedra; Kerry Culpepper

(57) ABSTRACT

A processor for sequentially executing a plurality of programs using a plurality of register value groups stored in a memory that correspond one-to-one with the programs. The processor includes a plurality of register groups; a select/switch unit operable to select one of the plurality of register groups as an execution target register group on which a program execution is based, and to switch the selection target every time a first predetermined period elapses; a restoring unit operable to restore, every time the switching is performed, one of the register value groups into one of the register groups that is not selected as the execution target register group; a saving unit operable to save, prior to the restoring, register values in the register group targeted for restoring, by overwriting a register value group in the memory that corresponds to the register values; and a program execution unit operable to execute, every time the switching is performed, a program corresponding to a register value group in the execution target register group.

14 Claims, 34 Drawing Sheets

U.S. PATENT DOCUMENTS

| | | | |
|---|---|---|---|
| 5,109,512 A | | 4/1992 | Bahr et al. |
| 5,339,437 A | * | 8/1994 | Yuen .................. 710/261 |
| 5,349,680 A | | 9/1994 | Fukuoka |
| 5,452,452 A | | 9/1995 | Gaetner et al. |
| 5,524,247 A | | 6/1996 | Mizuno |
| 5,628,013 A | | 5/1997 | Anderson et al. |
| 5,729,766 A | * | 3/1998 | Cohen .................. 710/58 |
| 5,774,718 A | | 6/1998 | Aoshima et al. |
| 5,812,844 A | | 9/1998 | Jones et al. |
| 5,872,950 A | | 2/1999 | Levitan et al. |
| 5,949,996 A | * | 9/1999 | Atsushi ................ 712/244 |
| 5,991,873 A | | 11/1999 | Seto et al. |
| 6,006,293 A | * | 12/1999 | Thomas ................ 710/45 |
| 6,052,707 A | | 4/2000 | D'Souza |
| 6,105,048 A | | 8/2000 | He |
| 6,216,220 B1 | | 4/2001 | Hwang |
| 6,223,208 B1 | | 4/2001 | Kiefer et al. |
| 6,310,921 B1 | | 10/2001 | Yoshioka et al. |
| 6,408,325 B1 | * | 6/2002 | Shaylor ................ 718/108 |
| 6,430,594 B1 | | 8/2002 | Akiyama et al. |
| 6,470,376 B1 | | 10/2002 | Tanaka et al. |
| 6,496,848 B1 | | 12/2002 | Nankaku |
| 6,684,342 B1 | | 1/2004 | Kelsey et al. |
| 6,757,897 B1 | | 6/2004 | Shi et al. |
| 6,865,636 B1 | | 3/2005 | Hober et al. |
| 7,010,612 B1 | | 3/2006 | Si et al. |
| 7,028,300 B2 | | 4/2006 | Goldick |
| 7,039,012 B2 | | 5/2006 | Nakano et al. |
| 7,047,396 B1 | | 5/2006 | Fotland |
| 7,082,519 B2 | | 7/2006 | Kelsey et al. |
| 7,120,783 B2 | | 10/2006 | Fotland et al. |
| 7,207,045 B2 | | 4/2007 | Goiffon |
| 7,308,686 B1 | | 12/2007 | Fotland et al. |
| 7,386,707 B2 | * | 6/2008 | Kurata et al. .......... 712/218 |
| 7,546,442 B1 | | 6/2009 | Fotland et al. |
| 7,577,823 B2 | | 8/2009 | Hoogerbrugge |
| 2002/0002667 A1 | | 1/2002 | Kelsey et al. |
| 2002/0038416 A1 | | 3/2002 | Fotland et al. |
| 2002/0073129 A1 | | 6/2002 | Wang et al. |
| 2002/0174164 A1 | | 11/2002 | Hayashi |
| 2003/0037091 A1 | | 2/2003 | Nishimura et al. |
| 2003/0037228 A1 | | 2/2003 | Kelsey et al. |
| 2003/0093457 A1 | | 5/2003 | Goldick |
| 2004/0064817 A1 | | 4/2004 | Shibayama et al. |
| 2006/0069738 A1 | | 3/2006 | Hoogerbrugge |

FOREIGN PATENT DOCUMENTS

| | | |
|---|---|---|
| JP | 61-150039 | 7/1986 |
| JP | 62-266625 | 11/1987 |
| JP | 4-101233 | 4/1992 |
| JP | 5-46413 | 2/1993 |
| JP | 5-127926 | 5/1993 |
| JP | 5-204675 | 8/1993 |
| JP | 06-067905 | 3/1994 |
| JP | 6-149599 | 5/1994 |
| JP | 07-044401 | 2/1995 |
| JP | 7-210400 | 8/1995 |
| JP | 7-295694 | 11/1995 |
| JP | 08-190491 | 7/1996 |
| JP | 8-235004 | 9/1996 |
| JP | 09-16409 | 1/1997 |
| JP | 09-128248 | 5/1997 |
| JP | 9-282182 | 10/1997 |
| JP | 10-143376 | 5/1998 |
| JP | 10-171667 | 6/1998 |
| JP | 10-207717 | 8/1998 |
| JP | 10-307731 | 11/1998 |
| JP | 10-341422 | 12/1998 |
| JP | 2000-20323 | 1/2000 |
| JP | 2000-066904 | 3/2000 |
| JP | 2001-202258 | 7/2001 |
| JP | 2003-18209 | 1/2003 |
| JP | 2003-271399 | 9/2003 |
| WO | 00/79389 | 12/2000 |
| WO | 01/38968 | 5/2001 |
| WO | WO 01/46827 | 6/2001 |

OTHER PUBLICATIONS

Notification of Reasons for Refusal mailed on Aug. 2, 2005 for Japanese Patent Application No. 2003-001616 by the JPO, verified English translation.

Notification of Reasons for Refusal mailed on Jan. 24, 2006 for Japanese Patent Application No. 2003-001616 by the JPO, verified English translation.

Notification of Reasons for Refusal mailed on Oct. 2, 2007 for Japanese Patent Application No. 2005-287949 by the JPO, verified English translation.

Notification of Reasons for Refusal mailed on Oct. 2, 2007 for Japanese Patent Application No. 2005-287950 by the JPO, verified English translation.

Notification of Reasons for Refusal mailed on Oct. 9, 2007 for Japanese Patent Application No. 2003-068831 by the JPO, English translation.

Guangzuo Cui et al.; "Parallel Replacement Mechanism for MultiThread." *Advances in Parallel and Distributed Computing*, 1997, pp. 338-344.

Notice of Allowance issued on Jan. 26, 2010 in U.S. Appl. No. 10/796,213.

Notice of Allowance issued on Sep. 11, 2009 in U.S. Appl. No. 10/796,213.

Office Action dated Jan. 16, 2008 issued in U.S. Appl. No. 10/796,213.

Office Action dated Feb. 3, 2009 issued in U.S. Appl. No. 10/796,213.

Office Action dated May 7, 2009 issued in U.S. Appl. No. 10/796,213.

Office Action dated Aug. 27, 2010 issued in U.S. Appl. No. 12/504,175.

Notice of Allowance dated Nov. 24, 2010 issued in U.S. Appl. No. 12/110,491.

Office Action dated Mar. 30, 2010 issued in U.S. Appl. No. 12/110,491.

Office Action dated Mar. 30, 2010 issued in U.S. Appl. No. 12/110,539.

* cited by examiner

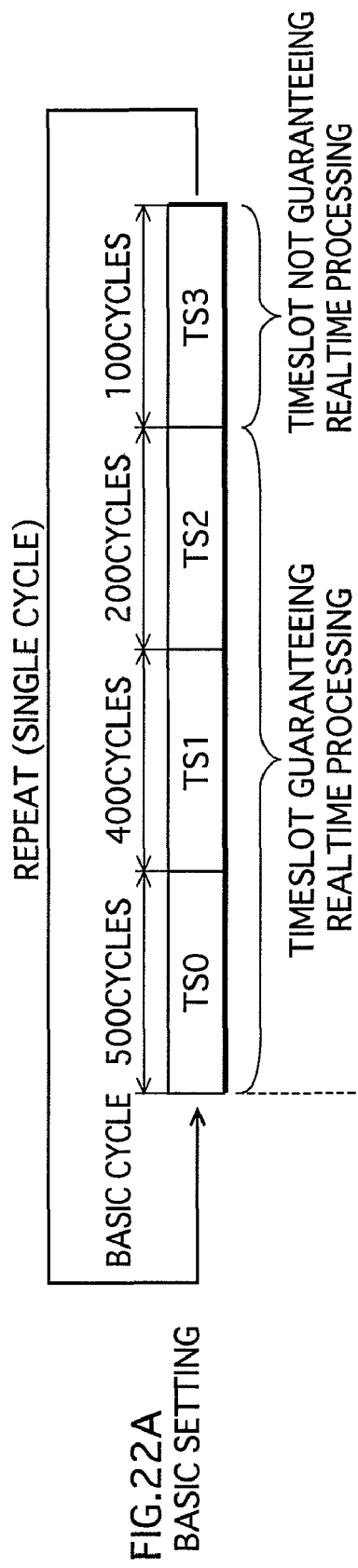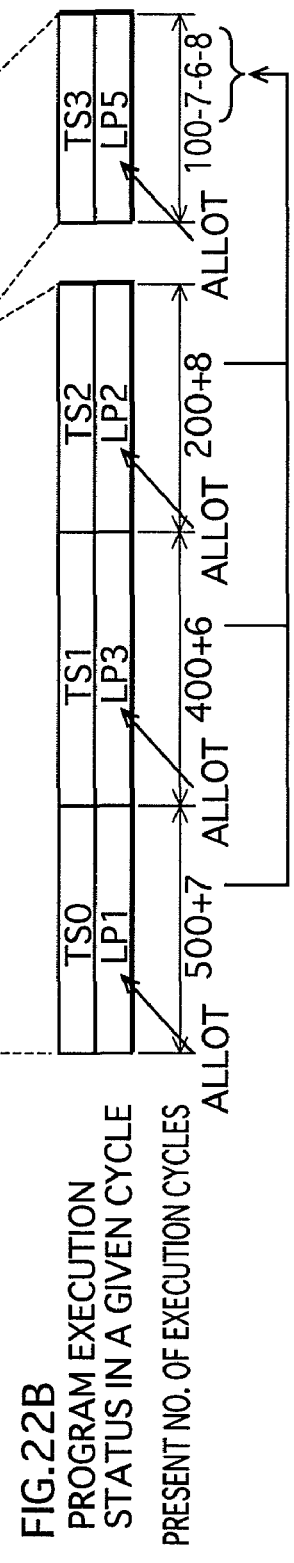
FIG.22A BASIC SETTING
FIG.22B PROGRAM EXECUTION STATUS IN A GIVEN CYCLE

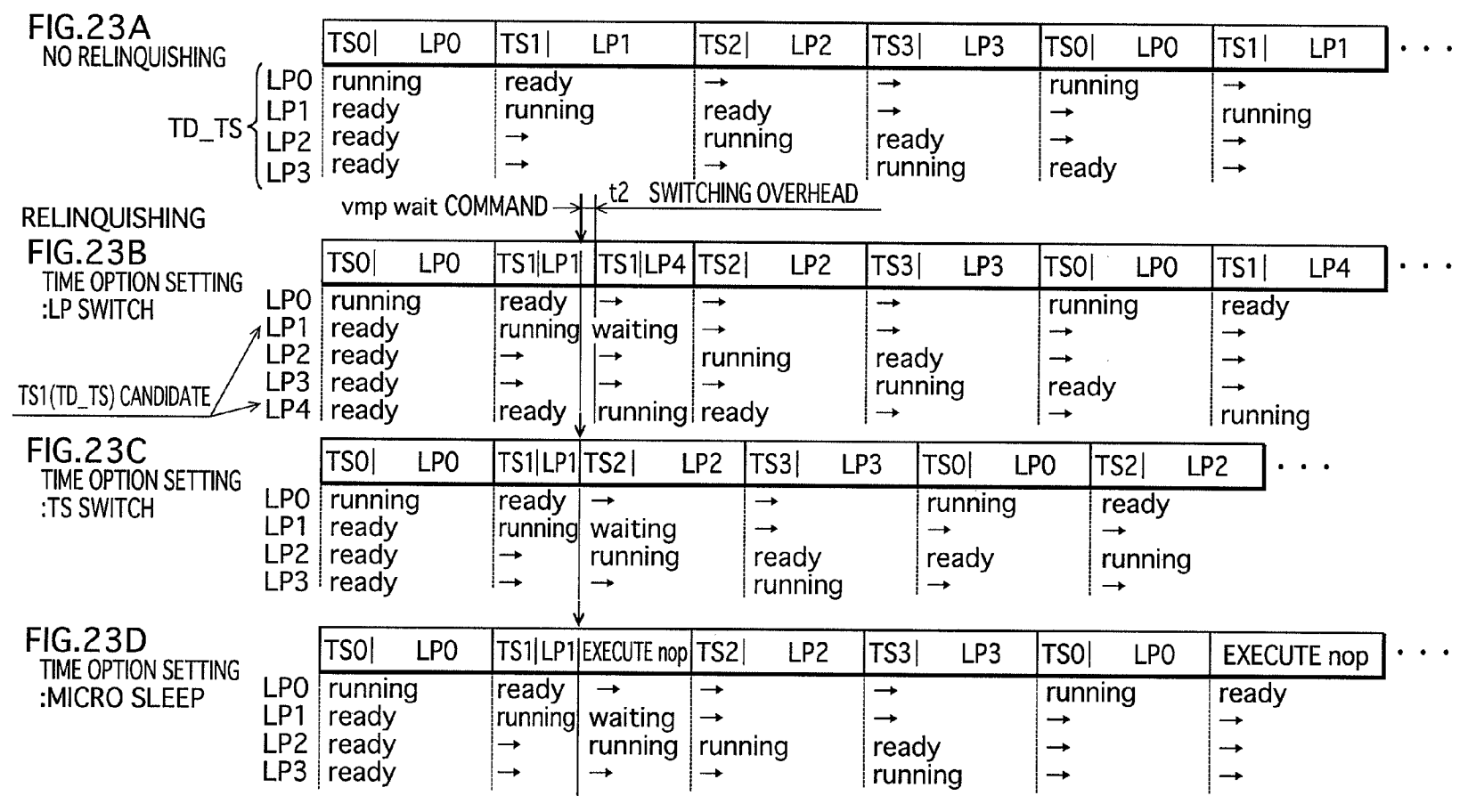

FIG. 23A
NO RELINQUISHING

FIG. 23B
RELINQUISHING
TIME OPTION SETTING
:LP SWITCH

FIG. 23C
TIME OPTION SETTING
:TS SWITCH

FIG. 23D
TIME OPTION SETTING
:MICRO SLEEP

FIG.24A
READY LP IN EACH TD_TS

| | TS0| | LP0 | TS1| | LP1 | TS2| | LP2 | TS3| | LP3 | TS0| | LP0 | TS1| | LP1 |
|---|---|---|---|---|---|---|---|---|---|---|---|---|---|---|---|---|
| TD_TS { (TS0)LP0 | running | | | ready | | | ↑ | | | ↑ | | | running | | | ready |
| (TS1)LP1 | ready | | | running | | | ready | | | ready | | | ↑ | | | running |
| (TS2)LP2 | ready | | | ↑ | | | running | | | running | | | ↑ | | | ↑ |
| (TS3)LP3 | ready | | | ↑ | | | ↑ | | | | | | | | | |

NO READY LP IN TS1

FIG.24B
IDLE OPTION SETTING : SWITCH

PRIORITY LEVEL: HIGH ↔ LOW

| | TS0| | LP0 | TS2| | LP2 | TS3| | LP3 | TS0| | LP0 | TS2| | LP2 |
|---|---|---|---|---|---|---|---|---|---|---|---|---|---|---|---|
| (TS0)LP0 | running | | | ↑ | | | ↑ | | | running | | | ↑ |
| (TS1)LP1 | waiting | | | running | | | ↑ | | | ↑ | | | ready |
| (TS2)LP2 | ready | | | ready | | | ready | | | ↑ | | | running |
| (TS1)LP4 | waiting | | | ↑ | | | ↑ | | | ↑ | | | ↑ |
| (TS1)LP5 | waiting | | | ↑ | | | ↑ | | | ↑ | | | ↑ |
| (TS1)LP6 | waiting | | | ↑ | | | ↑ | | | ↑ | | | ↑ |
| (TS3)LP3 | ready | | | ↑ | | | running | | | ready | | | ↑ |

FIG.24C
IDLE OPTION SETTING : MICRO SLEEP

| | TS0| | LP0 | EXECUTE nop | TS2| | LP2 | TS3| | LP3 | TS0| | LP0 | EXECUTE nop |
|---|---|---|---|---|---|---|---|---|---|---|---|---|
| (TS0)LP0 | running | ready | ↑ | ↑ | running | ready |
| (TS1)LP1 | waiting | ↑ | ↑ | ↑ | ↑ | ↑ |
| (TS2)LP2 | ready | ↑ | running | ↑ | ↑ | ↑ |
| (TS1)LP4 | waiting | ↑ | ↑ | ready | ↑ | ↑ |
| (TS1)LP5 | waiting | ↑ | ↑ | ↑ | ↑ | ↑ |
| (TS1)LP6 | waiting | ↑ | ↑ | running | ↑ | ↑ |
| (TS3)LP3 | ready | ↑ | ↑ | ↑ | ready | ↑ |

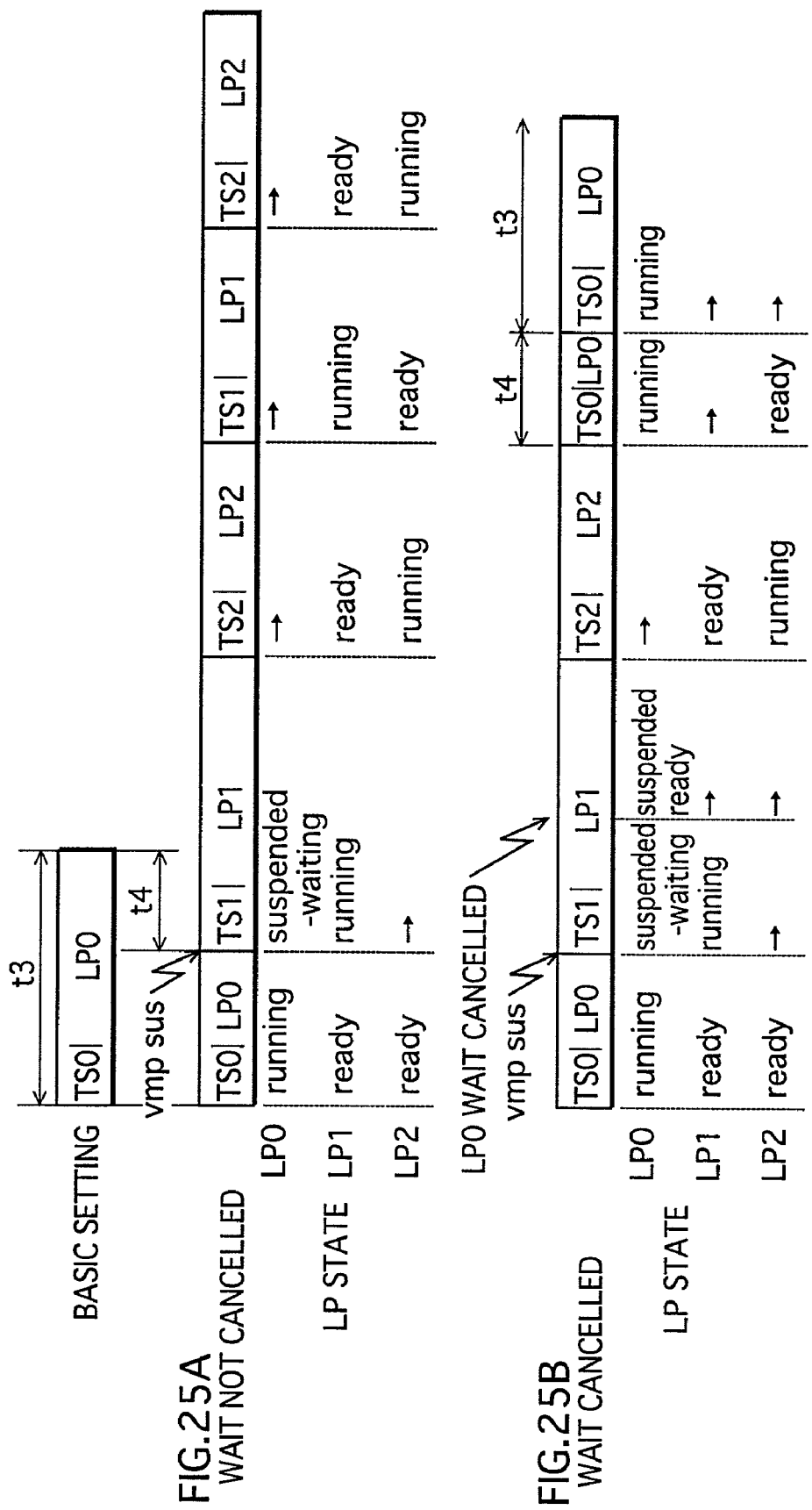

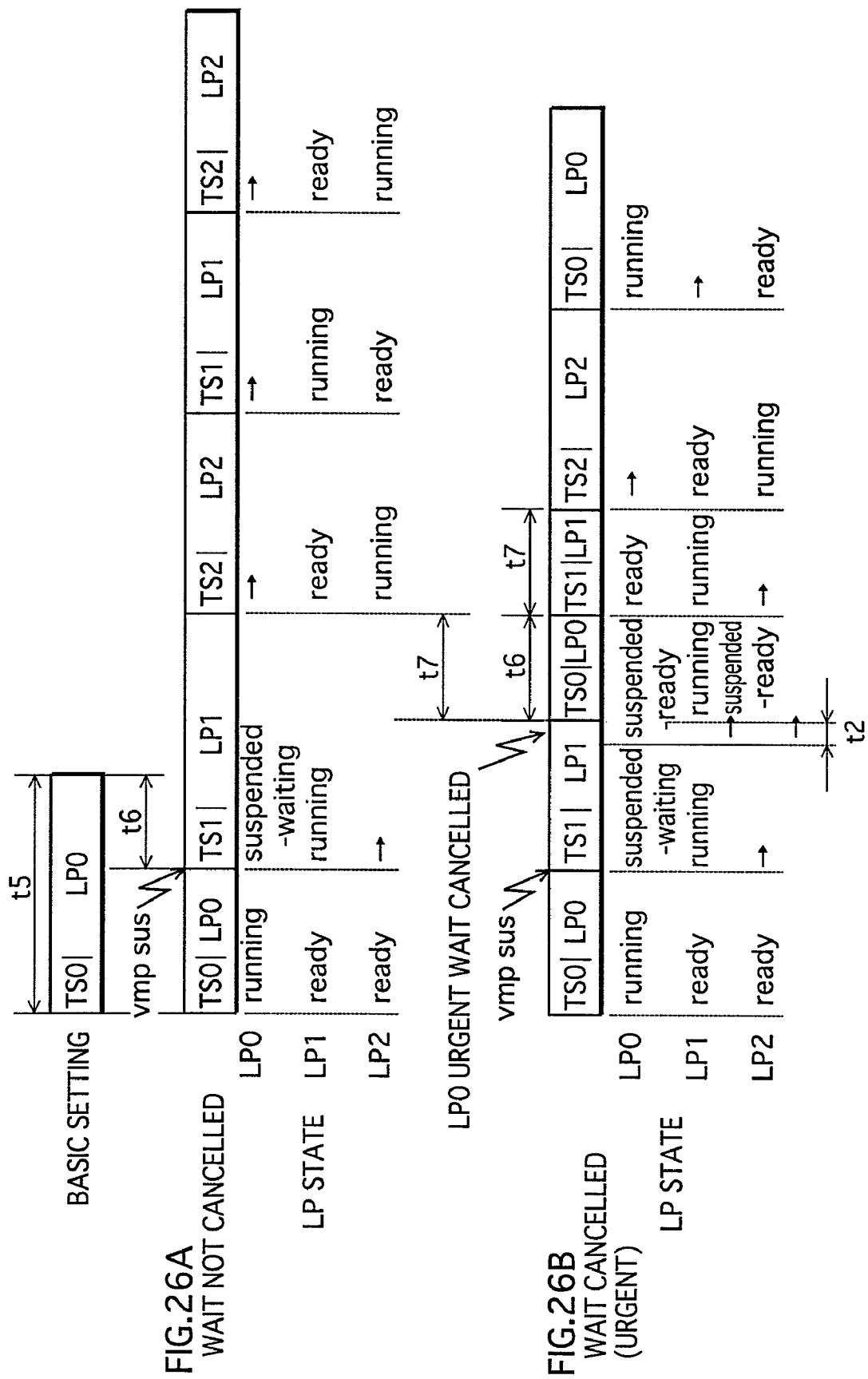

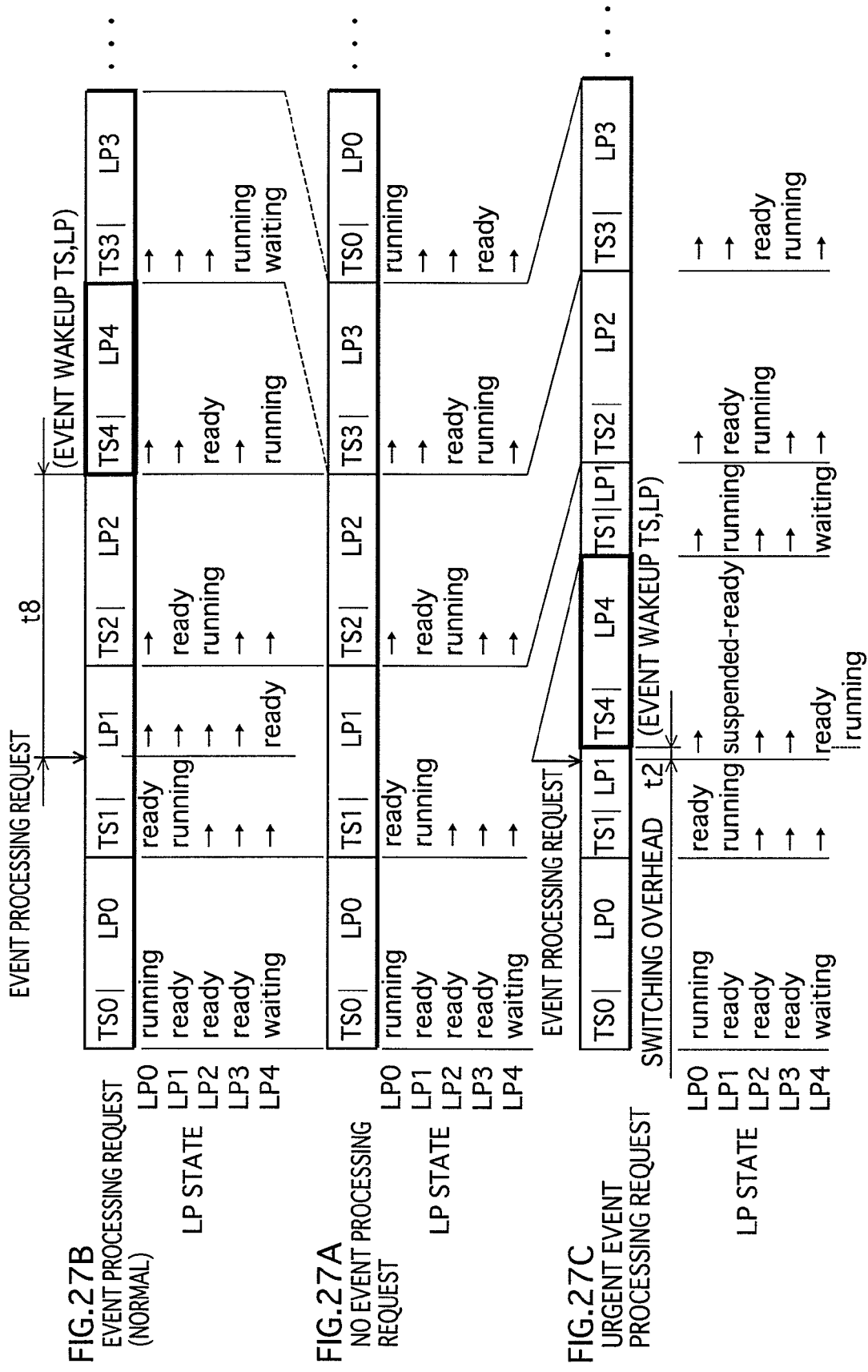

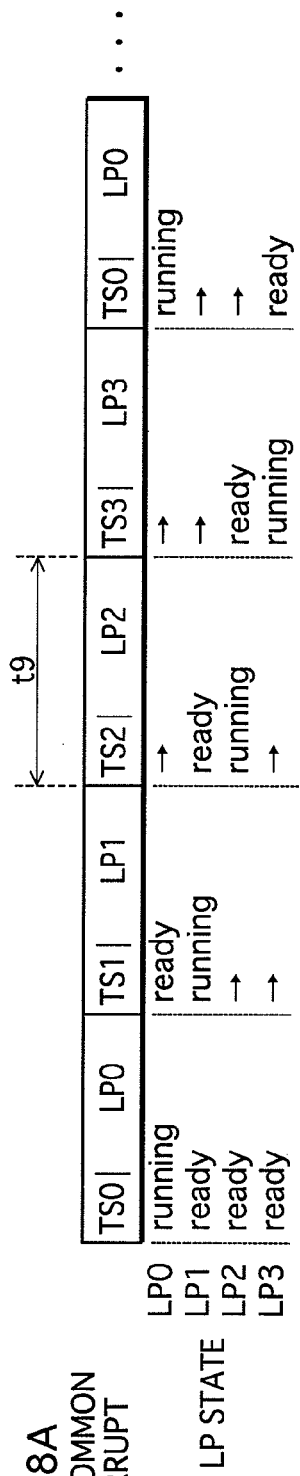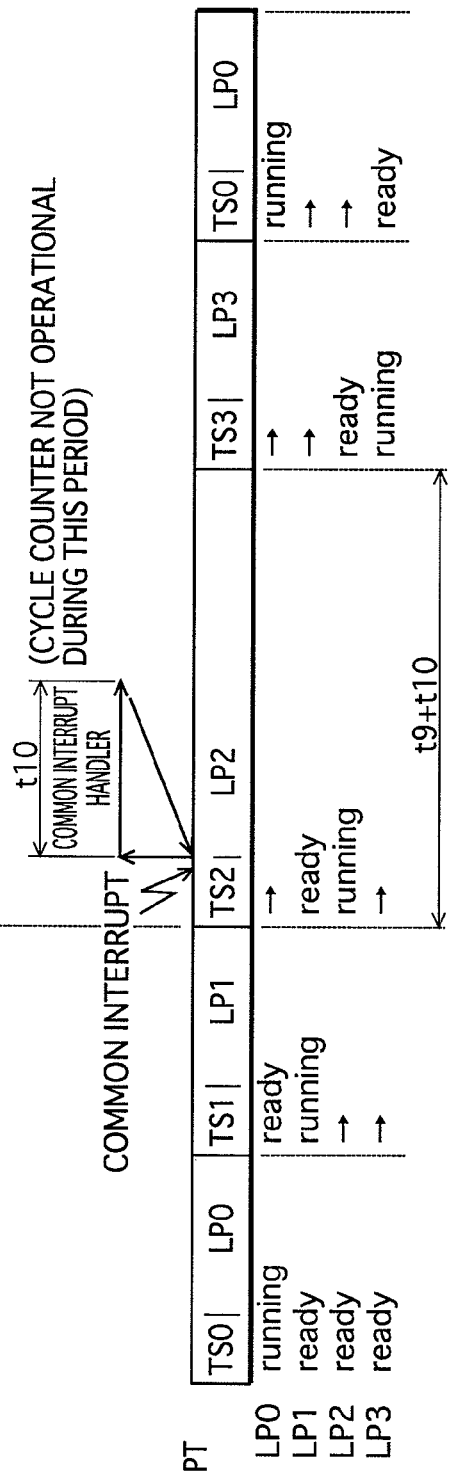

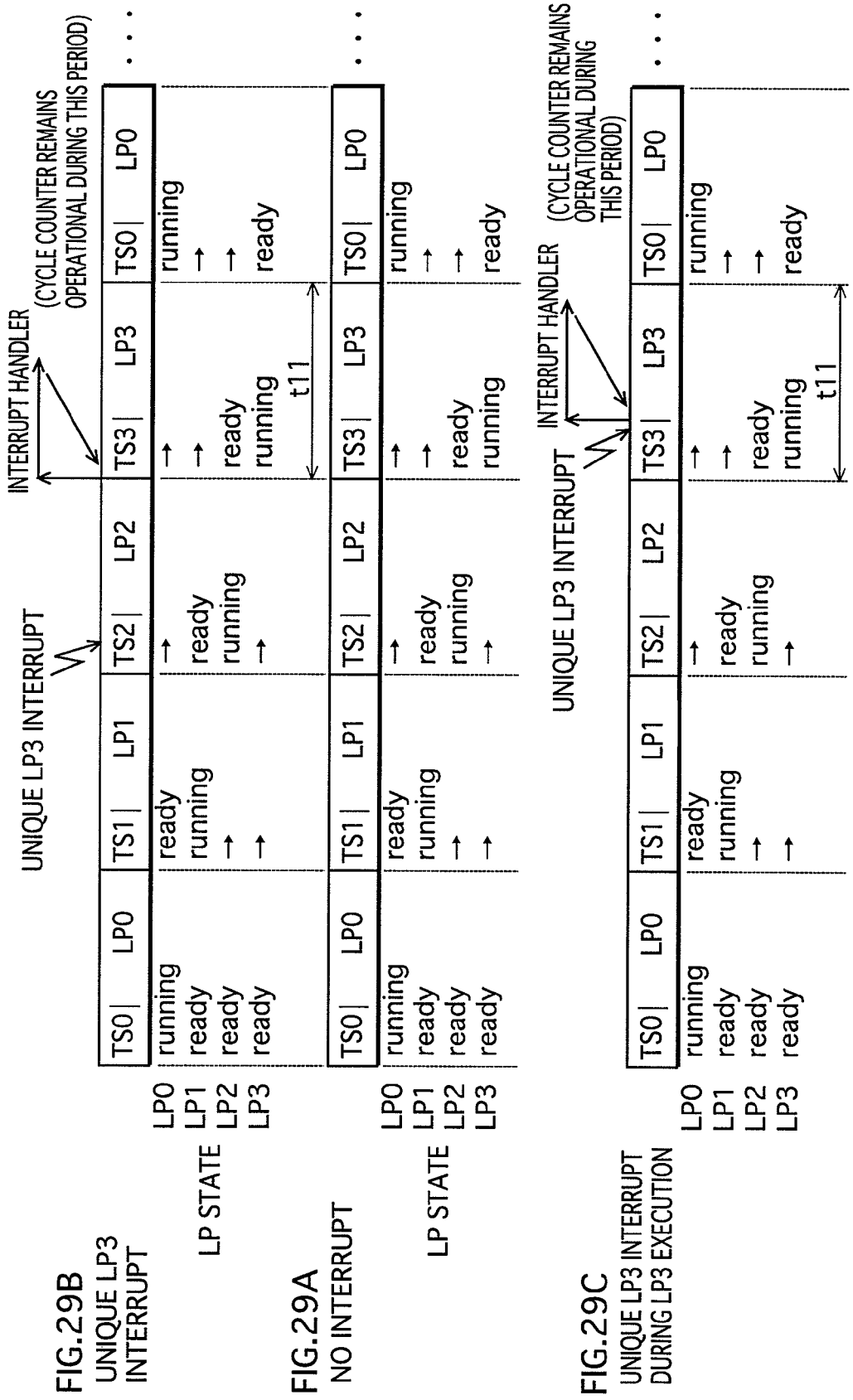

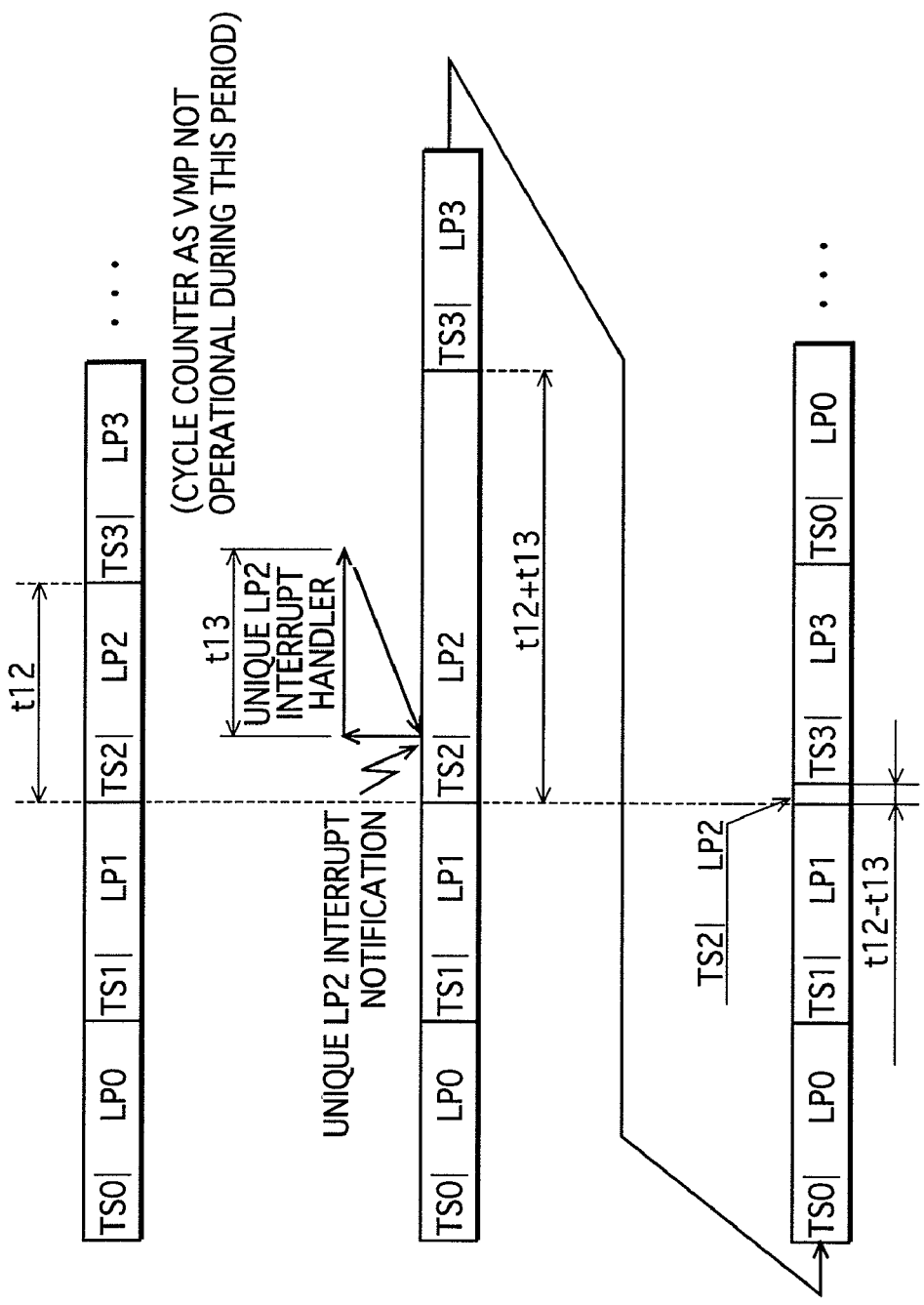

PROCESSOR AND PROGRAM EXECUTION METHOD CAPABLE OF EFFICIENT PROGRAM EXECUTION

This is a divisional application of U.S. Ser. No. 10/338,408, filed on Jan. 8, 2003.

This application is based on applications no. 2002-002816 and no. 2003-001616 filed in Japan, the content of which is hereby incorporated by reference.

BACKGROUND OF THE INVENTION

1. Field of the Invention

The present invention relates to processors, and in particular to technology for efficiently executing programs.

2. Related Art

Conventionally, there exist operating systems (OS) that use a single processor to process a plurality of tasks in a pseudo-parallel manner.

An OS such as this makes a processor repeatedly execute the following processing.

The processor is made to store, in a register group within the processor, control information (hereafter "contexts") showing an execution position, a data storage location and the like of a computer program (hereafter, simply "program") corresponding to each task, to execute the task after obtaining a program, data and the like based on the stored context, to update the context following the execution of the task, and to write the updated context into memory.

Here, for the sake of convenience, the writing of a context stored in an external memory into a register group is referred to as "restoring", and the writing of a context stored in a register group into an external memory is referred to as "saving".

FIG. 32 is a functional block diagram of a conventional processor 1001 that executes tasks under the control of an OS such as described above, and additionally shows a context memory 1010 that stores contexts.

Processor 1001 includes a processing execution unit 1002 that executing tasks, a processing control unit 1003 that performs controls relating to the processing conducted by processing execution unit 1002, and a register group 1004 that stores contexts of the tasks to be executed.

Register group 1004 is a collection of registers, each of which is for storing a context (i.e. a register value group) corresponding to a task.

Every time a new context is stored in register group 1004, processing execution unit 1002 obtains a program and data based on the new context, and executes a task.

Processing control unit 1003 saves a context already stored in register group 1004 by overwriting context memory 1010, judges which context should be targeted for storage in register group 1004, and restores a context by reading a targeted context from context memory 1010 based on the judgment and writing the read context into register group 1004.

As a result, it is necessary to interrupt the execution of tasks by processing execution unit 1002 for the duration of the saving, judging and restoring (i.e. updating of contexts) by processing control unit 1003.

FIG. 33 shows the execution of tasks in processor 1001, and the input/output of contexts between register group 1004 and context memory 1010.

Time flows from left to right in this diagram.

Here, the tasks are executed uniformly in the sequence task A, task B, task C and task D, and the processing returns to task A after task D.

Conventionally, when tasks are executed, the saving, judging and restoring described above are performed before a task is executed.

In other words, the saving, judging and restoring are incurred as an overhead in the execution of tasks.

Here, if a single processing cycle is defined as the processing from tasks A to D, the above OS regulates the execution sequence and timing of the tasks (i.e. schedules the tasks) in a single cycle.

Processing control unit 1003 determines, based on this schedule, a context to be targeted for storage in register group 1004 (i.e. the above judging).

By performing the above processing, it is possible for a plurality of tasks to be processed in a pseudo-parallel manner by a single processor.

Furthermore, there also exist processors that use hardware to execute the above saving, judging and restoring, and then process a plurality of tasks in a pseudo-parallel manner.

However, when a plurality of tasks are processed in a pseudo-parallel manner by a single processor as described above, efficient execution of the tasks cannot be conducted, because of the overhead incurred to perform the above saving, judging and restoring before a task is executed, and the subsequent time taken between completing one task and commencing the next task, in comparison to when a single task is executed continuously.

Particularly in the case of broadcasting devices and the like, such as television receivers and communication devices (e.g. mobile telephones), it is necessary for data processing to be executed under near realtime conditions. However, when a plurality of tasks are processed in a pseudo-parallel manner in devices such as these, it is difficult to realize the above near realtime execution of data processing using conventional task execution methods that incur the above overhead.

SUMMARY OF THE INVENTION

In view of the above issue, a first object of the present invention is to provide a processor capable of executing tasks (i.e. programs) efficiently when a plurality of tasks are executed in a pseudo-parallel manner by a single processor.

Furthermore, a second object is to provide a program execution method capable of executing tasks efficiently.

To achieve the first object, a processor is for sequentially executing a plurality of programs using a plurality of register value groups stored in a memory that correspond one-to-one with the programs, and the processor includes: a plurality of register groups; a select/switch unit operable to select one of the plurality of register groups as an execution target register group on which a program execution is based, and to switch the selection target every time a first predetermined period elapses; a restoring unit operable to restore, every time the switching is performed, one of the register value groups into one of the register groups that is not selected as the execution target register group; a saving unit operable to save, prior to the restoring, register values in the register group targeted for restoring, by overwriting a register value group in the memory that corresponds to the register values; and a program execution unit operable to execute, every time the switching is performed, a program corresponding to a register value group in the execution target register group.

According to this structure, a register value group is restored into a register group other than the execution target register group without affecting the current program execution. Then, when a program is to be executed based on this register group, the program can be promptly readied for execution because the overheads associated with restoring, saving, and the like have been eliminated, and thus the program is executed quickly.

Furthermore, as a result of the elimination of these overheads, program execution periods are not affected, even when the switching is conducted frequently, and thus this structure is effective in parallel execution by pseudo-realtime processing.

Here, the program execution unit may start the executing when the switching is performed.

According to this structure, when a program is to be executed, the program is executed promptly, and virtually all overheads are eliminated.

Here, processor may further include a first obtaining unit operable to obtain sequence information that shows a sequence of the register value groups corresponding to the programs, and the restoring unit may determine, based on the sequence information, a register value group to be restored, and perform the restoring.

According to this structure, an execution sequence of the programs is determined by the sequence information.

Here, the first predetermined period may be determined such that, if the restoring is performed on all of the register value groups in the sequence shown in the sequence information, a total time period that the restored register groups are selected as the execution target register group is within a second predetermined period.

According to this structure, pseudo-parallel execution of a plurality of processing operations is conducted within a limited time period.

In other words, this structure is effective in pseudo-parallel realtime processing and the like in which the processing time is limited.

Here, the sequence information may be a table in which identification information unique to each register value group is arrayed in a predetermined order, and the sequence may be shown by the order of the arrayed identification information.

According to this structure, a restore sequence of the register value groups is shown by an order of the arrayed identification information, and this restore sequence can be altered by changing an order of the array.

Here, the table may include identification information that is identical, the identical identification information may be arrayed so as to be dispersed throughout the array, and the number of pieces of identical identification information in the array may be unique for each program corresponding to a register value group specified by a piece of identification information.

According to this structure, an execution timing of each of the programs is equalized.

Here, the plurality of programs may include a management program that is for judging whether the table requires changing, and for changing the table when required, and the number of pieces of identification information in the array that specify a location of a register value group corresponding to the management program may be only one.

According to this structure, there is an opportunity to change the table whenever pseudo-parallel execution is conducted.

Here, the first predetermined period may be unique for each program, each piece of identification information may have appended a piece of time period information that shows the unique time period of a program corresponding to a register value group specified by the piece of identification information, and the management program may perform the changing such that a total of the unique time periods is within the second predetermined period.

According to this structure, the unique time periods are updated by a management program, so that pseudo-parallel execution of a plurality of processing operations is conducted within a limited time period.

Here, when judged during execution of the management program that the table requires changing, the program execution unit may generate a dummy table showing a state of the table after the changing, and perform the changing by replacing the table with the dummy table.

According to this structure, it is possible to change the table without affecting the current program execution.

Here, the plurality of programs may include an image processing program for executing image processing, and the number of pieces of identification information in the array that specify a location of a register value group corresponding to the image processing program may be greater than that of the other programs.

According to this structure, an image-processing program having a large information volume is allotted a longer processing period in total.

Here, the identification information may be address values that show storage locations of the register value groups, and the restoring unit may specify, based on the address values, a location of a register value group for restoring, and perform the restoring.

According to this structure, it is possible to show a restore sequence of the register value groups by the relative size of the address values.

Here, the sequence information may be a table in which the identification information unique to each register value group has attached pointers that point to other identification information, and the sequence may be shown by following the pointers.

According to this structure, a restore sequence of the register value groups is shown by pointers, and this sequence can be altered by changing the targets indicated by the pointers.

Here, the processor may further include a first detecting unit operable to detect an occurrence of a suspend-cause that results in the program execution being suspended; and a second detecting unit operable to detect a cancellation of the suspend-cause, and when the occurrence of a suspend-cause relating to a program for execution is detected, the program execution unit may relinquish, until the suspend-cause is cancelled, an execution period to be allotted for execution of the program.

According to this structure, meaningless program execution is avoided.

Here, there may be a plurality of the suspend-causes, the suspend-cause effective as a trigger of the relinquishing may be unique for each program, and the program execution unit may only perform the relinquishing when an effective suspend-cause of a currently executed program occurs.

According to this structure, it is judged for each program whether to perform the relinquishing when a suspend-cause occurs.

Here, the processor may further include a second obtaining unit operable to obtain suspend information that corresponds (i) information specifying one of the plurality of suspend-causes with (ii) information showing whether the specified suspend-cause has occurred. Furthermore, the register value groups may each include setting information that corresponds (i) information specifying one of the plurality of suspend-causes with (ii) information showing whether the specified suspend-cause is effective, and the program execution unit may refer comparatively to the suspend information and the setting information, and judge whether to perform the relinquishing.

According to this structure, an effective suspend-cause can be specified, even when there is a plurality of suspend-causes.

Here, the suspend information may be bit string data in which a unique bit position is determined for each suspend-cause, and in which each bit position has a value that shows whether a suspend-cause corresponding to the bit position has occurred, the setting information may be bit string data in which a unique bit position is determined for each suspend-cause, and in which each bit position has a value that shows whether a suspend-cause corresponding to the bit position is effective, and the program execution unit may only refers to a bit position of a suspend-cause in the suspend information that corresponds to a bit position in the setting information that has a value showing the suspend-cause to be effective.

According to this structure, the reference range is limited, and thus an effective suspend-cause can be promptly specified, even when there is a plurality of suspend-causes.

Here, the program execution unit may notify the restoring unit at a time of performing the relinquishing, and the restoring unit may perform the restoring while ignoring an order in the sequence of a register value group corresponding to the program that has been targeted for the relinquishing, by not targeting the register value group for restoring until the suspend-cause is cancelled.

According to this structure, unnecessary restoring of register value groups is avoided.

Here, when notified of the relinquishing, the restoring unit may exceptionally set the ignored register value group as a priority restore target candidate in a second performing of the restoring after the notification. Furthermore, if the suspend-cause is cancelled before the start of the second restoring, the restoring unit may determine the register value group as the restore target, and if the suspend-cause is not cancelled before the start of the second restoring, the restoring unit may continue to ignore the register value group until the suspend-cause is cancelled.

According to this structure, it is possible to execute another effective program during a relinquished time period.

Here, when a plurality of register value groups are ignored by the restoring unit, and the suspend-cause is cancelled with respect to two or more of the plurality of register value groups, the restoring unit may set, as the restore target when the restoring is next performed, whichever of the two or more register value groups was ignored later.

According to this structure, the restoring of an ignored register group at a biased time after the cancellation of a suspend-cause is avoided.

Here, the program execution unit may notify the select/switch unit at a time of performing the relinquishing, and the select/switch unit may perform the switching when the notification is received.

According to this structure, it is possible for execution of a subsequent program to be promptly started when the relinquishing is conducted.

Here, the suspend-cause may be a cache-miss occurring at a time of a program execution.

According to this structure, the execution of a subsequent program is promptly started when a cache-miss occurs.

Here, the suspend-cause may be a state of waiting for a processing result from an external apparatus that was requested to perform processing at a time of a program execution.

According to this structure, the execution of a subsequent program is promptly started when the above state occurs.

Here, the suspend-cause may be a state of waiting for a release of a shared resource, when the shared resource is required at a time of a program execution.

According to this structure, the execution of a subsequent program is promptly started when the above state occurs.

Here, the program execution unit may have a CPU for use in program execution, and stop the CPU during an execution period of the relinquishing.

According to this structure, wasted power consumption is avoided.

Here, the program execution unit may have a CPU for use in program execution, and reduce the drive frequency of the CPU during an execution period of the relinquishing.

According to this structure, wasted power consumption is reduced.

Here, the program execution unit may have a CPU for use in program execution, and adjust the drive frequency of the CPU in accordance with a program execution load when the plurality of programs are executed, such that a free processing time period does not occur due to a processing capacity of the CPU being too high with respect to the program execution load.

According to this structure, wasted power consumption is reduced.

Here, there may be two register groups, and the select/switch unit may perform the switching alternately with respect to the two register groups.

According to this structure, pseudo-parallel execution of a plurality of programs is conducted using only two register groups, while at the same time eliminating overheads.

In other words, two register groups is sufficient, irrespective of the number of program to be executed in a pseudo-parallel manner.

Here, the program execution unit may perform pipeline processing having N number of stages, and the saving unit may perform the saving (N−1) clocks after a clock in which the switching was performed.

According to this structure, even when pipeline processing is executed, pseudo-parallel execution of a plurality of programs can be conducted, while at the same time eliminating overheads.

Here, the select/switch unit may determine the selection target from the plurality of register groups by a predetermined sequence, and perform the switching. Furthermore, the restoring unit may determine the restore target from the plurality of register groups by a predetermined sequence, and perform the restoring.

According to this structure, programs are promptly readily for execution because overheads related to restoring, saving and the like have been eliminated, and thus the execution of programs can be quickly completed.

Here, there may exist a plurality of candidate register value groups that are candidates for the restoring, and a unique priority level may be corresponded to each candidate register value group. Furthermore, the restoring unit may determine, based on the priority levels, the restore target from the plurality of candidate register value groups, and perform the restoring.

According to this structure, a candidate register value group to be the restore target is determined from a plurality of candidate register value group, based on the priority levels.

In other words, the flexibility of the restoring is improved as a result of the restore target not being fixed.

Here, each candidate register value group may be included in one of a plurality of restore groups, a unique estimated execution period may be corresponded to each restore group, the restoring unit may determine, for each restore group, a candidate register value group included in the restore group as the restore target, and the select/switch unit may principally set, as a time interval from an $m^{th}$ to an $M+1^{th}$ performing of the switching, an estimated execution period of a restore group that includes a register value group in the execution target register group by the select/switch unit in the $m^{th}$ switching, where m is a natural number.

According to this structure, an estimated execution period corresponded to each restore group is set as the interval between the switching performed by the select/switch unit.

Here, the processor may further include a first detecting unit operable to detect an occurrence of a suspend-cause that results in the program execution being suspended; and a second detecting unit operable to detect a cancellation of the suspend-cause, and when the occurrence of a suspend-cause relating to a program for execution is detected, the program execution unit may relinquish, until the suspend-cause is cancelled, an execution period to be allotted for execution of the program.

According to this structure, it is possible to avoid the program execution unit attempting to execute a program with respect to which a suspend-cause suspending the program execution has occurred.

Here, the select/switch unit may perform the switching exceptionally, when the relinquishing is performed by the program execution unit.

According to this structure, a program corresponding to restored register value group is immediately executed when the relinquishing is conducted.

Here, the program execution unit may notify the select/switch unit at a time of performing the relinquishing, and the select/switch unit may perform the switching exceptionally, based on the notification.

According to this structure, the switching is performed exceptionally in the select/switch unit as a result of the notification being received.

Here, at a time of determining the restore target from the plurality of candidate register value groups, the restoring unit may remove, as a potential restore target, a candidate register value group corresponding to a program that has been targeted for the relinquishing, until the suspend-cause is cancelled.

According to this structure, it is possible to avoid the program execution unit attempting to execute, next time, a program with respect to which a suspend-cause suspending the program execution has occurred.

Here, the restoring unit may determine, from the candidate register value groups that have not been removed, a candidate register value group having the highest priority level as the restore target.

According to this structure, a program corresponding to a register value group to be restored is limited to programs with respect to which a suspend-cause has not occurred, and since the program has a high priority level corresponded, it can be executed with great efficiency.

Here, the processor may further include a third obtaining unit operable to obtain information that designates a priority level in each restore group, and when the obtaining is performed by the third obtaining unit, the restoring unit may determine, as the restore target, a candidate register value group that has not been removed and that corresponds to the designated priority level.

According to this structure, a register value group to be the restore target is altered by changing the designated priority levels.

Here, the processor may further include a third obtaining unit operable to obtain information that designates a priority level in each restore group, and when the obtaining is performed by the third obtaining unit, the restoring unit may determine, as the restore target, a candidate register value group that has not been removed and that corresponds to a priority level that is higher than or equal to the designated priority level.

According to this structure, the opportunity for program execution is improved, because a program with respect to which a suspend-cause has not occurred and that is within a range including a specified priority level, is executed.

Here, when a program is, as a result of a $k^{th}$ performing of the switching, to be executed for the first time after the relinquishing has been stopped, the select/switch unit may set, as a time interval from the $k^{th}$ to a $k+^{th}$ performing of the switching, a time period that was not used in the program execution because of the switching being brought forward at a time of the relinquishing, where k is a natural number.

According to this structure, when a time period remains unused, this time period is consumed when the program is next executed.

Here, the processor may further include a pre-cache unit operable to write, into an external cache for a duration that the relinquishing is performed, data required for executing a program that corresponds to a register value group stored in a register group to be selected as the execution target register group when the relinquishing is stopped.

According to this structure, the occurrence of a cache-miss at a next program execution time is prevented.

Here, the processor may further include a garbage collection unit operable to perform garbage collection for a duration that the relinquishing is performed.

According to this structure, the occurrence of a memory-release wait at the next program execution time is prevented.

Here, the processor may further include a fourth obtaining unit operable to obtain an execution request for a program that is to be executed non-steadily; and a first judging unit operable to judge, when the execution request is obtained by the fourth obtaining unit, whether the program whose execution has been requested is a common-processing program that is executable during the execution of any other program.

According to this structure, when an execution request for a common-processing program is received, it is recognized that the program is executable during execution of any of the programs.

Here, when judged by the first judging unit that the program whose execution has been requested is a common-processing program, the program execution unit may interrupt a program currently being executed and executes the common-processing program, and when the common-processing program has been executed, the select/switch unit may not include the execution period of the common-processing program in the execution period of the program currently being executed.

According to this structure, the execution period of a currently executed program is not affected by the interrupt execution of a common-processing program.

Here, the select/switch unit may not include the execution period of the common-processing program in the execution period of the currently executed program, by stopping a time measurement counter for a duration that the common-processing is executed.

According to this structure, a time period consumed in the interrupt execution of a common-processing program can easily be removed (i.e. not included) in a consumed amount of the estimated execution period of a currently executed program.

Here, the common-processing may be processing that results from a handling of a shared resource, and the select/switch unit may stop the switching for a duration from a start to an end of the common-processing execution.

According to this structure, a time period consumed in the interrupt operation of a shared resource can be easily removed (i.e. not included) in a consumed amount of the estimated execution period of a currently executed program.

Here, the processor may further include a fourth obtaining unit operable to obtain an execution request for a program that is to be executed non-steadily; and a second judging unit operable to judge, when the execution request is obtained by the fourth obtaining unit, whether the program for non-steady execution is a specific-processing program that is to be executed following the execution of a specific program.

According to this structure, when an execution request for a specific-processing program is received, it is recognized that the program is executable during the execution of a specific program.

Here, when judged by the second judging unit that the program whose execution is requested is a specific-processing program, the program execution unit may execute the specific-processing program following the execution of the specific program, and when the specific-processing program has been executed, the select/switch unit may include a time period consumed to execute the specific-processing program in the consumed time period of an estimated execution period corresponded to the specific program.

According to this structure, an execution period of the specific program is affected by the interrupt execution of a specific-processing program, and shortened as a result.

Furthermore, efficient program execution can be conducted, because when an execution request for a specific-processing program is received the program execution unit (i.e. the CPU) does not have to judge whether or not to accept the request.

Here, when judged by the second judging unit that the program whose execution is requested is a specific-processing program, the program execution unit may execute the specific-processing program following the execution of the specific program. Furthermore, when the specific-processing program has been executed, the select/switch unit may not include a first consumed time period consumed to execute the specific-processing program in a second consumed time period of an estimated execution period corresponded to the specific program, and when the specific program is next executed, the select/switch unit may include the first consumed time period in a third consumed time period of the estimated execution period corresponded to the specific program.

According to this structure, when an execution request for a specific-processing program is received, the execution period of a specific program is not affected by the interrupt execution of the specific-processing program. Then, when the specific program is next executed, the execution period of the specific program is affected by the interrupt execution of the specific-processing program, and shortened as a result.

In other words, consecutive interrupt processing operations can be processed promptly without being suspended.

Here, the processor may further include a third detecting unit operable to detect an occurrence of an execution request for an event-use program. Furthermore, the plurality restore groups may include a first restore group to which an order is corresponded, and a second restore group to which an order is not corresponded, an event-use register value group that corresponds to the event-use program may be included in the second restore group. Moreover, the restoring unit (i) may normally perform the determining sequentially starting with the first restore group based on the order corresponded to the first restore group, and (ii) may interrupt the order when the occurrence of an execution request for an event-use program is detected by the third detecting unit, and determine the event-use register value group as the restore target.

According to this structure, when an execution request for an event-use program occurs, it is possible to execute the event-use program immediately.

Here, when the occurrence of an execution request for an event-use program is detected by the third detecting unit, the restoring unit may restore the event-use register value group into one of the register groups that is not selected as the execution target register group, and the select/switch unit may perform the switching exceptionally, when the restoring of the event-use register value group is completed.

According to this structure, when an execution request for an event-use program occurs, the event-use program is executed immediately.

Here, the processor may further include a first adjustment unit operable to adjust the execution period of a program, so as to recuperate, when the program is next executed, a time period that was relinquished as a result of the switching being performed exceptionally during a previous execution of the program.

According to this structure, the execution period of a program is adjusted to recuperate a relinquished time period, and thus the execution period of the program is guaranteed, even when relinquishing is conducted.

Here, the processor may further include a second adjustment unit operable, when an execution frequency of the event-use program exceeds a threshold, to delay the determining of the event-use register value group by the restoring unit, and to adjust the execution frequency so as not to exceed the threshold.

According to this structure, it is possible to suppress reductions in the execution frequency of a program corresponding to a register value group that belongs to the first restore group.

Here, the processor may further include a third judging unit for judging whether the switching of the selection target is currently possible, and when the select/switch unit attempts to perform the switching and the third judging unit judges that switching is not currently possible, the select/switch unit may delay the switching until the third judging unit judges that switching is currently possible.

According to this structure, a program can be completed normally.

Here, the processor may further include a third adjustment unit operable to subtract, from an estimated execution period that corresponds to a specific restore group, a time period by which the estimated execution period is exceeded as a result of the delaying by the select/switch unit.

According to this structure, it is possible to prevent a breakdown in the program execution periods caused by the accumulation of exceeded time periods.

In other words, the actual execution period of a program corresponding to register values that belongs to a restore group other than a specific restore group is set to be greater than or equal to an estimated execution period corresponded to the register group, and thus the execution period of the program is guaranteed.

Here, a unique order may be corresponded to each restore group, and the restoring unit may sequentially perform the determining based on the order corresponded to the restore group.

According to this structure, programs are executed in an order corresponded to each restore group.

Here, the processor may further include a changing unit operable to change priority levels corresponded to the candidate register value groups.

According to this structure, the program for execution can easily be changed.

Here, the processor may further include a first detecting unit operable to detect an occurrence of a suspend-cause that results in the program execution being suspended; a second detecting unit operable to detect a cancellation of the suspend-cause; and a power-consumption reducing unit operable to reduce a power consumption of hardware for executing programs. Furthermore, when the occurrence of a suspend-cause relating to a program for execution is detected, the program execution unit may relinquish, until the suspend-cause is cancelled, an execution period to be allotted for execution of the program, and the power-consumption reducing unit may perform the reducing for a duration that the relinquishing is performed.

According to this structure, the reducing by the power-consumption reducing unit is performed during a relinquished time period of an estimate execution period of a currently executed program, in order to achieve power reductions.

Furthermore, by doing nothing in a time period leftover as a result of the execution-suspension of a program, it is possible to maintain, as much as possible, uniform execution cycles (i.e. maintain periodicity) of the programs.

Here, the program execution unit may have a CPU for executing programs, and the power-consumption reducing unit may perform the reducing for the duration that the relinquishing is performed by blocking a clock signal supplied to the CPU.

According to this structure, the power reductions can be easily achieved.

Here, the program execution unit may have a CPU for executing programs, and the power-consumption reducing unit may perform the reducing for the duration that the relinquishing is performed by reducing a voltage applied to the CPU or setting the voltage to zero.

According to this structure, the power reductions can be easily achieved.

Here, the processor may further include a receiving unit for receiving an execution request for a program that is to be executed non-steadily, and the power-consumption reducing unit may stop the reducing if the reducing is being performed when the execution request is received.

According to this structure, an execution request relating to a program other than a program for urgent execution is not accepted, and thus it is possible to omit the program execution-required judgment processing by the program execution unit (i.e. the CPU), and to conduct program execution efficiently.

Here, the execution request may be an interrupt-processing request.

According to this structure, it is possible to stop the reducing by the power-consumption reducing unit when an interrupt-processing request occurs.

Here, the execution request may be an event-processing request for urgently executing a program following the exceptional switching by the select/switch unit.

According to this structure, it is possible to stop the reduction by the power-consumption reducing unit when an event-processing request occurs.

Here, the restoring unit may copy the register value groups stored in the memory, and perform the restoring. Furthermore, following the program execution, the program execution unit may change one or more register value restored into the execution target register group, and the saving unit may only perform the saving when the changing has been performed by the program execution unit.

According to this structure, only changed register values are saved, and thus a time period required for the saving is shortened.

Here, each register of the plurality of register groups may have attached a piece of change information showing whether a register value restored into the register has been changed, and the saving unit may perform the saving by writing, based on the change information, only a changed register value into a location, in the memory, in which the register value prior to being changed is stored.

According to this structure, the existence of a change is easily recognized and only changed register values are saved, and thus a time period required for the saving can be shortened.

Here, each piece of change information may be a 1-bit flag.

According to this structure, changes are shown by the flags.

Here, the first predetermined period may be a fixed time period.

According to this structure, the switching is facilitated.

Here, the first predetermined period may be unique for each of the plurality of programs.

According to this structure, it is possible to allot a program execution period suitable for the execution of each program.

Here, the processor may further include a plurality of caches for storing execution data that is required in the program execution; a specifying unit operable to refer, following the restoring by the restoring unit, to a register value group that was restored, and to specify the execution data of a program that corresponds to the register value group; and a writing unit operable to write the specified execution data into one of the caches that is not being used in the program execution.

According to this structure, the occurrence of a cache-miss is avoided.

To achieve the second object, a program execution method is for executing a program in a processor, the processor including a plurality of register groups and sequentially executing a plurality of programs using a plurality of register value groups stored in a memory that correspond one-to-one with the programs, and the program execution method including: a select/switch step of selecting one of the plurality of register groups as an execution target register group on which a program execution is based, and switching the selection target every time a first predetermined period elapses; a restoring step of restoring, every time the switching is performed, one of the register value groups into one of the register groups that is not selected as the execution target register group; a saving step of saving, prior to the restoring, register values in the register group targeted for restoring, by overwriting a register value group in the memory that corresponds to the register values; and a program execution step of executing, every time the switching is performed, a program corresponding to a register value group in the execution target register group.

According to this structure, a register value group is restored into a register group other than the execution target register group, without affecting the current program execution. Then, when a program is to be executed based on this register group, the program can be promptly readied for execution because the overheads associated with restoring, saving, and the like have been eliminated, and thus the program is executed quickly.

Furthermore, as a result of the elimination of these overheads, the program execution periods are not affected, even when the switching is conducted frequently, and thus this structure is effective in parallel execution by pseudo-realtime processing.

Furthermore, the processor may be for sequentially executing a plurality of programs using a plurality of register value groups that correspond one-to-one with the programs, and the processor may include a plurality of register groups for storing the register value groups; a select/switch unit operable to select one of the plurality of register groups as an execution target register group on which a program execution is based, and to switch the selection target every time a predetermined period elapses; and a program execution unit operable to execute, every time the switching is performed, a program corresponding to a register value group in the execution target register group.

Furthermore, the program execution method may be for executing a program in a processor, the processor may include a plurality of register groups and sequentially execute a plurality of programs using a plurality of register value groups that correspond one-to-one with the programs, and the program execution method may include: a select/switch step of selecting one of the plurality of register groups as an execution target register group on which a program execution is based, and switching the selection target every time a predetermined period elapses; and a program execution step of executing, every time the switching is performed, a program corresponding to a register value group in the execution target register group.

According to these structures, it is possible to execute programs quickly without affecting the execution period of each of the programs, and thus because a plurality of programs are executed rapidly while at the same time being frequently switched every time a predetermined period elapses, this structure is effective in realizing parallel execution by pseudo-realtime processing.

BRIEF DESCRIPTION OF THE DRAWINGS

These and other objects, advantages and features of the invention will become apparent from the following description thereof taken in conjunction with the accompanying drawings that illustrate specific embodiments of the present invention.

In the drawings:

FIG. 22A shows a basic cycle value in each timeslot;

FIG. 22B depicts the reviewing of a basic cycle value by basic cycle adjustment processing;

FIG. 23A shows a normal program execution state when a program execution period is not relinquished;

FIG. 23B shows a program execution state when a program execution period is relinquished and time-option information shows "LP_SWITCH";

FIG. 23C shows a program execution state when a program execution period is relinquished and the time-option information of an LP1 shows "TS_SWITCH";

FIG. 23D shows a program execution state when a program execution period is relinquished and the time-option information of LP1 shows "MICRO-SLEEP";

FIG. 24A depicts a status of a program execution based on idle-option information in a time-driven timeslot when there is no effective candidate program;

FIG. 24B shows a program execution state when there is no effective candidate program and the idle-option information of LP1 shows "SWITCH";

FIG. 24C shows a program execution state in a TS1 when there is no effective candidate program and the idle-option information of LP1 shows "MICRO-SLEEP";

FIG. 25A shows a program execution status when there is a sleeping timeslot;

FIG. 25B shows a program execution status when a wait-state of a program allotted to a sleeping timeslot is cancelled, and a wakeup timing of the program shows "n";

FIG. 26A shows an execution status of a program when a sleeping timeslot is provided;

FIG. 26B shows an execution status of a program when a wait-state of a program allotted to a sleeping timeslot is cancelled, and a wakeup timing of the program shows "e";

FIG. 27A shows a program execution state when an event-processing request is not generated;

FIG. 27B shows an execution status of a program when an event-processing request is generated, and a wakeup timing of a program for executing the event processing shows "n";

FIG. 27C shows an execution status of a program when an event-processing request is generated, and a wakeup timing of a program for executing the event processing shows "e";

FIG. 28A shows a program execution state when a common interrupt-processing request is not generated;

FIG. 28B shows a program execution state when a common interrupt-processing request is generated;

FIG. 29A shows program execution state when a unique interrupt-processing request is not generated;

FIG. 29B shows an execution state of unique interrupt processing when a program other than the program for executing the unique interrupt processing is being executed at the time that a unique interrupt-processing request is generated;

FIG. 29C shows an execution state of unique interrupt processing when a program for executing the unique interrupt processing is being executed at the time that a unique interrupt-processing request is generated;

FIG. 30A shows program execution state when a unique interrupt-processing request is not generated;

FIG. 30B shows an execution state, in a $k^{th}$ cycle, of unique interrupt processing by a method other than that of the first and second embodiments when a unique interrupt-processing request is generated in the $k^{th}$ cycle;

FIG. 30C shows an execution state, in a $k+1^{th}$ cycle, of unique interrupt processing by a method other than that of the first and second embodiments when a unique interrupt-processing request is generated in the $k^{th}$ cycle;

DETAILED DESCRIPTION OF THE PREFERRED EMBODIMENTS

First Embodiment

1. Structure

A detailed description of a first embodiment according to the present embodiment will now be given with reference to the drawings.

Figure 1:
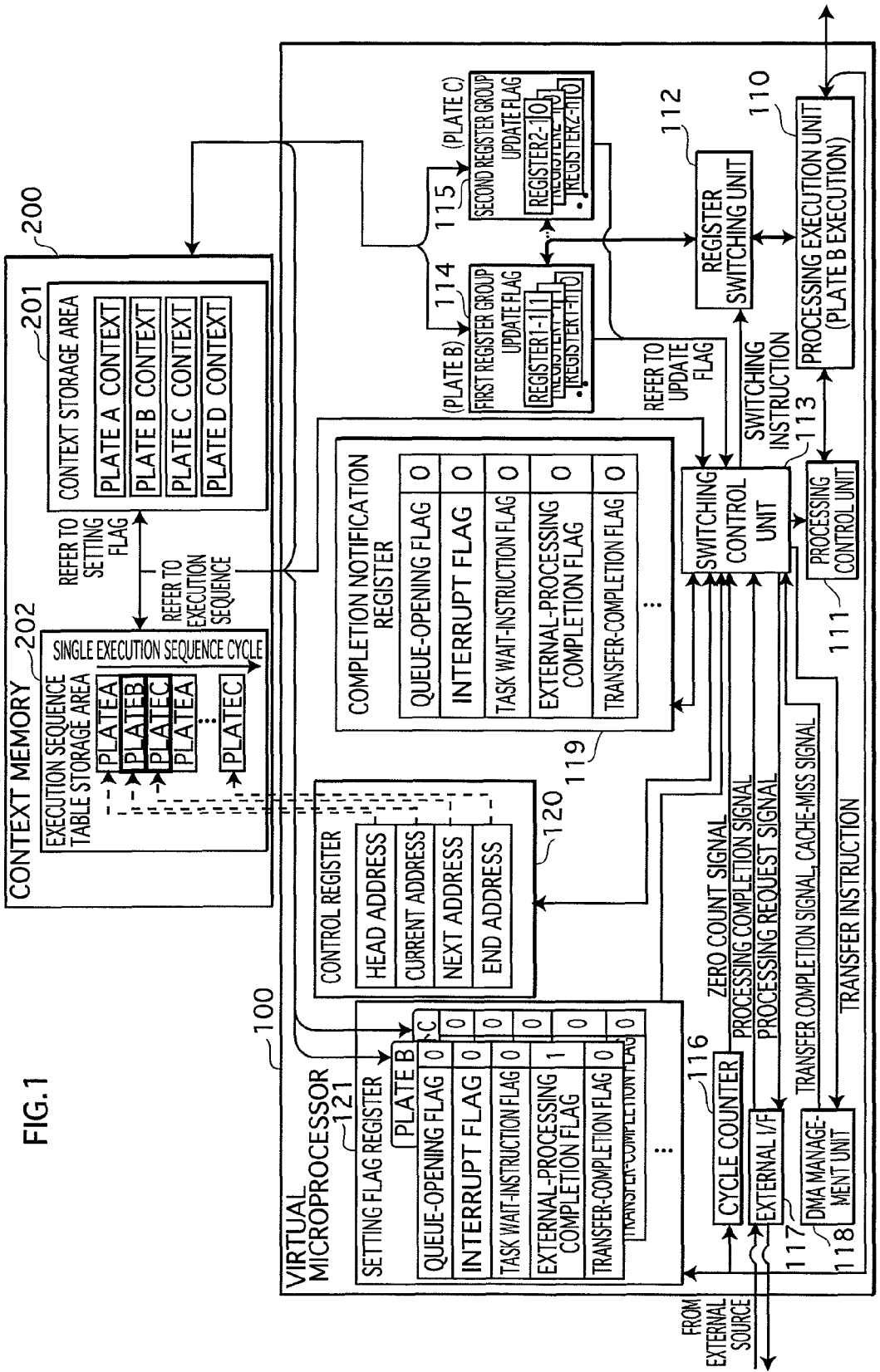
FIG. 1 is a functional block diagram of a virtual multiprocessor 100 according to a first embodiment.

FIG. 1 is a functional block diagram of a virtual multiprocessor 100 according to the first embodiment of the present invention.

Virtual multiprocessor 100 is a processor that executes a sequential switching of plates.

Here, a plate is a unit that collects together one or more tasks, being either conventional tasks or scheduling units of an OS, and is what the processor targets for execution.

Each plate has a single execution position (i.e. a single command position within a program).

FIG. 1 also shows a context memory 200 storing addresses and other control information (i.e. contexts) that shows, for each plate, a value of a program counter indicating an execution position of a program corresponding the plate, and a storage location of the program and data.

Here, the execution of a program corresponding to a plate is referred to as "executing a plate".

Context memory 200 is constituted by a SRAM, and includes a context storage area 201 storing the contexts of a plurality of plates, and an execution-sequence-table storage area 202 storing an execution sequence table 300 that shows an execution sequence of the plates.

Execution sequence table 300 is a table that determines an execution schedule of the plates, and is generated by a management application program (hereafter, "management application") included in one of the plates. Table 300 is an array of values relating to a plurality of memory addresses (hereafter, "context addresses") in context storage area 201, and in each respective location shown by these context address values are the contexts necessary for executing the plates.

Here, addresses in execution-sequence-table storage area 202 that show the physical storage location of each context address value are referred to as a "table addresses".

The above table addresses are shown by numeric values, and the relative size of these numeric values corresponds to the sequence in the above array of context addresses stored in the locations specified by the table addresses.

In other words, in a single scheduling cycle, the plates are executed in ascending order of the table address values, and thus a plate corresponding to a context address specified by the value of a context address stored in a physical location shown by the smallest table address value will be executed first.

Thus, in the case that the execution sequence of the plates is shown as A→B→C→A→D→C in execution sequence table 300, the execution of each of the plates will be completed within a single cycle, and the cycle will be repeated a plurality of times.

Here, the processing time period of each of the plates is the same, and plates, such as plate A above, that require more processing time may be executed more than once in a single cycle.

Figure 34:
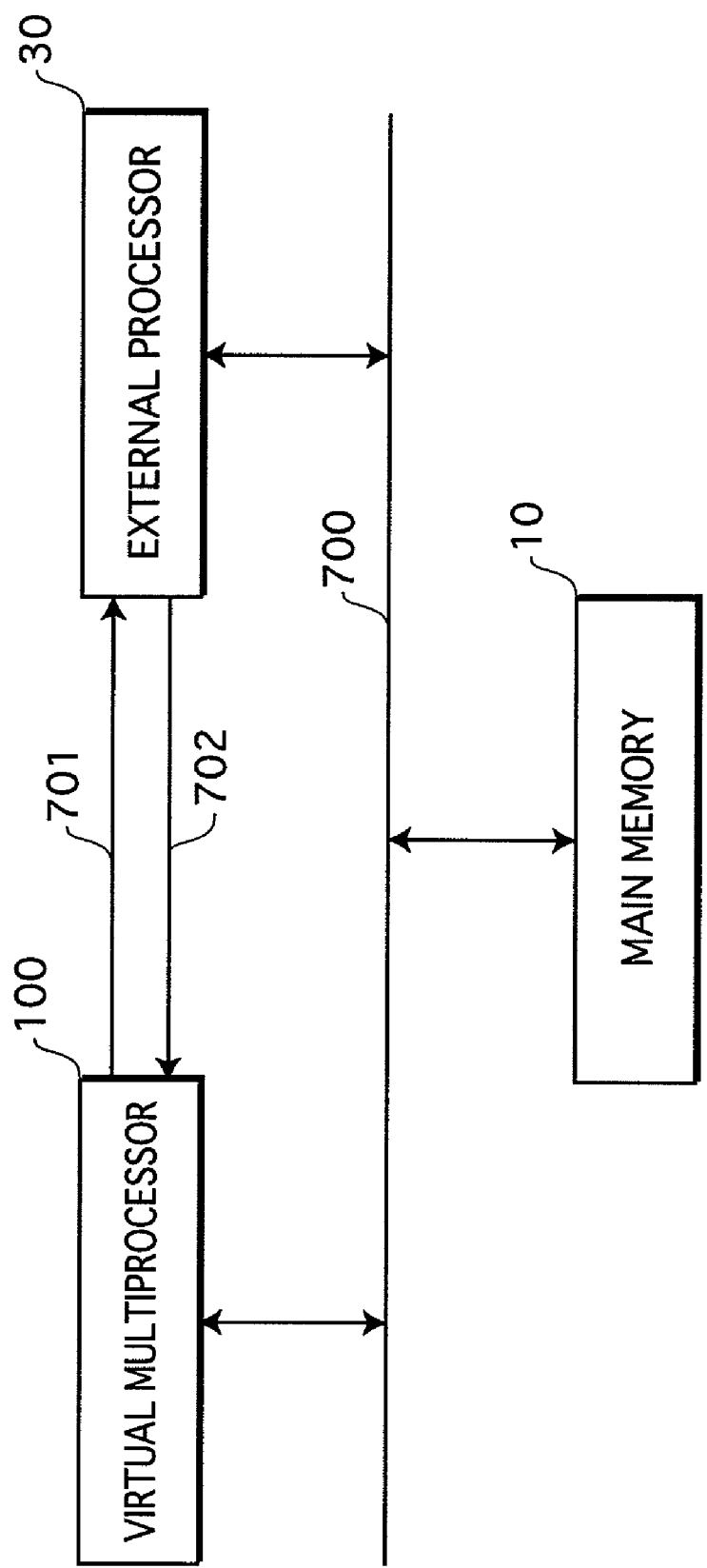
FIG. 34 shows the connection between an external processor 30 and virtual multiprocessor 100 according to the first embodiment.

FIG. 34 shows the connection between an external processor 30 and virtual multiprocessor 100 according to the first embodiment.

Apart from the functional units described above, there are other functional units relating to virtual multiprocessor 100 that are not depicted.

Specifically, there exists a main memory 10, formed from SRAM, that stores programs, data and the like, and a cache memory (not depicted), also formed from SRAM, that is connected between main memory 10 and virtual multiprocessor 100, and that stores the above programs, data and the like. The main memory and cache memory are connected to virtual multiprocessor 100 via a bus 700.

Virtual multiprocessor 100 executes a plurality of plates in a pseudo-parallel manner, and sometimes requests external processor 30 to process one of the plurality of plates. External processor 30 is connected to virtual multiprocessor 100 via bus 700 in the same manner described above.

In other words, as shown in FIG. 34, main memory 10 is connected to external processor 30 by bus 700, and virtual multiprocessor 100 is connected to external processor 30 via main memory 10.

Virtual multiprocessor 100 writes input data for processing executed by external processor 30 into main memory 10 via bus 700, and reads data that results from processing executed by external processor 30 from main memory 10 via bus 700.

Furthermore, external processor 30 reads input data for processing from main memory 10, and writes data that results from processing into main memory 10.

An external-processing-request signal line 701 and an external-processing-completion signal line 702 are provided independently of bus 700, and are connected to virtual multiprocessor 100 and external processor 30.

More specifically, external-processing-request signal line 701 is a signal route for sending a processing request signal from virtual multiprocessor 100 to external processor 30, and external-processing-completion signal line 702 is a signal route for sending a processing completion signal from external processor 30 to virtual multiprocessor 100.

The transmission of these signals respectively allows for processing requests to be made from virtual multiprocessor 100 to external processor 30, and for notifications of processing completion to be made from external processor 30 to virtual multiprocessor 100.

Furthermore, virtual multiprocessor 100 has SIMD (single instruction multiple data) architecture, and includes a processing execution unit 110, a processing control unit 111, a register switching unit 112, a switching control unit 113, a first register group 114, a second register group 115, a cycle counter 116, an external I/F (interface) 117, a DMA (direct memory access) management unit 118, a completion notification register 119, a control register 120, and a setting flag register 121.

First register group 114 and second register group 115 each consist of a collection of registers for storing, respectively, program counter values and register values (e.g. addresses showing program and data storage locations) that form a content of the contexts.

Each register has a 1-bit storage area for storing an update flag that shows whether a value of a program counter or the like stored in the register has been updated.

The update flag shows a 1-value when a value has been updated and a 0-value when a value has not been updated.

In a default state, the update flag in each of the registers in register groups 114 and 115 has a 0-value.

In accordance with an instruction from switching control unit 113, register switching unit 112 selects one of register groups 114 and 115 as a register group to be used when a program is executed (hereafter, "current register group").

Here, the register group that is not selected as the current register group is referred to as a "standby register group", and the switching of the selection target from the currently selected register group to the other register group is referred to as "register switching".

When register switching is conducted (i.e. when a current register group is selected), processing execution unit 110 specifies, based on a context stored in the current register group, the location of a program to be executed and data required to execute the program, and instructs DMA management unit 118 to obtain the program and data.

Here, the given example is premised on the program and data being obtained from cache memory. When the targeted data exists in cache memory (hereafter, a "cache hit"), or when a program or data is obtained exceptionally from an external storage apparatus (described below), processing execution unit 110 obtains the program and data, and uses the program and data to execute a plate in accordance with an instruction from processing control unit 111.

There are occasions, however, when processing execution unit 110 instructs DMA management unit 118 to exceptionally obtain a program or data from an external storage apparatus (not depicted).

This external storage apparatus can be accessed (e.g. read/written) by another input/output apparatus (not depicted) or the like, and in the case that the external storage apparatus is accessed by a plurality of apparatuses, the time required for accessing is different to when access is conducted by a single apparatus (the access time for a plurality of apparatuses being longer).

On the other hand, when the targeted data does not exist in cache memory (hereafter, a "cache miss"), or when judged that accessing the external storage apparatus will take time, processing execution unit 110 notifies processing control unit 111 of the cache miss, and performs the following processing in accordance with an instruction from processing control unit 111.

Following the execution of a plate, processing execution unit 110 updates values stored in a register that require updating (i.e. program counter and the like), and sets the update flag in the register having an updated value to a 1-value.

Furthermore, when a wait-cause (described below) occurs during execution of a plate, processing execution unit 110 outputs to switching control unit 113 via processing control unit 111, a notification showing that the plate has been put to "sleep" (described below), and changes a setting flag (described below) in setting flag register 121 that corresponds to a category of the wait-cause to a 1-value.

Also, when the wait-cause occurs, processing execution unit 110 requests external processor 30 to execute processing.

Furthermore, when a processing result is received from external processor 30, processing execution unit 110 outputs, to switching control unit 113 via processing control unit 111, a notification showing that processing was requested of external processor 30 and that the plate has been put to sleep.

At this time, switching control unit 113 outputs a processing request signal (described below) to external I/F 117.

FIG. 1 shows a state of virtual multiprocessor 100 and context memory 200 at an arbitrary point in time, and thus the fact that "(plate B)" appears alongside processing execution unit 110 in FIG. 1 shows that, at the arbitrary point in time, a context corresponding to plate B is stored in first register group 114, and that first register group 114 is selected as the current register group.

The input/output of data within virtual multiprocessor 100, and the input/output of data between external processor 30 and context memory 200, main memory 10 and the cache memory is performed by a DMA transfer, and DMA management unit 118 controls the DMA transfer.

Furthermore, when DMA management unit 118 performs a DMA transfer based on a request from one of the functional units, and the DMA transfer is completed, DMA management unit 118 outputs a signal (hereafter, "transfer-complete signal") showing that the DMA transfer has been completed to switching control unit 113, attempts to obtain a program and data from cache memory, and if a cache miss occurs, DMA management unit 118 outputs a signal (hereafter, "cache-miss signal") showing that the cache miss has occurred to switching control unit 113.

Furthermore, DMA management unit 118 attempts to obtain a program or data from an external storage apparatus (not depicted), and it is judged that access will take time (a large latency), unit 118 outputs a signal (hereafter, "memory-access delay signal") to switching control unit 113 showing that memory latency is large.

External I/F 117 is an interface connected to an external apparatus such as external processor 30, and notifies switching control unit 113 of a signal received from an external source, an example of which includes a signal showing that processing allocated to external processor 30 has been completed.

Furthermore, external I/F 117 notifies external processor 30 of, for example, a processing request signal showing that processing has been requested of external processor 30.

In other words, as described above, when notified by switching control unit 113 of a processing request signal, external I/F 117 outputs the processing request signal to external processor 30.

Processing control unit 111 controls processing execution unit 110 to execute plates continuously from a start to an end of the plate execution.

Cycle counter 116 includes a clock counter, and registers, as an initial value via switching control unit 113 and processing control unit 111, a value (i.e. count value) determined by the execution in processing execution unit 110 of a plate in which a management application is included.

Furthermore, cycle counter 116 conducts a countdown by decrementing a value of "1" per clock starting from the initial value, and when the count value reaches "0", cycle counter 116 outputs a signal (hereafter, "zero-count signal/") showing that the count value has reached zero, and repeats the processing to commence the countdown after again setting the initial value.

Here, the initial count value is a value common to each of the plates.

Control register 120 is a register for storing information that specifies a plate currently being executed and a plate to be executed next.

Specifically, control register 120 stores a value of a table address (hereafter, "current address") of a physical location in which a value of a context address corresponding to a plate currently being executed is stored, and a value of a table address (hereafter, "next address") of a physical location in which a value of a context address corresponding to a plate to be executed next is stored. Control register 120 also stores a value of the smallest table address (hereafter, "table head address") in execution-sequence table storage area 202, and a value of the largest table address (hereafter, "table end address") in area 202.

It is to be noted that the prior art discloses for the use of software, triggered by the occurrence of a wait or a so-called interrupt resulting from a shared resource required to execute a task being used by another apparatus, to (i) suspend the task currently being executed and remove of the task from the execution sequence, (ii) vacate the execution period allotted to the task to another task, and (iii) reschedule the execution sequence and execute the task when the cause that triggered the task suspension is cancelled.

According to the present invention, when a prescribed cause (hereafter, "wait-cause") triggers the suspension of a plate execution, register switching is performed (i.e. plates are switched), "sleep" processing is executed to removed the switched plate from the execution sequence, and when the wait-cause is cancelled, "wakeup" processing is performed to attempt the execution of the plate.

In order to specify a wait-cause for triggering the wake-up processing when the above sleep and wakeup processing is performed, it is necessary to know, for each plate, the wait-cause that causes the sleep processing.

Furthermore, when an interrupt request or the like arrives from an external source, it is necessary to know before receiving such a request, whether the request should be processed.

For this purpose, a context in each plate has an area for storing setting flags that show, for example, the category of the wait-cause that triggered the sleep processing, and whether to process an interrupt request.

As such, the wait-cause has a plurality of categories, and there is a setting flag for each category, or in other words, a setting flag group.

This setting flag group is included in each context stored in context storage area 201.

Setting flag register 121 is a register for storing the respective setting flag groups included in two plates.

When the wait-cause occurs as a result, for example, from a request to suspend a currently executed plate, or a request to suspend the plate execution arriving from an external source, a setting flag (i.e. from among the plurality of setting flags included in a context corresponding to the currently executed plate) that corresponds to the category of the wait-cause is changed by processing execution unit 110 from 0-value to a 1-value.

Among the requests to suspend the plate execution is a so-called interrupt request, although it is not always necessary to suspend a currently executed plate when an interrupt occurs, and thus it is determined for each plate, whether to process the interrupt.

To realize this, in a plate that accepts interrupts, a 1-value (i.e. showing "interrupt enabled") is stored in a setting flag that is for showing whether to process an interrupt request from a program designer.

Completion notification register 119 is a register for storing flags (hereafter, "completion notification flags") that respectively show, for example, whether the wait-cause is currently cancelled, and whether an interrupt request has occurred.

These completion notification flags are equal in number to the number of setting flags included in a single context, and correspond one-to-one with the setting flags existing per category of the wait-cause.

In other words, a bit string length of a completion notification flag group composed of the completion notification flags is the same as a bit string length of a setting flag group composed of the setting flags. Moreover, bits positioned an equal distance from a head of each bit string store values that relate to the same wait-cause.

When a zero-count signal is received from cycle counter 116, or when a notification showing that a plate has been put to sleep is received from processing execution unit 110, or when a cache-miss signal is received from DMA management unit 118, or when a memory-access delay signal is received, switching control unit 113 performs flag judgment processing (described below) in order to judges whether to leave the current value in the next address as is, or whether to set the value of another table address as a new next address value, and while reviewing the next address value, unit 113 stores the next address value stored in control register 120 as a new current address value, stores the next largest table address value (i.e. next largest after the current value of the next address) as a new next address value, and instructs register switching unit 112 to perform the above register switching.

Furthermore, switching control unit 113 refers to the update flags of each register in the register group that is the current standby register group as a result of the register switching having been performed, instructs DMA management unit 118 to executed saving by overwriting a register value stored in a register whose update flag has a 1-value into a storage area in context storage area 201 that corresponds to this register value (i.e. the place from which the register value, prior to being changed, was read when stored in the register group), and performs flag judgment processing (described below).

Furthermore, following the saving, switching control unit 113 reads the setting flag of the saved context from setting flag register 121, and saves the value of the setting flag by overwriting a storage area in context storage area 201 that corresponds to this setting flag (i.e. the place from which the setting flag was read when stored in the setting flag register 121).

When the saving and flag judgment processing is completed, switching control unit 113 stores a context of a plate specified by a next address value in control register 120 (i.e. unit 113 performs restoring).

At this time, switching control unit 113 clears the setting flag of each register to a 0-value.

Switching control unit 113 performs the saving, flag judgment processing and restoring in parallel with the execution of plates by processing execution unit 110 using a context stored in the current register group.

The time span of the register switching is determined by a management application or the like, so that the time period required to perform the saving, flag judgment processing and restoring is shorter than the plate execution period.

The details of the flag judgment processing in switching control unit 113 will now be described.

Switching control unit 113 determines the position of a bit storing a 1-value (hereafter, an "effective bit") in the bit string of a setting flag group included in a context that exists in context storage area 201 and that is specified by the next address value in control register 120.

Here, the processing to determine the position of the effective bit is referred to as effective bit position retrieval processing.

When no effective bit is retrieved from the bit string of setting flag group, switching control unit 113 leaves the value of the next address unchanged, and terminates the flag judgment processing.

When there is at least one effective bit in the bit string of setting flag group, switching control unit 113 refers to only a position corresponding to the position of the one or more effective bits in the bit string of completion notification flag group in completion notification register 119, and if a 1-value is stored in all of the positions corresponding to the position of the one or more effective bits, switching control unit 113 leaves the value of the next address unchanged, and terminates the flag judgment processing.

Here, "a position corresponding to the position of an effective bit" refers to a position (hereafter, "effective bit corresponding position") distanced from the head of the bit string of the completion notification flag group by the same number of bits as the effective bit is distanced from the head of the bit string of the setting flag group.

On the other hand, when a 0-value is stored in any of the effective bits corresponding positions in the completion notification flag group, switching control unit 113 provisionally sets, as the new next address value, the next largest table address value after the value of the next address presently shown in execution-sequence-table storage area 202.

Then, after performing effective bit position retrieval processing with respect to the setting flag included in the context specified by a value of the provisional next address, switching control unit 113 repeatedly performs, until the flag judgment processing is completed, processing to review the next address in accordance with a value of an effective bit corresponding position in the completion notification flag group.

Here, when the value of the present next address is the value of the table end address, the next largest table address value after the next address value is the value of the table head address.

2. Data

The following description relates to data used in virtual multiprocessor 100.

Figure 2:
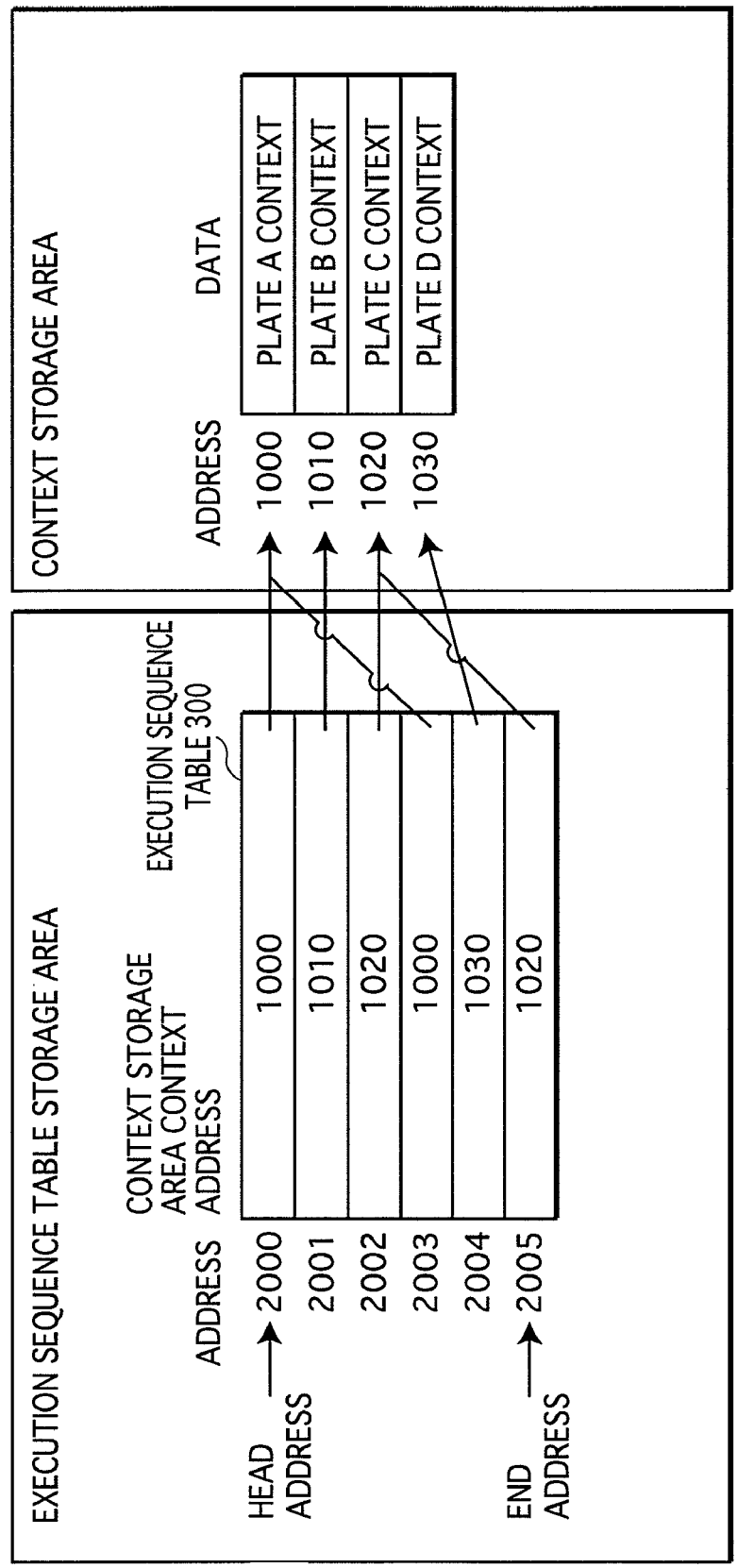
FIG. 2 shows a data structure of contexts and a table stored in a context memory.

FIG. 2 shows a data structure of contexts and execution sequence table 300 and stored in context memory 200.

Execution sequence table 300 shows a plurality of context address values of contexts stored in context storage area 201, and determines the physical storage location of these context address values (i.e. the execution sequence of plates whose table address is specified by a context address).

In other words, the smaller the table address value allotted to the place in which a context address is stored, the higher up will be the execution sequence of the plate corresponding to the context address.

Although sometimes the execution sequence of the plates is skipped as a result of the flag judgment processing, basically the plates are executed according the physical storage location of corresponding context address values (i.e. the sequence shown by the array), and after the plate specified by the count address (i.e. when the table end address is the count address) has been executed, the plate specified by setting the table head address as the count address is executed.

In other words, the physical storage locations of a context addresses (i.e. the table addresses) shows one cycle of a plate execution sequence.

In FIG. 2, the table addresses have values from 2000 to 2005, and in this case, the value of the table head address is 2000, and the value of the table end address is 2005.

The smaller the value of the table address in which a context address of a plate is stored, the higher up is the execution sequence of the plate.

Figure 3:
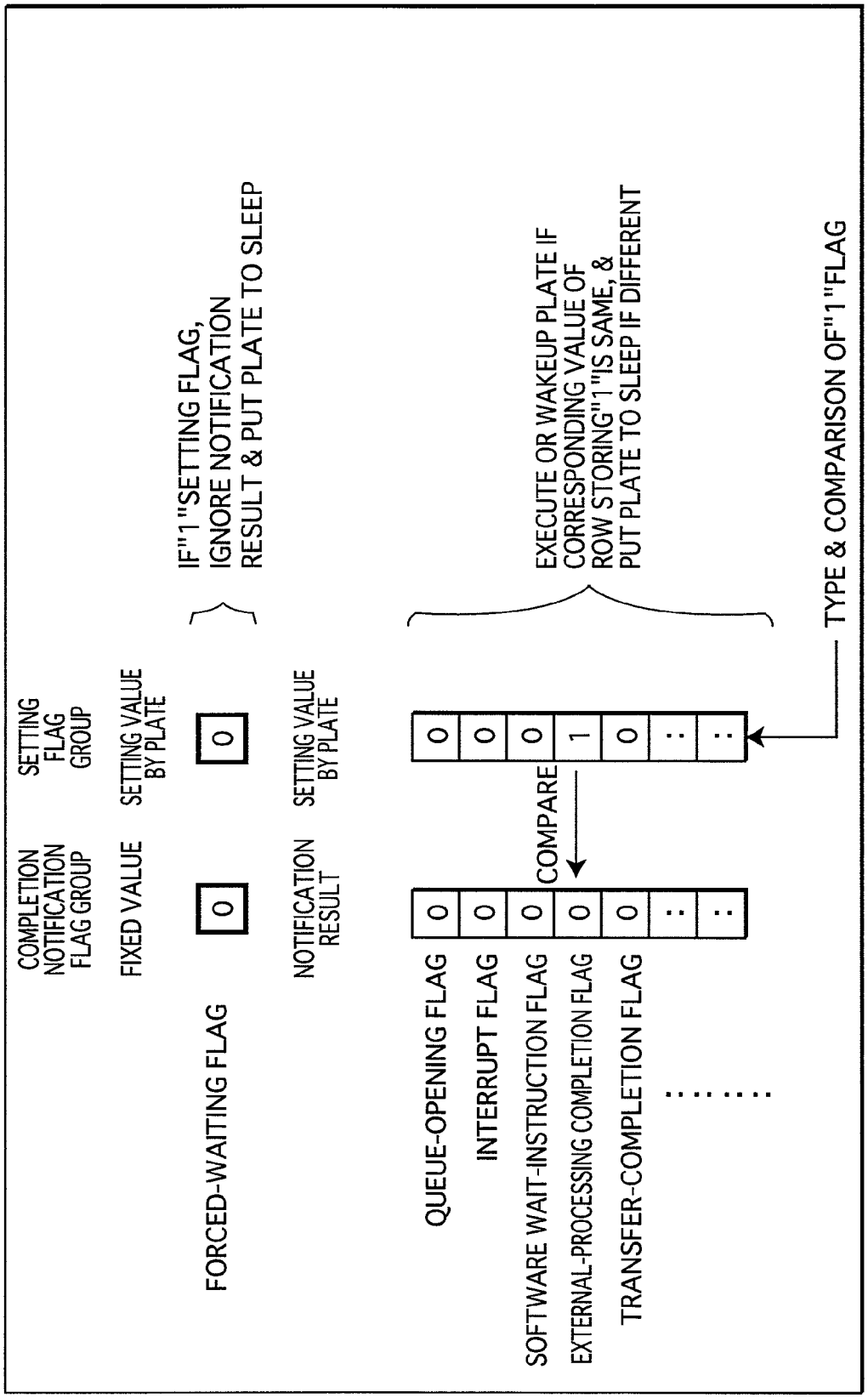
FIG. 3 depicts flags in a completion notification flag group and a setting flag group.

FIG. 3 depicts the flags in the completion notification flag group and the setting flag group.

The completion notification flag group has a forced-waiting flag, a queue-opening flag, an interrupt flag, a wait-instruction flag, an external-processing completion flag, a transfer-completion flag, and the like.

The forced-waiting flag is a flag constantly storing a 0-value.

The queue-opening flag is a flag that shows whether a notification showing there to be no opening in a queue has arrived from an external device for managing the queue, when, for example, an attempt is made to queue a command or the like in a queue having few openings in terms of capacity. This flag has a 0-value when there is not space in the queue, and a 1-value when there is space in the queue.

The interrupt flag is a flag showing whether an interrupt request has arrived from an external device. This flag has a default value of "1" when an interrupt request has not arrived, and is set to a 0-value by switching control unit 113 when an interrupt request arrives.

The wait-instruction flag is a flag that shows whether an instruction has been received from application software and the like to delay the plate execution. This flag has a default value of "1" when the above instruction has not arrived, and is set to a 0-value by switching control unit 113 when the above instruction arrives.

The external-processing completion flag is a flag that shows whether a notification has arrived showing that requested processing has been completed (i.e. shows, for instance, the completion of a DMA transfer that was the cause for a cache-miss signal or a memory-access delay signal to occur, or the completion of a DMA transfer requested by a program), when processing is requested of external processor 30 at a time of the plate execution. This flag has a default value of "0" when a notification has not arrived, and is set to a 1-value by switching control unit 113 when a notification arrives showing the completion of the requested processing.

The transfer-completion flag is a flag that shows whether a notification has arrived showing a DMA transfer to be completed. This flag has a default value of "0" when a notification has not arrived, and is set to a 1-value by switching control unit 113 when a notification arrives showing the completion of a DMA transfer.

Here, with respect to each of the above flags, when a new plate is executed using a flag as a trigger, the value of the flag is reset to the above default value by switching control unit 113 after the plate is executed.

The flags structuring the setting flag group correspond to the flags in the completion notification flag group, and show whether to ignore a corresponding flag.

When a setting flag structuring the setting flag group included in a context has a 0-value, a plate is executed based on the context, and the value of the corresponding completion notification flag is not affected.

Furthermore, when a setting flag has a 1-value, it is judged by switching control unit 113 whether to set, as an execution target, a plate corresponding to a context that includes the setting flag.

Here, for example, a setting flag will store a 1-value if the wait-cause occurred when a plate corresponding to a context that includes this setting flag was previously executed, and this resulted the execution of the plate being suspended and the plate being reverted to a sleep state until the wait-cause is cancelled.

Specifically, when corresponding completion notification and setting flags both have a 1-value, a plate corresponding to a context that includes the setting flag is targeted for execution, and when corresponding completion notification and setting flags have a 0-value and 1-value, respectively, the plate corresponding to the context is not targeted for execution (i.e. the plate is removed from the execution sequence).

In other words, when corresponding completion notification and setting flags both have a 1-value, the plate corresponding to the context that includes the setting flag is "woken up" by switching control unit 113, and when corresponding completion notification and setting flags have a 0-value and 1-value, respectively, the plate reverts to a sleep state.

Furthermore, when the setting flag has a 0-value, the a wait-cause category corresponding to the place in which the 0-value is stored is ignored by switching control unit 113, and a completion notification flag corresponding to this wait-cause is not referred to.

Figure 4:
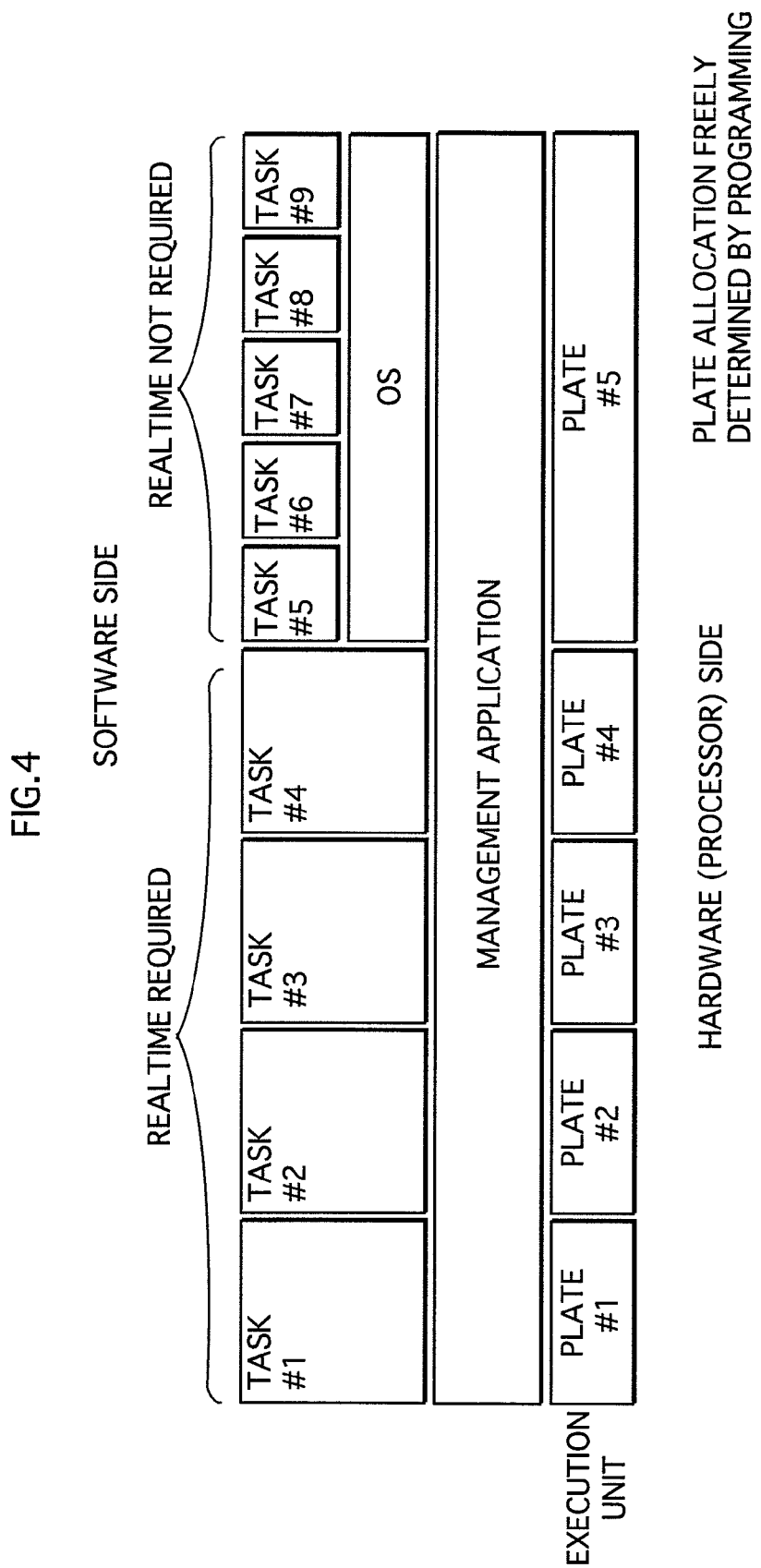
FIG. 4 shows a relationship between tasks and plates.

FIG. 4 shows a relationship between tasks and plates.

On the software side there exist a plurality of tasks, and tasks for processing realtime are placed under the direct management of a management application and are not managed via the OS.

Here, a management application for updating the content of execution sequence table 300 is included in each task for processing realtime, and if, for example, new processing is to be executed when it comes time to execute the task (i.e. plate), the content of execution sequence table 300 is updated by processing execution unit 110.

In this way, every time a cycle of plates is executed, there is at least one opportunity to review the scheduling of the tasks.

Specifically, every time a plate corresponding to a management application is executed, the management application judges whether one of the above condition has occurred, and if judged that a condition has occurred, the management generates a dummy table (i.e. an execution sequence table having new content) in execution-sequence-table storage area 202, and updates the execution sequence table forming the basis of plate execution by switching from the current execution sequence table 300 to the dummy table.

On the other hand, tasks that do not require realtime processing are firstly placed under the management of the OS, and then placed under the management of a management application.

A plate, on the hardware side, is a single execution unit in processing execution unit 110, and may be a single task or a collection of a plurality of tasks, and the assigning of the plates is freely determinable by programming.

3. Operation

The following description relates to processing that realizes efficient plate execution in virtual multiprocessor 100 when plates are executed in a pseudo-parallel manner by a single processor.

Figure 5:
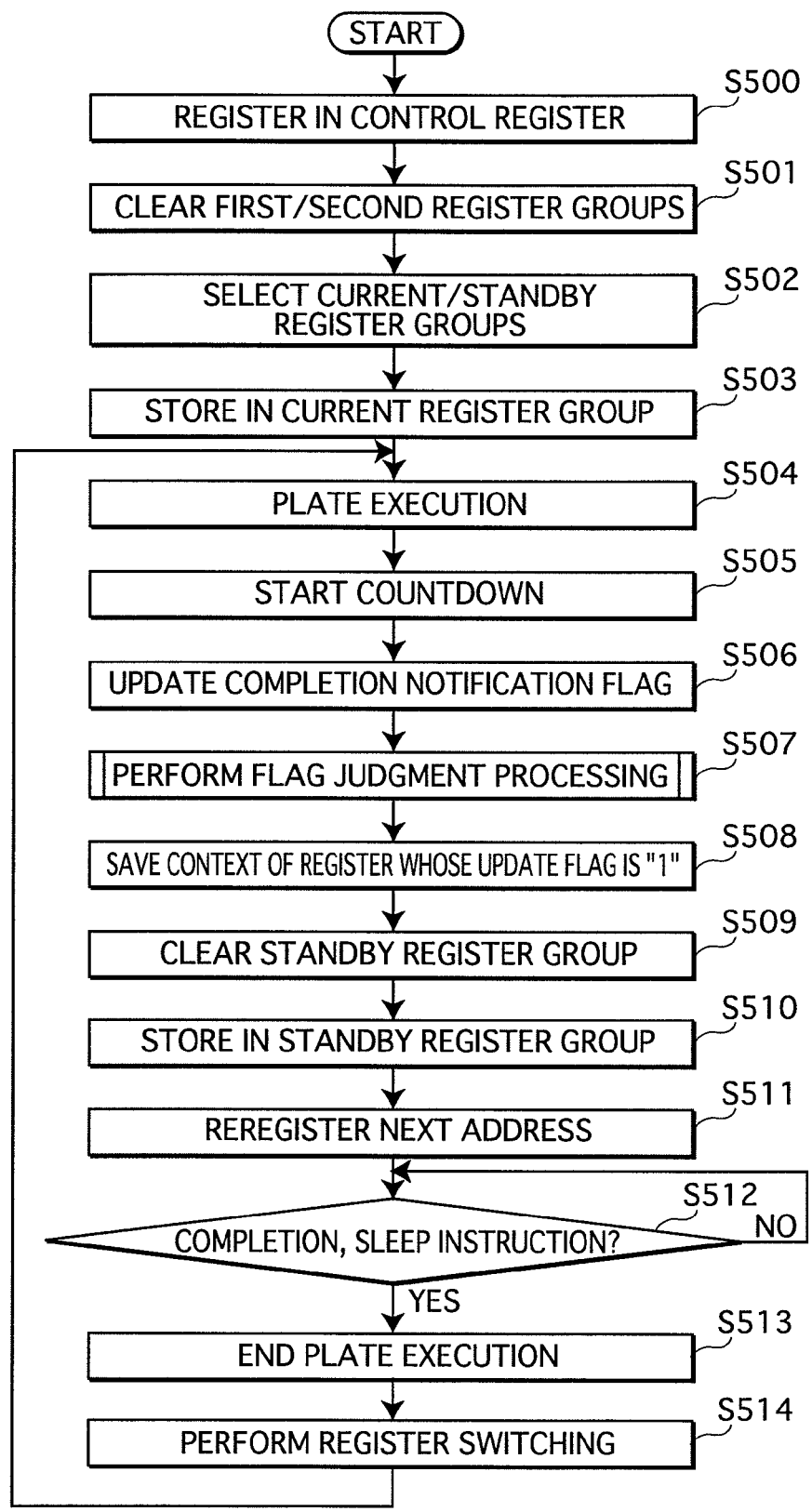
FIG. 5 is a flowchart that shows processing performed in the virtual multiprocessor.

FIG. 5 is a flowchart that shows processing performed in virtual multiprocessor 100.

Switching control unit 113 refers to execution sequence table 300 in context memory 200, and registers the table head address, the current address, the next address and the table end address in control register 120 (step S500).

Unit 113 clears all the values in first register group 114 and second register group 115 (step S501).

Unit 113 selects a current register group and a standby register group from out of first and second register groups 114 and 115 (step S502).

Unit 113 then stores a context specified by the current address in the current register group (step S503).

Next, unit 113 gives a plate execution instruction to processing execution unit 110 via processing control unit 111, and as a result, processing execution unit 110 commences the plate execution based on the context stored in the current register group (step S504).

When the plate execution is started, cycle counter 116 starts a countdown from an initial value that is set as a result of the plate execution (step S505).

Switching control unit 113 receives a signal input from external I/F 117 and DMA management unit 118, and updates the value of the completion notification flag in completion notification register 119 according to the inputted signal (step S506).

Unit 113 then performs the flag judgment processing in order to set the value of the next address in control register 120 (step S507).

Next, unit 113 saves only the context in the registers structuring the standby register group, whose setting flag has a 1-value (step S508), and clears all the values stored in the standby register group (step S509).

Furthermore, unit 113 stores, in the standby register group, a context specified by the next address in control register 120 (step S510).

Unit 113 then reregisters the next address in control register 120 as the current address, and reregisters the address following the next address as the new next address (step S511).

Unit 113 judges whether a zero-count signal has been inputted from cycle counter 116 (i.e. whether the termination of the plate execution has been instructed), whether there has been a notification from processing execution unit 110 showing that a plate being executed has been put to sleep, or whether this notification shows that the plate was put to sleep after processing was requested of external processor 30 (step 512), and if there has been a signal input or a notification, unit 113 has processing execution unit 110 terminate the plate execution, and if the plate was put to sleep after processing was requested of external processor 30, unit 113 has switching control unit 113 notify a processing request signal to external I/F 117, and has external I/F 117 output the processing request signal to external processor 30 (step S513), has register switching unit 112 perform the register switching (step S514), and returns to step S504 to repeat the processing.

On the other hand, if there has not been a signal input or a notification, unit 113 continues the current plate execution and returns to step S512 to judge whether a there has been a notification showing the completion or the sleep-state of the plate.

Figure 6:
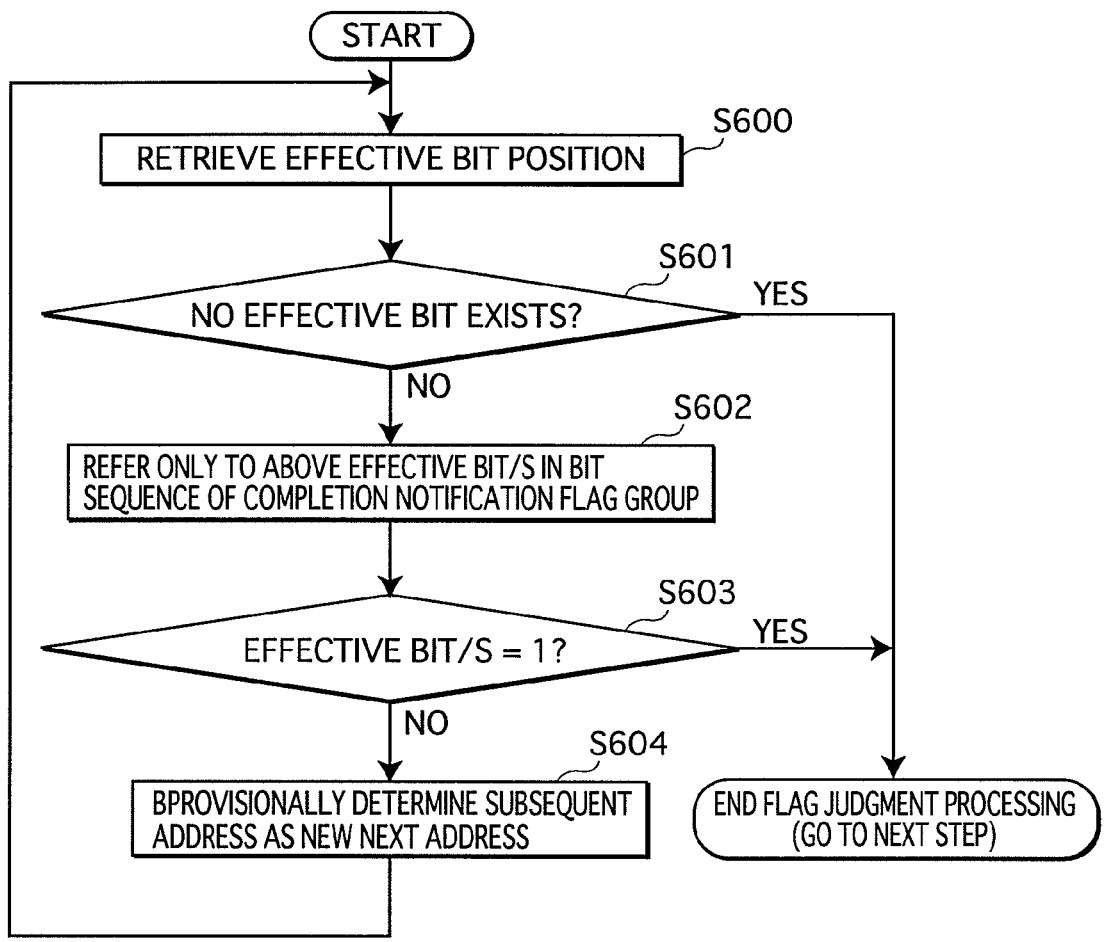
FIG. 6 is a flowchart that shows flag judgment processing.

FIG. 6 is a flowchart that shows the flag judgment processing.

Switching control unit 113 performs effective bit position search processing to determine the position of an effective bit storing a 1-value, from out of the bit string of the setting flag included in a context that exists in context storage area 201 and is specified by the next address in control register 120 (step S600).

Unit 113 then judges whether not even one effective bit exists (step S601), and if not even one effective bit exists, unit 113 leaves the value of the next address in control register 120 unchanged, and terminates the flag judgment processing.

On the other hand, if one or more effective bits exist, unit 113 refers to only the position of the one or more effective bits in the bit string of the completion notification flag group in completion notification register 119 (step S602), and judges whether a 1-value is stored in all of the one or more effective bits (step S603).

If the one or more effective bits in the completion notification flag group all store a 1-value, unit 113 leaves the value of the next address unchanged, and terminates the flag judgment processing.

On the other hand, if a 0-value is stored in any of the one or more effective bits in the completion notification flag group, unit 113 provisionally sets, as the new next address, an address subsequent to the next address at the present point in time shown in execution-sequence-table storage area 202 (step S604), and returns to step S600 to repeat the processing.

By performing the above processing, virtual multiprocessor 100 is able to execute plates without having to interject the time required for the saving, judging and restoring of contexts between the completion of one plate and commencement of the next plate.

Figure 7:
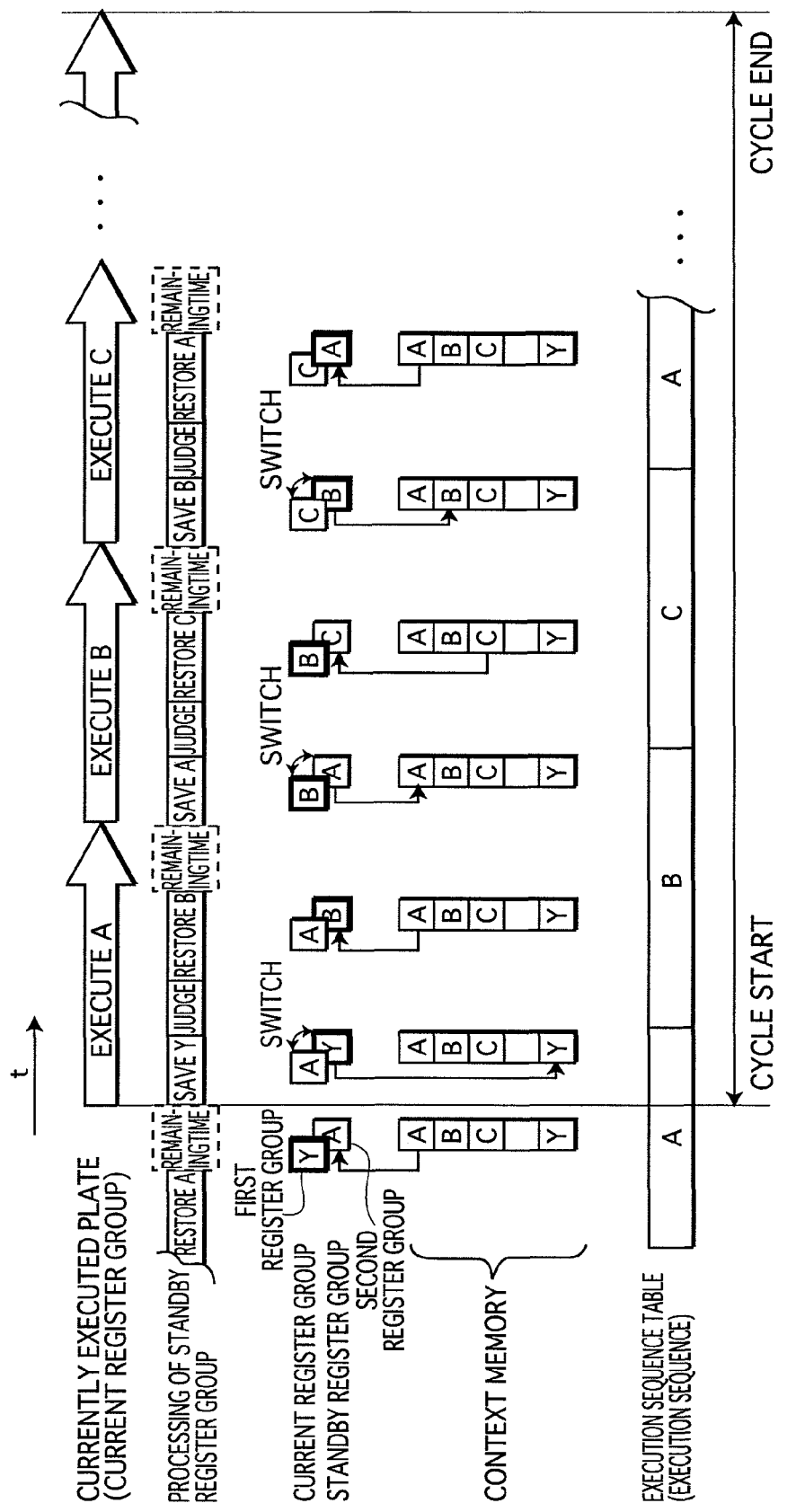
FIG. 7 depicts, in time series, the processing performed in the virtual multiprocessor.

FIG. 7 shows the above state in time series.

The saving, judging and restoring of contexts is performed in parallel with the execution of plates.

As such, the interjecting of the time required for the saving, judging and restoring of contexts between the completion of one plate and commencement of the next plate is avoided.

As described above, according to the present embodiment, it is possible to efficiently execute tasks, even when a plurality of plates is executed in a pseudo-parallel manner by a single virtual multiprocessor 100, this being because the time required for the saving, judging and restoring of contexts is not interjected into the plate execution period, due to the saving, judging and restoring of contexts being performed in parallel with the execution of plates.

Here, in the present embodiment, execution sequence table 300 shows the execution sequence of the plates, and general execution sequence of the plates is determined by the physical storage locations (i.e. array) of context address values in execution sequence table 300. However, other methods are possible. For example, a context address value and a table address value may be stored as a pair in execution sequence table 300, and the execution sequence of the plates may be determined by the table address showing the physical storage location of the context address value corresponding to the next execution sequence (i.e. by using the table address value as a pointer).

In this case, the execution sequence is not affected by the physical storage location of a stored context address values, and, moreover, the execution sequence can be easily altered by changing the pointers.

Figure 8:
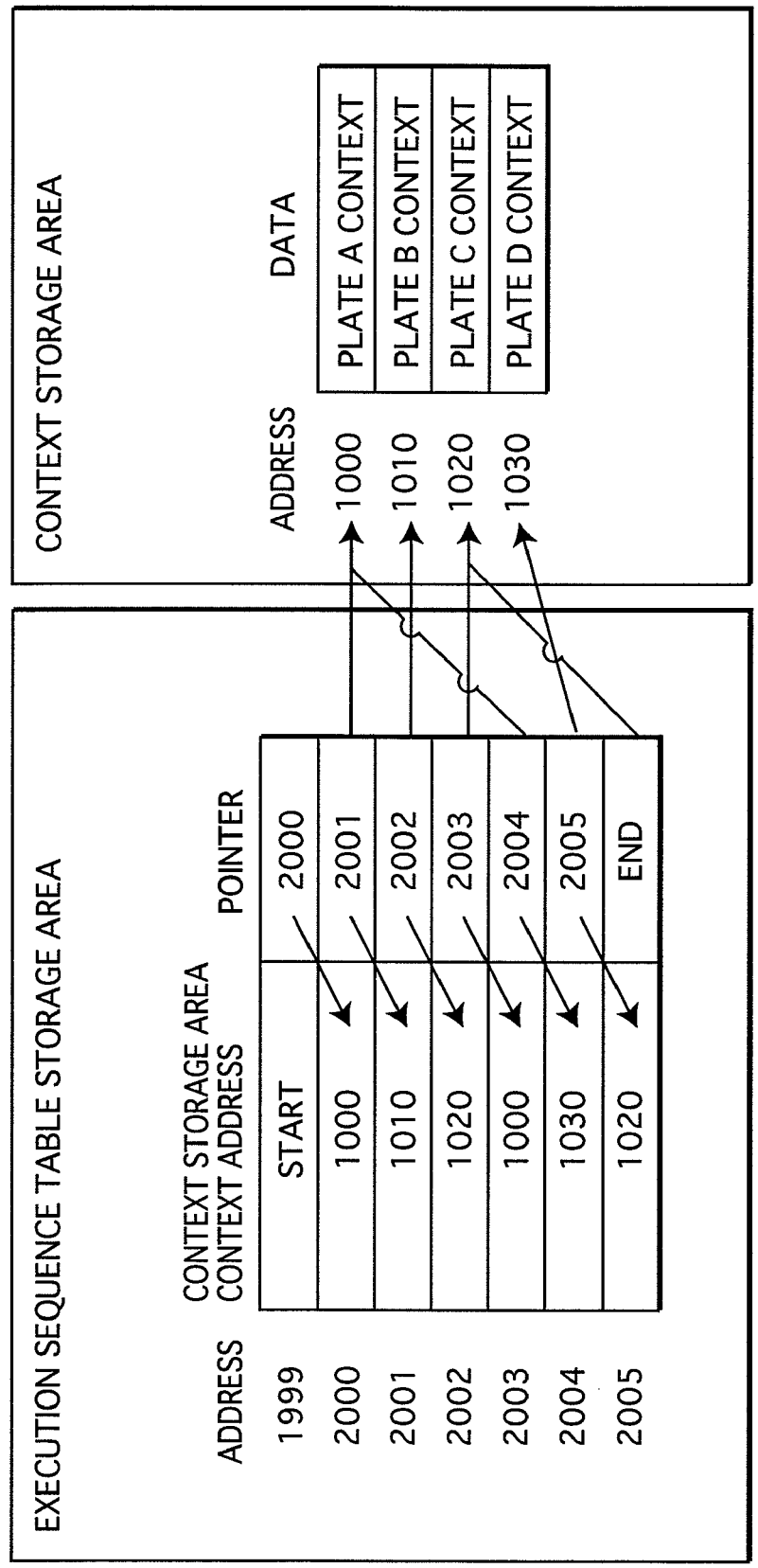
FIG. 8 shows a data structure of a table that uses a pointer to show an execution sequence.

FIG. 8 shows a data structure in a table that shows an execution sequence when the above pointer is used. In order to show the correspondence with the storage location of the contexts, FIG. 8 also shows a data structure in context storage area 201.

This execution sequence table stores, as a pair, a context address and a table address as a pointer showing the next execution sequence.

Furthermore, in the present embodiment, a plate that has been put to sleep is woken up when the execution sequence of the plate as stipulated in execution sequence table 300 comes around, by switching control unit 113 performing the flag judgment processing based on the execution sequence shown by execution sequence table 300. However, when the flag judgment processing is performed, unit 113 may referring with priority to the setting flag group in the context of the sleeping plate, and if the conditions for wakeup are satisfied, the sleeping plate may be executed without waiting for the execution sequence of the plate.

Figure 9:
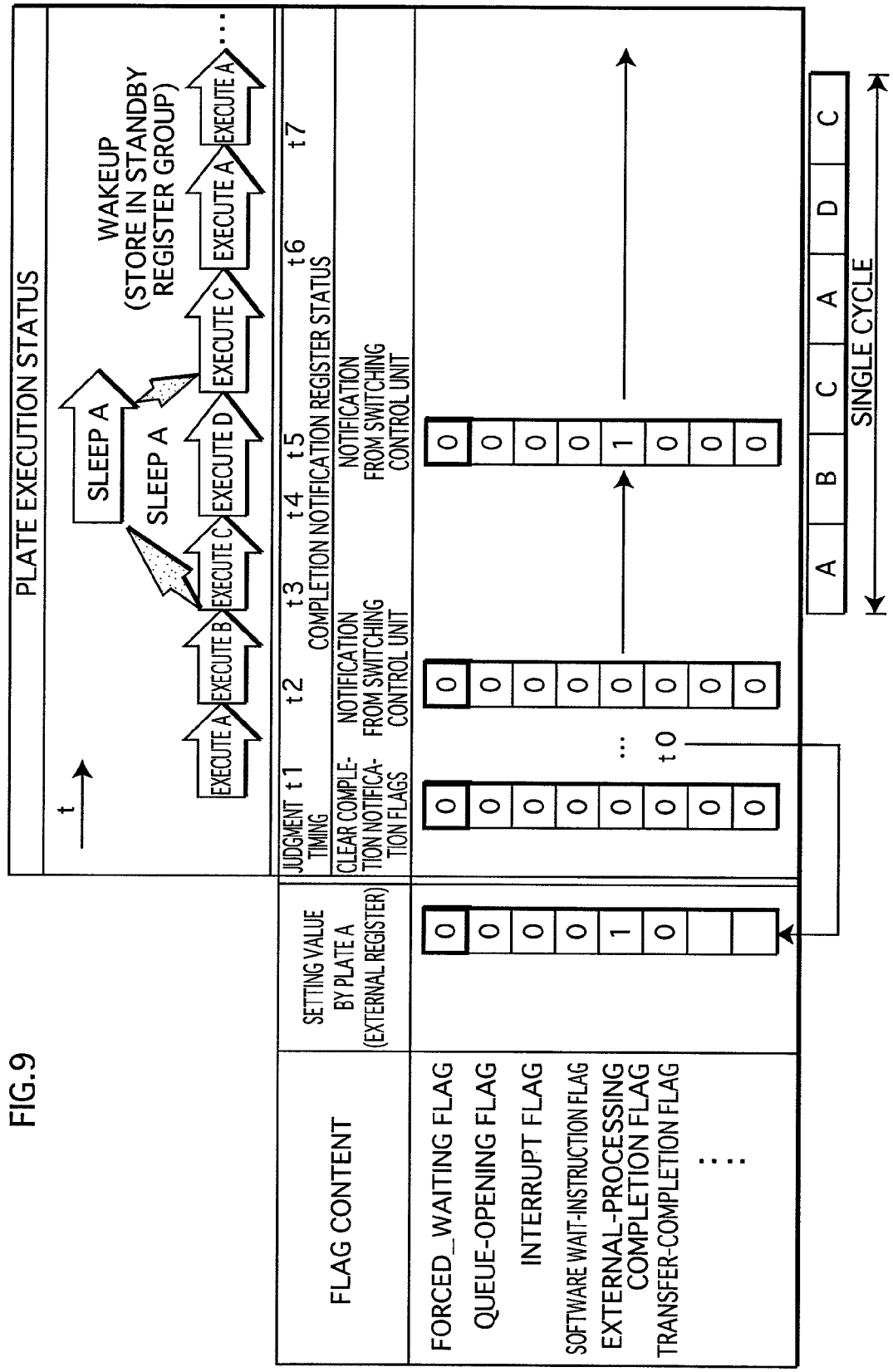
FIG. 9 shows, in time series, a plate execution status when the flag judgment processing is performed with priority given to a context of a sleeping plate.

FIG. 9 shows, in time series, a plate execution status in the above case.

At time t0, a request is made to external processor 30 to process a plate A, and plate A is put to sleep until a processing result is received from external processor 30.

The following description relates to the putting to sleep of a plate.

After writing input data for processing performed by external processor 30 into main memory 10, virtual multiprocessor 100 output processing request signal, requests processing of external processor 30, and puts the plate to sleep.

External processor 30 operates to fetch a command from main memory 10, reads input data for processing from main memory 10, performs the requested processing, and writes data resulting from the processing into main memory 10.

Next, external processor 30 outputs a processing completion signal, and notifies virtual multiprocessor 100 that the processing has been completed.

When notified of the completion of the processing, virtual multiprocessor 100 again executes the plate that was sleeping by performing flag judgment processing and the like as described above, and reads data resulting from the processing performed by external processor 30 from main memory 10.

By executing a plate in this way, virtual multiprocessor 100 requests processing of an external processor, and puts the plate to sleep unit a processing result is received from the external processor.

The operations will now be described in detail.

Firstly, at time to, the value of the external-processing completion flag in the setting flag group is changed to "1".

From t2 to t4, the flag judgment processing is performed with priority given to plate A, although because the external-processing completion flag has a 0-value, plate A is not woken up.

At t5 (i.e. during the execution of plate D), the external-processing completion flag reverts to a 1-value, and thus plate A is woken up.

Following the wakeup, switching control unit 113 stores a context of the woken-up plate in the standby register group.

Then, at t6, unit 113 has register control unit 112 perform the register switching.

Processing execution unit 110 then executes plate A based on a context, stored in the current register, that corresponds to plate A.

Here, subsequent executions of plate A are conducted when the regular execution sequence of plate A comes around.

Furthermore, although one sleeping plate is shown in FIG. 9, a plurality of sleeping plates is conceivable, and in this case, the flag judgment processing may be performed with priority given to a context of the plate put to sleep earliest, or alternatively, the flag judgment processing may be performed with priority given to a context of the plate put to sleep latest.

Figure 10:
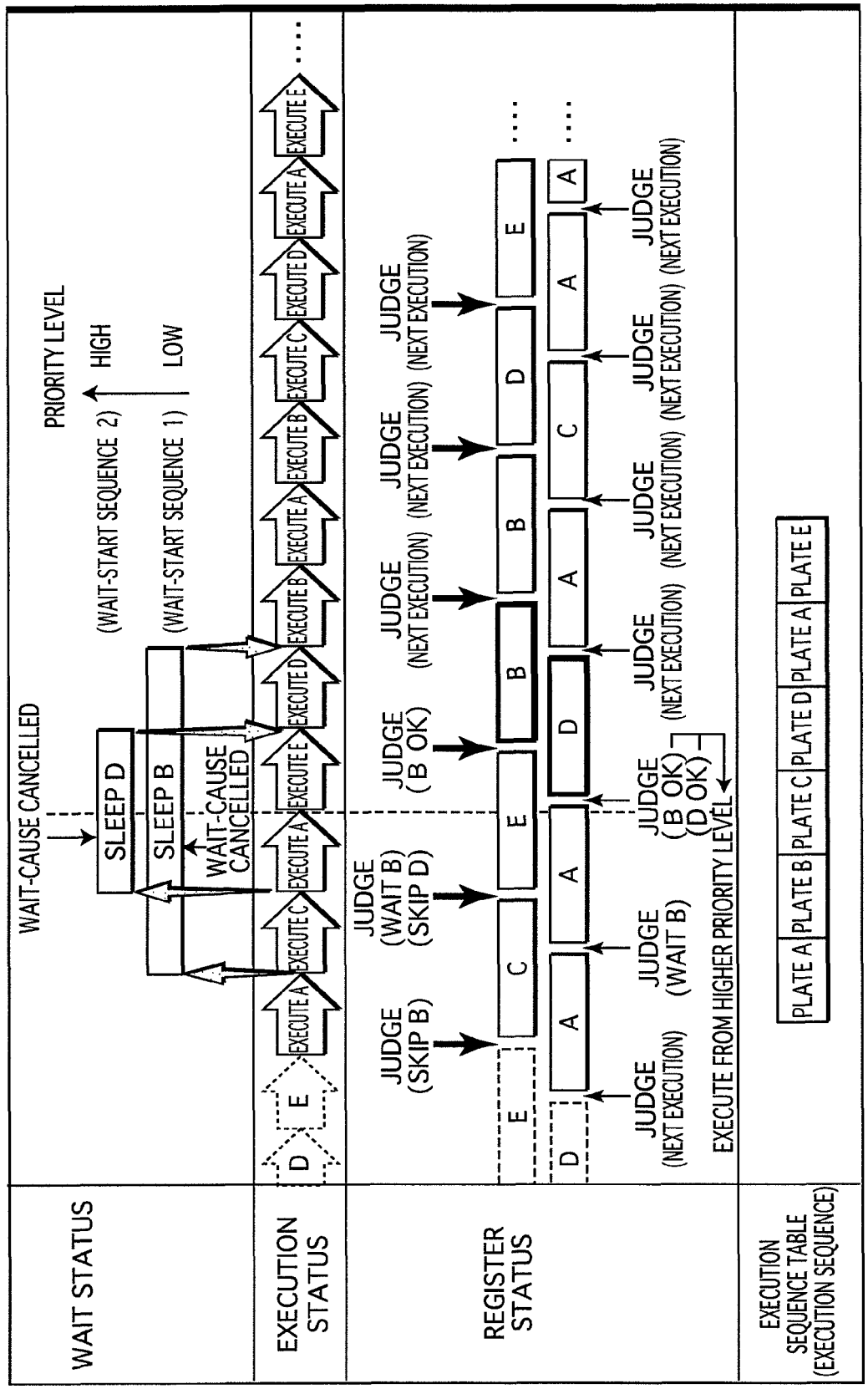
FIG. 10 shows, in time series, a plate execution status when the flag judgment processing is performed with priority given to a context of a plate that was put to sleep latest.

FIG. 10 shows, in time series, an example of the flag judgment processing being performed with priority given to a context of a plate that was put to sleep latest.

Plate D is put to sleep after plate B, and in the fifth judgment shown in FIG. 10, it is judged whether plate B and plate D are in an executable state, and priority is given to the waking up of plate D (i.e. plate that has been sleeping for the shortest period at this point in time), after which plate B is woken up.

The reason for this is because the execution sequence of a plate put to sleep first is closer than that of a plate put to sleep later, and so if the plate put to sleep first is woken up and executed, the execution sequence of that plate will soon come around again, and thus the interval between executions of the plate at this point in time will be extremely short, and there is a possibility that the execution periods of the plates will not be uniform.

Furthermore, in the above flag judgment processing described using FIGS. 9 and 10, the above priority can be removed if the sleep period of a plate exceeds a determined period.

Furthermore, in the present embodiment, the completion notification flag group and the setting flag group each have a forced-waiting flag, a queue-opening flag, an interrupt flag, a wait-instruction flag, an external-processing completion flag, a transfer-completion flag, and the like, although other flag may be provided.

For example, when two or more plates are sleeping, it is unclear which plates the various completion notification flags correspond to.

In this case, a flag to which a number identifying a plate is corresponded may be provided in the completion notification flag group and the setting flag group. In other words, when a sleep-state occurs, processing execution unit 110 may be made to generate a unique number that specifies the plate currently being executed, and this number may be registered in the flag provided in the setting flag group, as well as being notified to the external device that triggered the sleep-state.

When the wait-cause is cancelled, the above number may, for example, be notified by the external device (e.g. external processor) together with an external processor processing management signal or the like, and in addition to the external-processing completion flag being changed to a 1-value, the flag showing the number may also be changed to a 1-value, thus making it possible to judge which plate the external-processing completion flag corresponds to.

Furthermore, in the present embodiment, an example is given in which the execution period allotted to a plate currently being executed is relinquished and vacated to another plate when the wait-cause occurs. However, instead of vacating the execution period of the plate to another plate, power consumption may be suppressed by reducing the drive frequency of the processor for the period of the relinquishing.

In this case, the total time period allotted for the execution of plates does not change, and so when, for example, the drive frequency of the processor (i.e. the clock frequency) is reduced by half, cycle counter 116 makes two decrements per clock cycle, rather than one decrement per clock cycle.

The time required for the saving, the flag judgment processing and the restoring is described in the present embodiment in terms of the time span of the register switching being determined by a management application or the like to be shorter than the execution period of the plates, although this is actually a constraint that determines the lower value of the time span.

On the other hand, although the constraint determining the upper value of this time span is not specifically described in the present embodiment, this time span defines the limits within which the plates can be executed, and thus when the actual execution period of each plate is performed in an extremely short period with respect to these limits, wasted time will occur in which processing is not conducted. To avoid this wasted time, a management application may determine the upper value of this time span so that the actual execution period of the plates is approximately the same as this time span, and also so that this time span is greater than or equal to the actual execution period of each plate.

It should be noted that in the case of realtime processing such as communication processing and the like, the frequency with which data for processing by plate execution arrives is basically predetermined.

In other words, the processing load of plates in a single cycle is predetermined, and even when one cycle of plates is executed using a time span having an upper and lower value determined as described above, this means nothing if data for processing in the next cycle has not arrived.

In view of this, when a surplus of processing time arises due to the processing capacity of processing execution unit 110 being greater than the processing load of plates for processing in a single cycle, the drive frequency (i.e. the processing capacity) of the processor in processing execution unit 110 may be reduced to a level that prevents a surplus from arising, and thus the actual processing time of each plate is increased.

In this case, when the plates are executed, the wasted time in which processing is not conducted in reduced, and power consumption is also minimized as a result of the reduction in the drive frequency of the processor.

Furthermore, data required for executing a plate to be executed after the plate currently being executed (i.e. the plate corresponding to a context stored in the standby register group) may be stored in a cache in advance.

In this case, it is necessary to provide a functional unit that refers in advance to the context stored in the standby register group, obtains the data required to execute the next plate, and stores the data in a cache.

Furthermore, in order to virtually enlarge the capacity of the main memory beyond its physical capacity, a virtual memory functional unit may be provided in the present embodiment for managing a correspondence (mapping) between logical addresses specified by programs, and physical addresses accessed physically by a processor.

This virtual memory function is prior art.

In this case, the caches may include an address-conversion-table cache for storing an address-conversion table that shows the correspondence (mapping) between logical addresses and physical addresses, and in the address-conversion-table cache may be stored an address-conversion table for converting a logical address showing data required by a plate for executing next into a physical address.

In this case, a functional unit is required for referring to a plate to be executed subsequent to the currently executed plate (i.e. a context stored in the standby register group) prior to execution of the plate, detecting data required to execute the plate, detecting a value in an address-conversion table for converting the logical address of the data into a physical address, and storing the value in an address-conversion-table cache.

Furthermore, although the initial value of the count value in cycle counter 116 is described above as being a value shared by the plates, this initial value may be different for each of the plates.

In other words, this initial value may show a time period allowed for execution of a plate, and may allot a unique plate execution period in accordance with the content of the plate processing.

Figure 11:
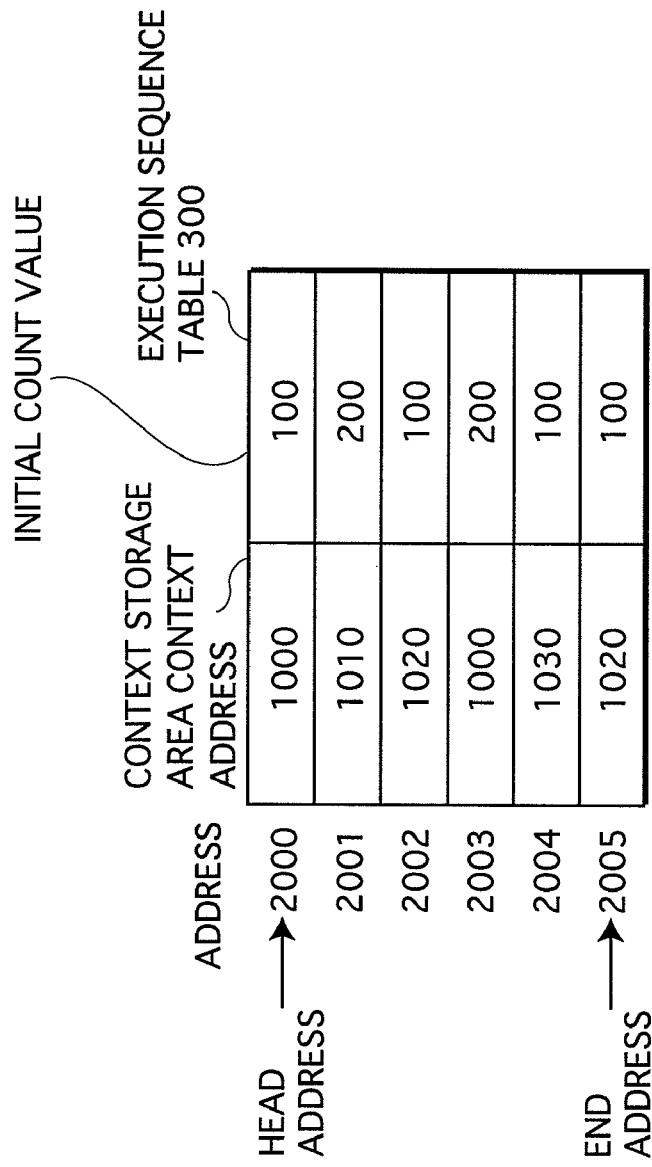
FIG. 11 shows a data structure of an execution sequence table in which an initial value of a count value is attached to a context address.

In this case, as shown in FIG. 11, initial values of the count value are stored so as to correspond to context addresses within execution-sequence-table storage area 202.

Also, switching control unit 113 stores the initial values of the count value so as to correspond respectively to the current address and the next address in control register 120.

Furthermore, as a result of this, cycle counter 116 executes a countdown based on the respective initial values while at the same time eliminating the overhead, and it is thus preferable to provide two cycle counters 116.

Figure 12:
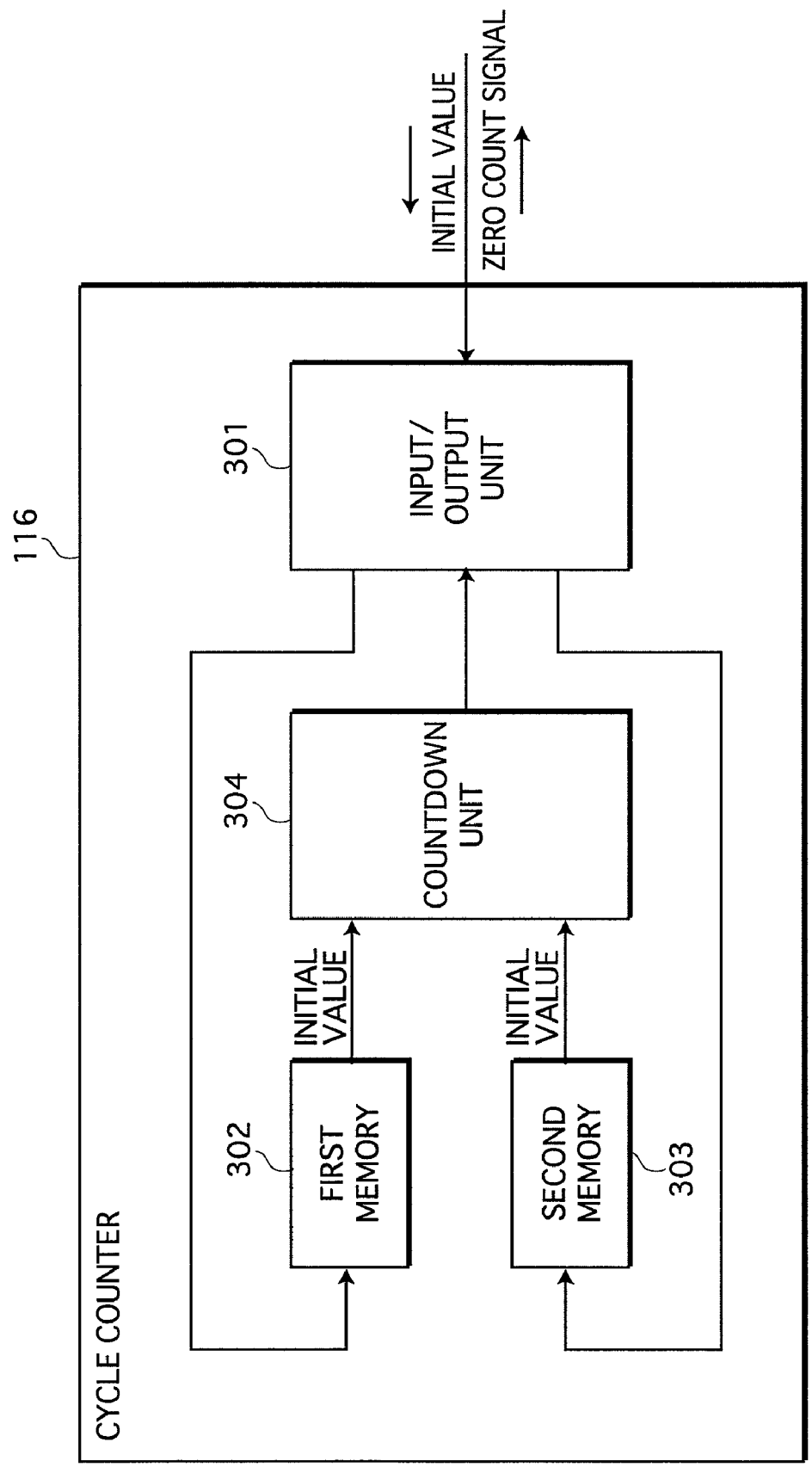
FIG. 12 is a functional block diagram of a cycle counter.

Furthermore, cycle counter 116 may also have the functional unit structure shown in FIG. 12.

In FIG. 12, cycle counter 116 has an input/output unit 301, a first memory 302, a second memory 303, and a countdown unit 304.

Input/output unit 301 outputs a zero-count signal to switching control unit 113 when a signal is received from countdown unit 304.

First and second memories 302 and 303 are FIFO memories.

Countdown unit 304 reads an initial value alternately from first and second memories 302 and 303, and performs a countdown based on the read initial value.

According to this structure, a unique plate execution period can be allotted in accordance with the content of the plate processing.

Furthermore, processing execution unit 110 may execute the plates by pipeline processing that has N number of stages.

Figure 13:
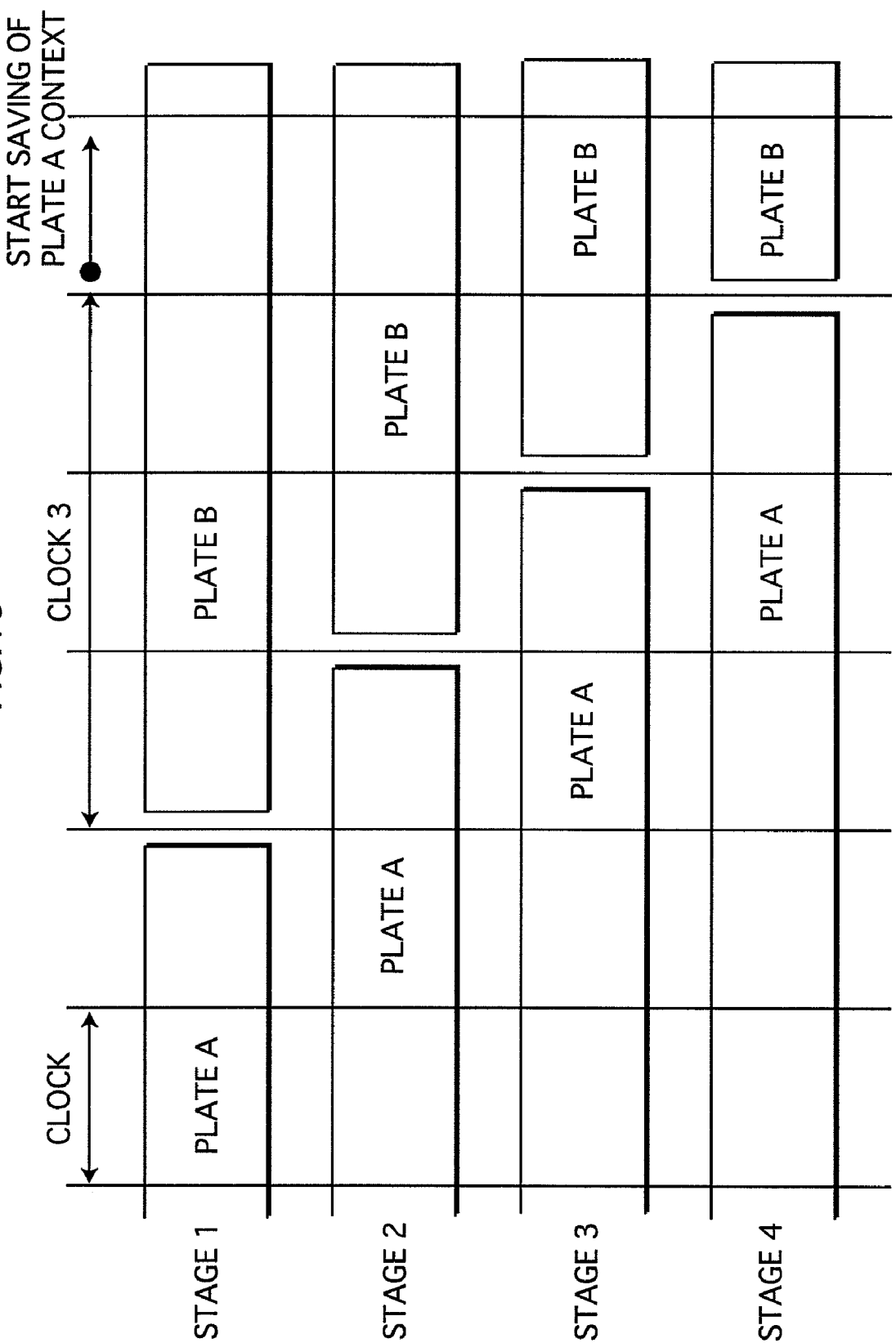
FIG. 13 shows an example of four-stage pipeline processing.

FIG. 13 shows an example of four-stage pipeline processing.

In this case, even when the execution of processing related to plate A is completed at stage 1, plate A is still being executed at stages 2 to 4.

In other words, in this situation, because the register value of the current register group is required, the register value of plate A cannot be saved.

The execution of plate A is completed at stage 4, after three clocks have elapsed since the completion of the execution of processing related to plate A at stage 1, and this the register value of plate A can now be saved.

Consequently, when a plate is executed by N-stage pipeline processing, for example, it will not be possible to save the register value (i.e. the context) until (N−1) clocks have elapsed, even when the execution of the plate at stage 1 has been completed.

Furthermore, according to the present embodiment, once a plate is asleep the only chance to wakeup the plate is at the next execution sequence of the plate shown in execution sequence table 300. However, even when a wait-cause occurs and a plate is put to sleep, it sometimes happens that the wait-cause is cancelled immediately. In view of this, the execution sequence of the sleeping plate may be set at the head of the sequence and executed with priority for the period of a single plate execution immediately after the plate is put to sleep.

Figure 14:
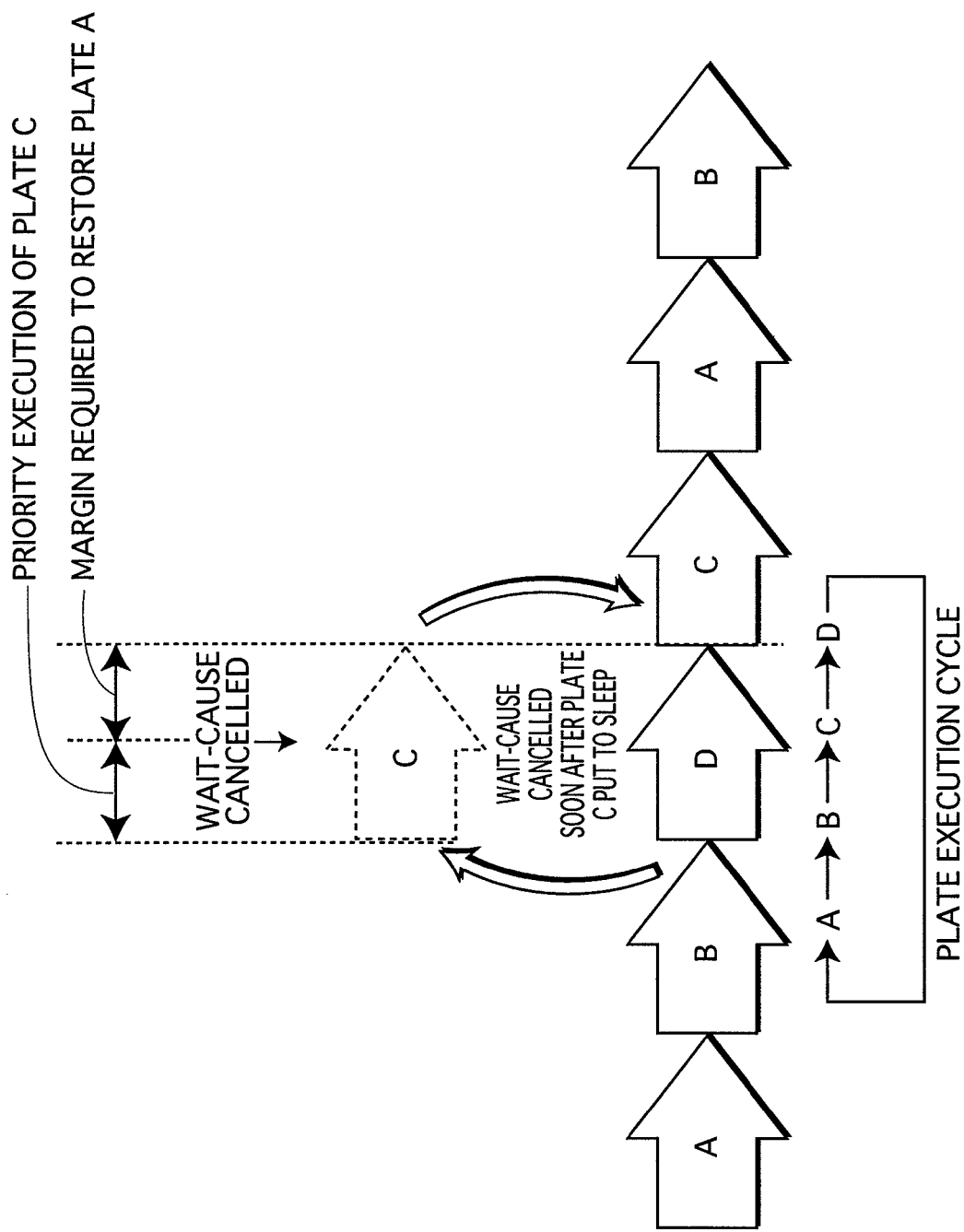
FIG. 14 shows a plate execution flow when the execution sequence of a sleeping plate is set at the head of the sequence for priority execution within the next period of plate execution immediately after being put to sleep.

FIG. 14 depicts a plate execution status when plate execution is conducted in the above case.

In FIG. 14, since the wait-cause that resulted in the sleep-state is cancelled immediately following plate C being put to sleep, the execution sequence of plate C is moved to the head of the sequence during the execution of plate D, and thus plate C is executed after plate D has been executed.

In this case, however, when the cancellation timing of the wait-cause occurs just before the execution completion of plate D, a margin must be allowed for the time required to perform the restoring of plate A (i.e. originally scheduled to be executed after plate D), since there is only one standby register group in the present embodiment.

As a result, the time period (hereafter, "priority period") during which priority is given to the execution sequence of the sleeping plate is, in the case of FIG. 14, shorter than the execution period of plate D.

In order to eliminate this inconvenience, at least three register groups may be provided, and by setting one of these as the current register group, and the remaining two as standby register groups, and by storing a context of plate C and a context of plate A in FIG. 14 in the two register groups at the same time, the above priority period is lengthened until just before the execution completion of plate D.

Furthermore, although the description in the first embodiment is based on the premise that the number of plates is greater than the number of register groups, the present invention is not limited to this structure, and thus the number of plates may be less than or equal to the number of register groups.

In this case, a context storage area need not be provided in the context memory, and restoring and saving steps are not required.

More specifically, steps S508 (saving) and S509 (clearing of standby register group) in FIG. 5 are not required, and the processing in steps S510 and S514 is altered.

In other words, in the first embodiment, step S510 (storing in standby register group) involves processing to store a context specified by the next address in control register 120 determined by the flag judging processing in step S507. However, when a context storage area is not provided, step S510 may be changed to involve processing to have switching control unit 113 select and store, as a subsequent current register group, a register group already corresponded to a context specified by the next address judged in step S507.

Then, in step S514, register switching unit 112 may perform register switching, such that the register group selected as the subsequent register group becomes the current register group.

In this case, switching control unit 113 functions to detect which register group is corresponded to the context specified by the next address, and to store the detected register group, and register switching unit 112 functions to switch the current register group for the register group stored by switching control unit 113.

Here, when there are two plates and two register groups, plate A is corresponded to a first register group, and plate B is corresponded to a second register group.

For example, when plate A is to be executed, switching control unit 113 selects the first register group as the current register group, without performing operations to restore a register value group from the context memory.

Furthermore, even when there are three plates and three register groups (i.e. plates A, B, and C, with plate C being corresponded to a third register group), the register group selected as the current register group is the execution target register group, and the other register groups are standby register groups.

When plate C is to be executed, the third register group is selected as the current register group.

Even after the selection target has been switched, it is not necessary to perform operations to save a register value group to the context memory.

Even in the above structure in which a context storage area is not provided, a plurality of programs are executed rapidly while at the same time being frequently switched every time a predetermined period elapses, and thus this structure is effective in realizing parallel execution by pseudo-realtime processing.

Furthermore, in the first embodiment, context memory 200 is constituted by SRAM, but may be DRAM. Moreover, context memory 200 is not limited to these types of memory, and may be a register that allows for quick access, an external storage apparatus that allows for quick access, or the like.

Furthermore, although in the first embodiment a management application is included in a single plate, a management application may be included in a plurality of plates.

Second Embodiment

1. Structure

A second embodiment will now be described in detail while referring to the drawings.

Figure 15:
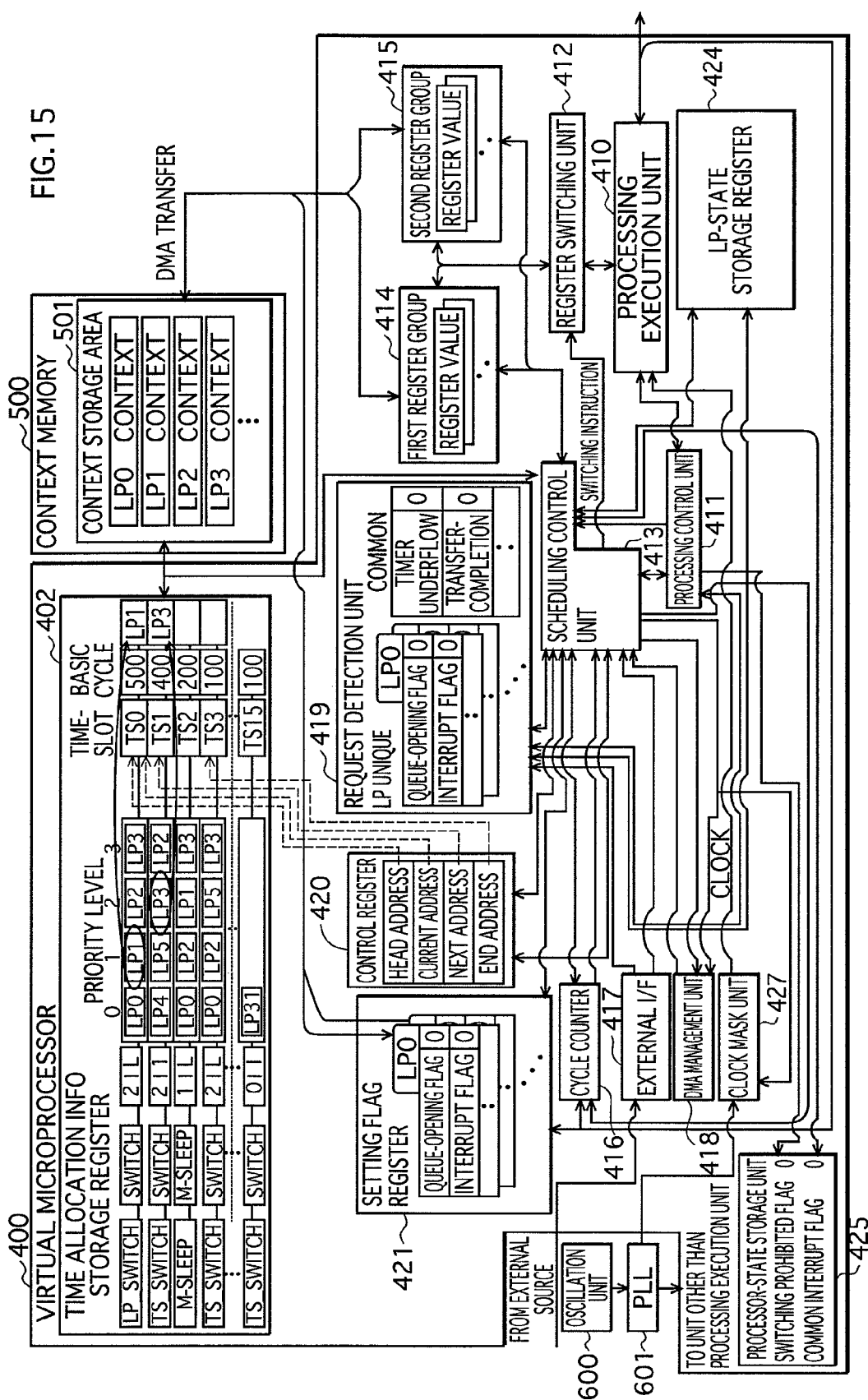
FIG. 15 is a functional block diagram of a virtual multiprocessor according to a second embodiment.

FIG. 15 is a functional block diagram of a virtual multiprocessor 400 according to the second embodiment.

Similar to virtual multiprocessor 100 in the first embodiment, virtual multiprocessor 400 is a processor that executes a plurality of programs in a pseudo-parallel manner.

Virtual multiprocessor 400 executes a plurality of programs in a pseudo-parallel manner by sequentially executing a program allotted to each of a plurality of timeslots.

Here, a "timeslot" (or simply "TS") is the smallest program execution timeframe in the case of programs being executed using time-sharing.

In virtual multiprocessor 100 of the first embodiment, the plates (i.e. the program execution sequence) are stipulated directly. However, the virtual multiprocessor 400 of the second embodiment differs from the first embodiment, in that the timeslot sequence is firstly stipulated, and then candidates of the programs to be executed in each timeslot are provided.

More specifically, either a single program or four programs are corresponded to each timeslot, the corresponded program being an allotment candidate of the timeslot, and normally one of these programs is targeted for allotment.

In principle, the programs allotted to each timeslot are executed sequentially based on the stipulated timeslot sequence.

Furthermore, the processing content in virtual multiprocessor 400 when a program targeted for allotment is in an unexecutable state differs from that of virtual multiprocessor 100 in the first embodiment.

Here, for the sake of convenience, a program targeted for execution as seen from the processor side is referred to as a "logical processor" (hereafter, "LP").

FIG. 15 also shows a context memory 500 in which information (i.e. contexts), such as program counter values showing program execution positions, and addresses showing storage locations of programs and data, is stored.

Context memory 500 is structured from SRAM, and has a context storage area 501 in which contexts corresponding to the programs are stored.

Context storage area 501 is in a predetermined storage area within context memory 500, and stores context values corresponding to the programs.

Furthermore, FIG. 15 shows an oscillator 600 for generating a reference signal, and a PLL (phase-locked loop) 601 for generating a clock pulse that is supplied to virtual multiprocessor 400 based on the reference signal.

Furthermore, in addition to these functional units, the following functional units (not depicted) relate to virtual multiprocessor 400.

That is, a main memory formed from DRAM and storing programs, data and the like, and a cache memory formed from DRAM and for storing the above programs, data and the like, are connected to virtual multiprocessor 400 via a bus.

Virtual multiprocessor 400 has a time-allocation-information storage register 402, a processing execution unit 410, a processing control unit 411, a register switching unit 412, a scheduling control unit 413, a first register group 414, a second register group 415, a cycle counter 416, an external I/F 417, a DMA management unit 418, a request detection unit 419, a control register 420, a setting flag register 421, a LP-state storage register 424, a processor-state storage unit 425, and a clock mask unit 427.

Time-allocation-information storage register 402 stores information relating to timeslots and programs.

More specifically, this information is formed from (i) timeslot information stipulating, for example, the program execution timeframe and execution sequence of timeslots, (ii) LP information for specifying a program candidate for executing in each timeslot, (iii) priority level & mode information for restricting the range of the program candidates, (iv) idle-option information for determining a processing content when the candidate of an executable program does not exist in a timeslot, and (v) time-option information for determining a processing content when a currently executed program is suspended.

These five kinds of information exist for each timeslot, and are related to each other in timeslot units.

First and second register groups 414 and 415 are each a collection of registers for storing register values (i.e. context content), such as program counter values, and addresses showing the storage locations of programs and data.

Register switching unit 412 selects, as a register group (i.e. current register group) to be used when a program is executed, one of the first and second register groups 414 and 415 in accordance with an instruction from scheduling control unit 413.

Similar to the first embodiment, the switching of selection targets by register switching unit 412 is referred to as "register switching", and the register group that is not selected as the current register group is referred to as a "standby register group".

It should be noted that there are times when the register switching is referred to as "context switching".

Processing execution unit 410 includes a CPU for executing programs. When register switching is performed (i.e. when the current register group is selected), processing execution unit 410 specifies the location of a program for execution and data required to execute the program, and instructs DMA management unit 418 to obtain the program and the data required to execute the program.

Also, when a situation occurs during execution of the program whereby processing cannot be continued, processing execution unit 410 outputs a wait-code showing the suspension of the program execution to processing control unit 411.

Here, the above CPU drives in synchronization with a clock pulse outputted from PLL 601 via clock mask unit 427, and terminates the program execution when the clock pulse stops.

LP-state storage register 424 is a register for storing program-state information showing attributes and states of the programs, and timeslot setting information in which the setting content of the timeslots is shown.

More specifically, the timeslot setting information is formed from an ID (hereafter, "TS_ID") for specifying a timeslot, and a code showing an attribute of the timeslot.

Here, as timeslot attribute codes, "TD" is shown in the case of a time-driven timeslot provided for use in executing a program that is principally for steady execution, and "ED" is shown in the case of an event-driven timeslot provided for non-steady program execution, such as a program only executed when an event occurs.

In other words, although a time-driven timeslot can become an execution target even when an event has not occurred, an event-driven time slot cannot be an execution target if an event had not occurred. In the above program-state information is shown a ID value identifying a program, a code identifying a program-state, a code showing a program attribute and a code showing a timing (hereafter, "wakeup timing") for waking up or repeating the program.

There are six codes identifying a program state: "waiting", "ready", "running", "suspended-waiting", "suspended-ready", and "non-existent".

Of these, "ready" and "running" are states in which a program is currently executable, and in particular, "running" shows the current execution of a program.

Furthermore, "waiting" and "suspended-waiting" show states in which a program is a target range of the scheduling.

"Non-existent" shows a state in which it is not required to execute a program. In other words, a program in the states of "waiting,", "suspended-waiting" and "non-existent" is outside the target range for program execution scheduling.

Furthermore, when these codes shift to "suspended-waiting" as a result of a state occurring during program execution in which the program cannot be executed, the TD_ID value of a timeslot allotted at the point in time when this state occurred, is attached to these codes.

Here, these codes each shift to "suspended-ready" when the program becomes executable, although the above TD_ID value remains attached until the program execution is commenced.

As program attribute codes, "TD" is shown in the case of a program that is principally for steady execution, and "ED" is shown in the case of a program that is only executed when an event occurs.

As codes showing the wakeup timing, "In" is shown in the case of a program executed after storing a context following the release of a register group that is the standby register group when an execution request for the program occurs (i.e. a program having few processing time constraints), and "e" is shown in the case of a program that requires immediate execution, to the extent that a context already stored in the standby register group is switched.

Control register 420 is a register for storing information specifying a timeslot that is the present execution target, and a timeslot that is to become the next execution target.

More specifically, control register 420 stores a current address value showing the location in which timeslot information corresponding to a timeslot that is the current execution target is stored, and a next address value showing the location in which timeslot information corresponding to a timeslot that is to become the next execution target is stored.

In virtual multiprocessor 400, 16 timeslots are configured, and as a result, there exist 16 pieces of timeslot information.

Of the 16 timeslots, only 4 timeslots are normally used in program execution.

Here, the timeslot information is stored in time-allocation-information storage register 402 such that address values of the timeslot information corresponding to these 4 timeslots take consecutive values.

Control register 420 also stores a head address value, being the smallest of the consecutive address values, and an end address value, being the largest of the consecutive address values.

Each piece of timeslot information includes a TS_ID value (a single value from 0 to 15) for specifying a corresponding timeslot.

The smaller the TD_ID value, the smaller the address value of the location in which the piece of timeslot information is stored in time-allocation-information storage register 402.

A TD_ID value from 0 to 3 is corresponded to the four timeslots that are normally used in program execution.

In other words, timeslot information in which a 0-value TD_ID is shown is stored in the head address, and timeslot information in which a 3-value TD_ID is shown is stored in the head address.

The four timeslots are ranked from high to low priority. The timeslot specified by timeslot information (TD_ID=0) stored in the head address has the highest priority level, and as the address values increase toward the end address, the priority level of the timeslots specified by timeslot information stored in these addresses decreases.

These timeslot priority levels show the degree to which realtime processing is required, and in particular, realtime processing is not assured in the timeslot specified by timeslot information (TD_ID=3) stored the end address.

Processor-state storage unit 425 is a register storing information related to the state of a currently executed program.

This information is formed from (i) the value of a switching-prohibited flag showing whether switching by register switching unit 412 is prohibited, and (ii) the value of a common-interrupt flag showing whether common interrupt processing (described below) is currently being executed.

In the case of the switching being prohibited or a common interrupt occurring, the respective flags have a 1-value, and otherwise the respective flags have a 0-value.

Setting flag register 421 is a register for storing setting information related to programs.

More specifically, this setting information is a collection of flags provided per program (hereafter, "setting flag group"), and the content shown by the value of each flag in the setting flag group is classified, for example, into unique interrupt-processing requests (i.e. requests that a corresponding program is able to process) and event-processing requests.

Request detection unit 419 has a collection of flags that are provided per program (hereafter, "unique flag group"), and a collection of flags that are provided commonly for all of the programs (hereafter, "common flag group").

The flags in the unique flag group correspond one-to-one to the flags in the setting flag group stored in setting flag register 421, the bit string length of bit data structuring the unique flag group is equal to the bit string length of bit data structuring the setting flag group, and bits positioned an equal distance from a head of the respective bits strings relate to the same item.

Here, information relating to items shown by the flags (i.e. related information such as an ID specifying a program corresponding to an item) is attached to some of some of these flags.

Request detection unit 419 updates unique flag values and common flag values based on a bit data array and values for an external signal received from external I/F 417.

Here, request detection unit 419 converts a received external signal to an understandable data format.

Unit 419 decodes the external signal content based on the result of a comparison of flag values in the unique flag group with flag values in an updated common flag group and setting flag group values within setting flag register 421.

For the sake of convenience, this processing is referred to as "external signal decode processing".

The content of the external signal can be broadly divided into interrupt-processing requests and event-processing requests.

The interrupt-processing requests can further be divided into unique interrupt-processing requests and common interrupt-processing requests.

Here, a unique interrupt-processing request is a request to execute processing executable only in specific programs, and only these specific programs require the execution of unique interrupt processing.

Furthermore, a common interrupt-processing request is a request to execute processing executable in all of the programs, and these specific programs together require the execution of common interrupt processing.

The common flag group shows a content of a common interrupt-processing request.

Here, the interrupt processing is executed after jumping to a subroutine program of an executable program.

An event-processing request is a request to execute a program that is presently in an unexecutable state or a program that does not currently require processing, and arises when an event reverts to an executable state or an event reverts to requiring execution.

More specifically, by executing the external signal decode processing, request detection unit 419 judges whether a received external signal is one of a unique interrupt-processing request, a common interrupt-processing request, and an event-processing request.

If judged to be a unique interrupt-processing request, request detection unit 419 obtains, from the above related information, an ID (hereafter, "Unique P_ID") specifying a program to become the interrupt target of the unique interrupt processing, and an ID (hereafter, "Unique SP_ID") specifying a subroutine program for executing the unique interrupt processing.

Furthermore, if judged to be a common interrupt-processing request, request detection unit 419 obtains, from the related information corresponding to the external signal, an ID (hereafter, "Common SP_ID") specifying a subroutine program for executing the common interrupt processing.

Furthermore, if judged to be an event-processing request, request detection unit 419 obtains, from the related information corresponding to the external signal, an ID (hereafter, "Event P_ID") specifying a program to which the execution request relates from the external signal.

Following the above obtaining, request detection unit 419 outputs the obtained IDs to scheduling control unit 413.

When notified by scheduling control unit 413 of the completion of processing corresponding to an unique interrupt-processing request, a common interrupt-processing request, or an event-processing request, unit 419 changes the flag value of the item corresponding to the completed processing to the default value.

Furthermore, when the received external signal is judged to be an event-processing request, request detection unit 419 refers to LP-state storage register 424 prior to the above outputting of the Event P_ID to scheduling control unit 413.

At this time, if the program attribute specified by this Event P_ID shows "ED" (event-driven program for non-steady execution), request detection unit 419 determines that this P_ID is for outputting to scheduling control unit 413, so long as a P_ID showing a program whose program attribute is "ED" has not been outputted to scheduling control unit 413 during a time period from when a cycle head signal (described below) was most recently received to the present time.

In the case not being able to output a P_ID as a result of performing the above processing, request detection unit 419 stores the P_ID and when a cycle head signal is next received, unit 419 outputs the P_ID to scheduling control unit 413.

Scheduling control unit 413 functions to perform, within the program execution timeframe of a single timeslot, program execution scheduling, processing for restoring a context into the standby register group (hereafter, "restore processing"), processing for register switching (hereafter, "register-switch processing"), and processing for saving a context from the standby register group to context memory 500 (hereafter, "save processing").

1-1 Scheduling

First, the above scheduling will be described.

There are three kinds of scheduling: (i) time-driven scheduling, which is scheduling related to the execution of steady processing; (ii) event-driven scheduling, which is scheduling related to the execution of a program not currently targeted for scheduling; and (iii) relinquish scheduling, which is scheduling executed when the program execution period is relinquished during the program execution.

As the preprocessing of these three kinds of scheduling and the register-switch processing, scheduling control unit 413 performs (i) target-timeslot retrieval processing, (ii) target-TS-allotment-program retrieval processing, (iii) priority-level & mode information retrieval processing, (iv) idle-option-information retrieval processing, and (v) time-option-information retrieval processing.

1-1-1 Target-Timeslot Retrieval Processing

The following description relates to the target-timeslot retrieval processing.

Scheduling control unit 413 (i) refers to the value of a targeted address (hereafter, "target address"), which is one of the current address value, the next address value, the head address value, and the end address value stored in control register 420, (ii) refers to a TS_ID value in the timeslot information stored in the target address within time-allocation-information storage register 402, (iii) specifies the timeslot (hereafter, "target TS"), and (iv) obtains the program execution timeframe (i.e. basic cycle value) allotted to this timeslot.

1-1-2 Target-TS-Allotment-Program Retrieval Processing

The following description relates to the target-TS-allotment-program retrieval processing.

Scheduling control unit 413 refers to LP information corresponded to the target TS, specifies the four programs shown by this LP information, and detects the priority levels (from 0 to 3) corresponded to each of these programs.

1-1-3 Priority Level & Mode Information Retrieval Processing

The following description relates the priority level & mode information retrieval processing.

Scheduling control unit 413 refers to priority level & mode information corresponded to the target TS, and detects whether one of values 0 to 3 is shown as the priority level, and whether one of Index mode and Level mode is shown as the mode.

Index mode and Level modes are setting information defining the method of allotting programs to timeslots. In the case of Index mode being shown in the priority level & mode information, scheduling control unit 413 attempts to allot a timeslot to only a single specific program, and in the case of Level mode being shown in the priority level & mode information, scheduling control unit 413 attempts to allot a timeslot to only a program having a priority level above a specified priority level.

1-1-4 Idle-Option-Information Retrieval Processing

The following description relates to idle-option-information retrieval processing.

As the idle-option-information retrieval processing, scheduling control unit 413 refers to idle-option information corresponded to the target TS, and judges whether "SWITCH" or "MICRO-SLEEP" is shown.

1-1-5 Time-Option-Information Retrieval Processing

The following description relates to time-option-information retrieval processing.

As the time-option-information retrieval processing, scheduling control unit 413 refers to time-option information corresponded to the target TS, and judges whether "LP_SWITCH", "TS_SWITCH" or "MICRO-SLEEP" is shown.

1-2 Time-Driven Scheduling

The following description relates to time-driven scheduling.

Time-driven scheduling is scheduling related to normal program execution.

In the case of event-driven scheduling and relinquish scheduling (both described below) not being executed, scheduling control unit 413 executes time-driven scheduling, and performs restore processing, register-switch processing and save processing based on the time-driven scheduling.

As the time-driven scheduling, scheduling control unit 413 performs the following scheduling.

1-2-1 Scheduling

The following description relates to the scheduling.

Scheduling unit 413 performs the above target-timeslot retrieval processing with the next address as the target address, and after specifying the target TS (hereafter, "next TS"), unit 413 performs the above target-TS-allotment-program retrieval processing in order to specify the four programs corresponded to this next TS, and also detects the priority level corresponded to each of these programs.

Next, scheduling control unit 413 executes the above priority level & mode information retrieval processing in order to retrieve the content (i.e. priority level and mode) of the priority level & mode information corresponded to the next TS.

If the retrieved mode is the Level mode, scheduling control unit 413 sets, as the candidate of the program (hereafter, "candidate program") allotted to the target TS, all of the programs to which values less than and equal to the retrieved priority level value are corresponded.

If the retrieved mode is the Index mode, scheduling control unit 413 sets, as the candidate program, a single program to which the priority level value retrieved by the priority level & mode information retrieval processing is corresponded.

Furthermore, scheduling control unit 413 refers to the program-state information corresponding to each candidate program in LP-state storage register 424, and detects whether each of the candidates are executable.

More specifically, when the program-state information of a candidate program shows "ready", scheduling control unit 413 judges whether the program is executable, and makes the program effective as an allotment candidate of the next TS.

A candidate program made effective in this way is referred to as an "effective candidate program".

When a plurality of effective candidate programs exist for a single next TS, scheduling control unit 413 sets, as the allotment target of the next TS, the effective candidate program to which the smallest of the priority level values is corresponded.

Furthermore, when a single effective candidate program exists for a single next TS, scheduling control unit 413 sets this effective candidate program as the allotment target of the next TS.

Following the setting of an effective candidate program as the allotment target of the next TS, scheduling control unit 413 corresponds an ID specifying the effective candidate program to the timeslot information of the next TS.

Furthermore, when the execution of the effective candidate program is completed, scheduling control unit 413 deletes the ID specifying the executed effective candidate program from the above timeslot information.

Furthermore, when no effective candidate program exists for a next TS, scheduling control unit 413 determines the content of the subsequent processing based on the content of information obtained by performing idle-option-information retrieval processing.

More specifically, when the content of the idle option information shows "MICRO-SLEEP", scheduling control unit 413 does not set any program as the allotment target of the next. TS.

Here, a timeslot to which no program is allotted is referred to as an "empty timeslot".

Furthermore, when the content of the above information shows "SWITCH", scheduling control unit 413 sets a value obtained by adding a "1" to the next address value (note: this value=head address value if next address is end address) as the new next address, and repeatedly performs the above scheduling.

After performing the above time-driven scheduling, scheduling control unit 413 performs the restore processing, register-switch processing and the save processing.

1-3 Event-Driven Scheduling

The following description relates to event-driven scheduling.

Event-driven scheduling is scheduling performed instead of the time-driven scheduling when requests occur to execute programs (described below) that are outside the scope of the present scheduling.

Programs to which such execution requests relate include programs having an ED attribute that change from a "waiting" state to a "ready" state, and programs having a TD or an ED attribute that change from a "suspended-waiting" or "running" state to a "suspended-ready" state.

Here, immediately prior to the time-driven scheduling being performed, scheduling control unit 413 judges whether an execution request for one of the above programs has occurred.

When an event P_ID is received from request detection unit 419, scheduling control unit 413 specifies a program from the received event P_ID, refers to LP-state storage register 424, obtains an attribute and wakeup timing of the program, and performs the following processing in accordance with the obtained content.

1-3-1 Recovery-Event Processing

When the specified program is in a "waiting" state, has a "TD" attribute and a wakeup timing of "n", scheduling control unit 413 transfers the state of the current program specified by the P_ID in LP-state storage register 424 to "ready".

After performing the above recovery-event processing, scheduling control unit 413 performs the restore processing, the switch processing and the save processing (i.e. same as performed after the time-driven scheduling).

1-3-2 Urgent Recovery-Event Processing

When the specified program is in a "suspended-waiting" state, has a "TD" attribute and a wakeup timing of "e", scheduling control unit 413 transfers the state of the specified program to "suspended-ready/".

Then, scheduling control unit 413 specifies a timeslot (hereafter, "specified TS") from a TS_ID value attached to a code showing the state of the specified program, and allots the specified TS to the specified program.

After performing the above urgent recovery-event processing, scheduling control unit 413 performs urgent restore processing (described below), and also performs urgent register switch processing (described below) instead of the register switch processing that is performed after the time-driven scheduling.

1-3-3 Event-Wakeup Processing

When the specified program is in a "suspended-waiting" state, has a "TD" attribute and a wakeup timing of "n", scheduling control unit 413 transfers the state of the current program specified by the event P_ID in LP-state storage register 424 to "suspended-ready/".

Furthermore, when the specified program is in a "waiting" or a "suspended-waiting" state, has an "ED" attribute and a wakeup timing of "n", scheduling control unit 413 changes the state of the program specified by the received event P_ID to "ready" (i.e. if "waiting") and "suspended-ready" (i.e. if "suspended-waiting"), respectively.

Additionally, when urgent register switching processing is performed at a wakeup timing of "e" after the event-driven scheduling, scheduling control unit 413, as a result of this occurrence, changes the state of the currently executed program from "running" to "suspended-ready/", irrespective of the attribute.

When this event-wakeup processing is performed, scheduling control unit 413 performs early restore processing (described below) instead of the restore processing that is performed after the time-driven scheduling, and performs register switch processing (described below) to trigger the arrival of the zero-count signal.

This event processing is referred to as "event-wakeup processing".

1-3-4 Urgent Event-Wakeup Processing

When the specified program is in a "waiting" or a "suspended-waiting" state, has an "ED" attribute and a wakeup timing of "e", scheduling control unit 413 changes the state of the specified program to "ready" (i.e. if "waiting") and "suspended-ready" (i.e. if "suspended-waiting"), respectively.

When the urgent event-wakeup processing has been performed, scheduling control unit 413 performs urgent restore processing (described below) instead of the restore processing that is performed after the time-driven scheduling, and performs urgent register switch processing (described below) instead of the restore switch processing that is performed after the time-driven scheduling.

This event processing is referred to as "urgent event-wakeup processing".

1-4 Relinquish Scheduling

The following description relates to relinquish scheduling performed when scheduling control unit 413 receives a wait-code from processing execution unit 410 via processing control unit 411, or a cache-miss signal (described below) from DMA management unit 418.

A "wait-code" is a code showing the relinquishing of a time period allotted to a currently executed program when the program execution cannot be continued. The wait-codes include a "vm_wait" code and a "vmp_sus" code.

The "vmp_wait" code is a code that is issued by processing execution unit 410 when it is anticipated that the period of the relinquishing will be comparatively long, and the "vmp_sus" code is a code that is issued by processing execution unit 410 when it is anticipated that the period of the relinquishing will be comparatively short.

When the "vmp_wait" or "vmp_sus" code is received from processing execution unit 410 via processing control unit 411, or when the cache-miss signal is received from DMA management unit 418, scheduling control unit 413 updates the state of a currently executed program stored in LP-state storage register 424.

More specifically, when a "vmp_wait" code is received, scheduling control unit 413 changes the state of the currently executed program from "running" to "waiting".

When a "vmp_sus" code or a cache-miss signal is received, scheduling control unit 413 changes the state of the currently executed program from "running" to "suspended-waiting".

Scheduling control unit 413 then performs the time-option-information retrieval processing (described above) with the current address set as the target address.

When the received wait-code is "vmp_sus", scheduling control unit 413 performs urgent register switch processing (described below) irrespective of the time-option information, performs the save processing, and performs control register value update processing (described below).

Furthermore, even when the received wait-code is "vmp_wait" and the time-option information content shows "TS_SWITCH", scheduling control unit 413 performs, as described above, the urgent register switch processing, the save processing, and the control register value update processing.

Here, either restore processing in the time-driven scheduling or early restore processing after the early wakeup processing in the event-driven scheduling is performed with respect to the standby register group immediately prior to the performing of the urgent register switch processing.

Furthermore, when the received wait-code is "vmp_wait", and the time-option information content shows "LP_SWITCH", scheduling control unit 413 judges whether an effective candidate program exists in the timeslot that is the current execution target, and if one or more effective candidate programs exist, scheduling control unit 413 stores (i.e. restores) register values of a context corresponding to a program having the highest priority level out of the one or more effective candidate programs (i.e. if only one effective candidate program, then that program) in the standby register group.

Next, scheduling control unit 413 performs the urgent register switch processing and the save processing.

Furthermore, when an effective candidate program does not exist, or when the time-option information content shows "MICRO-SLEEP", scheduling control unit 413 performs the following processing, in addition to instructing processing control unit 411 to have processing execution unit 410 execute NOP (described below), which is a program execution that does not result from the updating of a register value in the current register group.

Scheduling control unit 413 immediately starts an output of a mask signal to clock mask unit 427, refers to the content of a context stored in a standby register group, obtains an address value in the memory in which data required to execute a program corresponding to this context is stored, and instructs DMA management unit 418 to write the data stored in the address into a cache memory.

Furthermore, when the register switching or the urgent register switching is next performed, scheduling control unit 413 stops the output of the mask signal to clock mask unit 427.

Upon receiving a zero-count signal from cycle counter 416, scheduling control unit 413 performs the register switch processing and the save processing.

Processing related to the restoring in the restore processing, the urgent restore processing, the early restore processing, and the like will now be described.

1-5-1 Restore Processing

Restore processing is processing for storing register values in the standby register group, and is performed by scheduling control unit 413 after the time-driven scheduling has been performed.

As the restore processing when the standby register group is released (i.e. when the saving is completed), scheduling control unit 413 instructs DMA management unit 418 to store, in the standby register group, register values of a context corresponding to a program allotted as a result of the time-driven scheduling.

1-5-2 Urgent Restore Processing

The urgent restore processing is processing for storing register values in a standby register group, and is performed by scheduling control unit 413 when the wakeup timing of the specified program shows "e" as a result of performing the event-driven scheduling.

As the urgent restore processing when execution of the urgent recovery-event processing or the urgent event-wakeup processing is completed, scheduling control unit 413 saves the register values stored in the standby register group, and instructs DMA management unit 418 to immediately store (i.e. to urgently restore) the register values of a context corresponding to a specified program in the standby register group.

Here, it is possible for the saving and restoring to be executed per register rather than per register group, and by performing the saving and restoring sequentially for each register, it is possible to perform the saving and restoring in a pseudo-parallel manner.

1-5-3 Early Restore Processing

The early restore processing is processing for storing register values in a standby register group, and is performed by scheduling control unit 413 when the wakeup timing of the specified program shows "n" as a result of performing the event-driven scheduling.

As the urgent restore processing when a standby register group is released (i.e. when the saving is completed), scheduling control unit 413 instructs DMA management unit 418 to immediately store register values of a context corresponding to a specified program in the standby register group.

Here, similar to the urgent restore processing, scheduling control unit 413 initializes the register values of the standby register group prior to the above storing.

Processing that relates to register switching in the register-switch processing, the urgent register-switch processing, and the like will now be described.

1-6-1 Register-Switch Processing

Upon receiving a zero-count signal from cycle counter 416, scheduling control unit 413 performs basic cycle adjustment processing (described below), and instructs register switching unit 412 to perform register switching after first conducting switch-timing confirmation processing (described below).

Furthermore, upon receipt from register switching unit 412 of notification that the register switching has been completed, scheduling control unit 413 outputs a basic cycle value to cycle counter 416, and performs actual-time-period retention processing (described below) and control-register-value update processing (described below).

At this time, if the execution target timeslot is an empty timeslot, scheduling control unit 413 starts the output of the mask signal to clock mask unit 427, in addition to instructing processing control unit 411 to have processing execution unit 410 execute NOP (i.e. "no-operation") following the outputting of the basic cycle value to cycle counter 416, refers to a content of a context stored in a standby register group, obtains an address value in a memory in which data required to execute a program corresponding to the context is stored, and instructs DMA management unit 418 to write the data stored in the address into a cache memory.

Furthermore, when register switching or the urgent register switching is next performed, scheduling control unit 413 stops the output of the mask signal to clock mask unit 427.

1-6-1-1 Basic-Cycle Adjustment Processing

The following description relates to basic-cycle adjustment processing.

Immediately prior to the register switching, scheduling control unit 413 refers to LP-state storage register 424, judges whether the state of a program corresponding to a register value group stored in a standby register group is "suspended-ready", and if "suspended-ready", scheduling control unit 413 obtains an actual count value (described below) from a residual-cycle-value storage location (described below) in the standby register group.

Then, at the next program execution time, scheduling control unit 413 sets this actual count value as the execution period of the program (i.e. as the basic cycle of the timeslot to which the program is allotted) instead of a regular basic cycle shown in the timeslot information of a timeslot to which the program is allotted.

Furthermore, when the TS_ID value of this timeslot is "3" (i.e. a timeslot not guaranteeing realtime processing), scheduling control unit 413 obtains a timelag value in the timeslot information that shows the TS_ID value of "3", sets the result of subtracting this timelag value from the basic cycle value as a new basic cycle for the next program execution time, and updates the timelag value in this timeslot information to "0".

Here, upon receipt of notification from processing control unit 411 of the start of program execution, scheduling control unit 413 outputs the basic cycle value derived as above to cycle counter 416.

1-6-1-2 Switch-Timing Confirmation Processing

The following description relates to switch-timing confirmation processing.

When programs are executed by timesharing, it may not be possible, for example, to complete the program execution within an arbitrary time period due to shared resources being used in the program execution, and the like.

In other words, it may not be possible to perform the register switching within an arbitrary time period.

As a result, scheduling control unit 413 firstly requests processing control unit 411 to complete a currently executed program, has the program ended at a point at which completion of the program execution is possible, and confirms whether register switching is possible.

More specifically, after the above request, scheduling control unit 413 refers to the values of the switching-prohibited flag and the common-interrupt flag in processor-state storage unit 425, and judges whether register switching is possible (i.e. flag value="1") or not possible (i.e. flag value="1").

1-6-1-3 Actual-Time-Period Retention Processing

The following description relates to actual-time-period retention processing.

Having instructed register switching unit 412 to perform the register switching, scheduling control unit 413 obtains the count value of cycle counter 416 at this point in time, and when this count value (hereafter, "actual count value") is a positive value, and a "vmp_sus" code (i.e. code triggering the register switching) is received, scheduling control unit 413 writes this actual count value into a location (hereafter, "residual-cycle-value storage location") determined in the register group that becomes the standby register group as a result of the register switching having been performed.

By doing this, the actual count value of a program whose execution has been completed is attached to a context of the program, and because the actual count value is stored in context memory 500 following the saving of this context, the actual count value at the previous program execution period can be obtained at the next program execution time.

Furthermore, when the actual count value takes a negative value, or when the actual count value takes a positive value and a "vmp_wait" code (i.e. code triggering the register switching) is received, scheduling control unit 413 performs the target-timeslot retrieval processing with the end address as the target address, specifies a storage location of timeslot information of a timeslot (i.e. TS_ID=3) thus specified, and updates the timelag value by adding this actual count value to a timelag value stored in the timeslot information.

Here, for the reasons mentioned in the above description of the switch-timing confirmation processing, it is not always possible to strictly match the switch timing with the basic cycle of a timeslot, and the switching is normally performed a few cycles over the basic cycle, and thus the actual count value takes a negative value. Furthermore, when, for example, the register switching is conducted by suspending the program execution, the actual count value takes a positive value due to being less than the basic cycle of the timeslot that is the execution target.

1-6-1-4 Control-Register-Value Update Processing

The following description relates to control-register-value update processing.

The control-register-value update processing is processing for updating data, and is performed in control register 420 following scheduling (described below) being performed.

This scheduling is (1) the performing of time-driven scheduling, or (2) the performing of relinquish scheduling when the time-option information content shows "TS_SWITCH".

In addition to setting to next address value at a current point in time as a new current address value, scheduling control unit 413 sets a value obtained by adding "1" to this next address value (note: this value=head address value if next address is end address), and following this, scheduling control unit 413 updates the values of the current address and the next address stored in control register 420.

Furthermore, having transferred the current address value from the end address value to the head address value, scheduling control unit 413 outputs a cycle head signal to request detection unit 419.

1-6-2 Urgent Register-Switch Processing

The following description relates to urgent register-switch processing.

When the content of time-option information shows "TS_SWITCH" in the time-option processing of the relinquish scheduling, and when the urgent restore processing performed after the urgent recovery-event processing and the urgent event-wakeup processing at a time of the event-driven scheduling is completed, scheduling control unit 413 performs the basic-cycle adjustment processing, and instructs register switching unit 412 to perform the register switching after first conducting the switch-timing confirmation processing.

Then, upon receipt of notification from register switching unit 412 that the register switching has been completed, scheduling control unit 413 outputs the basic cycle value to cycle counter 416, and performs the actual-time-period retention processing.

1-7-1 Save Processing

Upon receipt of notification that the register switching has been completed, scheduling control unit 413 instructs DMA management unit 418 to overwrite (i.e. save), into a memory area of context memory 500 in which the context was originally stored, register values of a context stored in a register group that becomes the standby register group as a result of the register switching.

Here, the saving is conducted immediately prior to the register switching being performed, even when the execution target timeslot is an empty timeslot.

1-8-1 Unique Interrupt Processing

Upon receiving a unique P_ID and a unique SP_ID from request detection unit 419, scheduling control unit 413 performs the following processing.

Scheduling control unit 413 refers to LP-state storage register 424, judges whether a program specified by the received unique P_ID is currently being executed, and if currently being executed, scheduling control unit 413 immediately instructs processing execution unit 410 via processing control unit 411 to jump to a subroutine program specified by the received unique SP_ID and execute processing.

Furthermore, if the program specified by the received unique P_ID is not currently being executed, scheduling control unit 413 specifies a program to be the interrupt target of the subroutine program by referring to a flag in request detection unit 419, and when this specified program is executed, scheduling control unit 413 instructs processing execution unit 410 via processing control unit 411 to jump to the subroutine program and execute processing.

1-8-2 Common Interrupt Processing

Upon receipt of a common SP_ID from request detection unit 419, scheduling control unit 413 immediately instructs processing execution unit 410 via processing control unit 411 to jump to a subroutine program specified by the received common SP_ID and execute processing, and when notification is received from processing control unit 411 that execution of the subroutine program has been started, scheduling control unit 413 instructs cycle counter 416 to suspend the countdown.

Furthermore, upon receipt of notification from processing control unit 411 that execution of the subroutine program specified by the common SP_ID has been completed, scheduling control unit 413 outputs a count restart signal instructing cycle counter 416 to restart the countdown.

As described above, scheduling control unit 413 functions to execution a variety of processing.

Processing control unit 411 functions to manage an execution state of programs in processing execution unit 410. More specifically, processing control unit 411 monitors an execution state of programs in processing execution unit 410, and detects a start and an end timing of program execution in processing execution unit 410, and also detects a start and an end timing of interrupt processing.

Whenever one of these timings arrives, processing control unit 411 notifies scheduling control unit 413 that the timing has arrived.

Furthermore, upon receipt of a wait-code from processing execution unit 410, processing control unit 411 outputs the wait-code to scheduling control unit 413.

Furthermore, when a program execution in processing execution unit 410 is in a non-suspendable state, processing control unit 411 sets the value of the switching-prohibited flag in processor-state storage unit 425 to "1" (default value="0"), and sets the value of the common interrupt flag in processor-state storage unit 425 to "1" (default value "0") for the duration that the subroutine program specified by the common SP_ID is being executed in processing execution unit 410.

Furthermore, upon receipt of a register-switching prohibited command from processing execution unit 410, processing control unit 411 sets the value of the switching-prohibited flag in processor-state storage unit 425 to "1", and upon receipt of a register-switching prohibition release command from processing execution unit 410, processing control unit 411 sets the value of the switching prohibited flag to "0". Moreover, upon receipt of an NOP execution instruction from scheduling control unit 413, processing control unit 411 has processing execution unit 410 execute NOP.

DMA management unit 418 is a functional unit that manages and smoothly performs DMA transfers, and performs the DMA transfers based on requests from scheduling control unit 413 and other functional units.

Furthermore, upon completing a DMA transfer requested by a functional unit, DMA management unit 418 outputs a signal (hereafter, "transfer-completion signal") showing the completion to the functional unit and to scheduling control unit 413. Moreover, if a cache-miss occurs when DMA management unit 418 tries to obtain a program and data from a cache-memory in response to a request from processing execution unit 410, DMA management unit 418 outputs a signal (hereafter, "cache-miss signal") showing that a cache-miss has occurred to scheduling control unit 413.

External I/F 417 is an interface for connecting external devices such as an external processor and the like, and outputs signals received from an external source to scheduling control unit 413 and request detection unit 419.

Cycle counter 416 has a clock counter, and upon receipt of a basic cycle value from scheduling control unit 413, cycle counter 416 starts a countdown with this value as an initial value of the count.

Cycle counter 416 conducts the countdown by decrementing a 1-value per clock, starting from the initial value, and when the value reaches zero, cycle counter 416 outputs a signal (hereafter, "zero-count signal") to scheduling control unit 413 showing that the count value has reached zero.

Furthermore, cycle counter 416 suspends and restarts the countdown based on instructions from scheduling control unit 413, outputs an actual count value (i.e. count value at time instructed) to scheduling control unit 413.

Clock mask unit 427 functions to block a signal route of a clock pulse to processing execution unit 410 for the duration that a mask signal is being received from scheduling control unit 413.

2. Data

Figure 16:
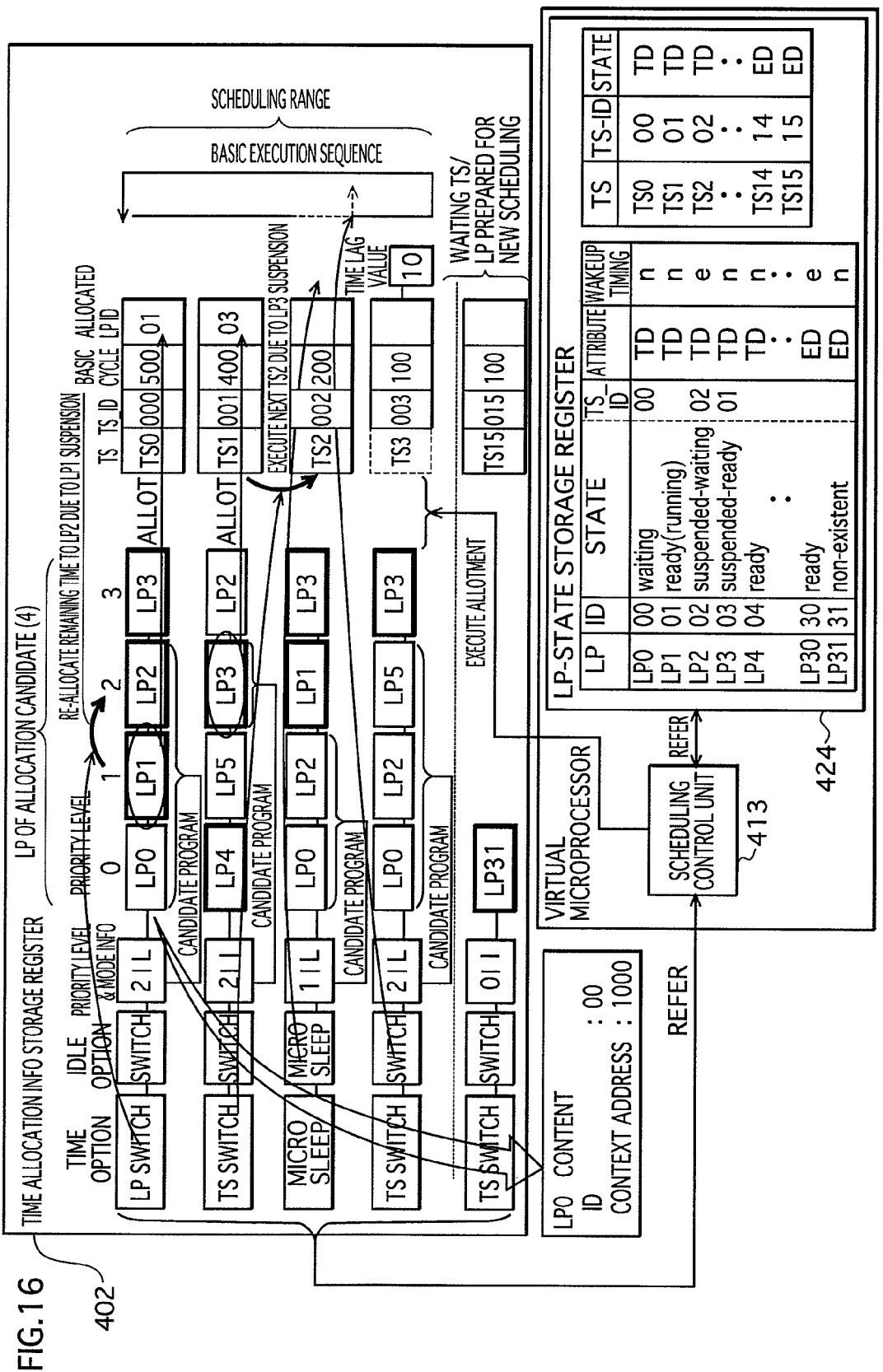
FIG. 16 shows information content stored in a time-allocation information storage register and an LP-state storage register.

FIG. 16 shows information content stored in time-allocation information storage register 402 and LP-state storage register 424.

In time-allocation-information storage register 402 is stored (1) timeslot information, (2) LP information, (3) priority level & mode information, (4) idle-option information, and (5) time-option information.

This information is used in every timeslot, and is related to each other.

2-1-1 Timeslot Information

In the timeslot information is included TS_ID values for specifying timeslots, and basic cycle values.

Furthermore, in a piece of timeslot information having TS_ID value of "3" is included a timelag value.

Furthermore, when the scheduling is performed by scheduling control unit 413, a program ID is corresponded to a TS_ID value of a timeslot to which the program is allotted.

2-1-2 LP Information

In the LP information is stored information relating to programs that are candidates for allotting to timeslots.

The attributes and number of programs that are candidates for allotting to a single timeslot differ depending on the attribute of timeslots that are allotment targets.

In other words, a program having a "TD" attribute will always be allotted to a timeslot having a "TD" attribute.

Furthermore, in each timeslot having a "TD" attribute is provided four candidate programs having "TD" attributes.

On the other hand, a program having an "ED" attribute will always be allotted to a timeslot having an "ED" attribute.

Furthermore, in each timeslot having a "ED" attribute is provided one candidate program having an "ED" attribute.

Each piece of LP information is corresponded to a piece of timeslot information that corresponds to an allotment target timeslot.

In the LP information is stored groupings of values, each grouping consisting of a (1) an ID value for specifying a program, (2) a value showing a priority level, and (3) an address value in context memory 500 in which a context corresponding to the program is stored, and the number of groupings is equal to the number of allotment candidate programs.

The values showing a priority level are one of 0, 1, 2, and 3, and are set such that the priority levels of the allotment candidate programs do not overlap.

Here, when the number of allotment candidate programs is one, the value showing a priority level is "0".

2-1-3 Priority Level & Mode Information

In the priority level & mode information is stored information related to the designating of programs that are candidates for allotting to timeslots.

In other words, in the priority level & mode information is stored a value (one of 0, 1, 2, 3) showing a priority level, and an "I" or "L" code showing a mode.

Here, the "I" code shows an INDEX mode, and the "L" code shows a LEVEL mode.

Because the range of effective candidate programs is altered by changing a content of this priority level & mode information, it is possible to adjust an execution frequency of each candidate program so as to approach a target value.

2-1-4 Idle-Option Information

In the idle-option information is stored information for determining a program execution operation when all of the programs for allotting to a timeslot are in an unexecutable state.

In other words, in the idle-option information is stored a "MICRO-SLEEP" code showing power reduction, or a "SWITCH/" code showing high-efficiency program execution.

2-1-5 Time-Option Information

In the time-option information is stored information for determining a post-suspension program operation when a currently executed program is suspended.

In other words, in the time-option information is stored (1) an "LP_SWITCH" code showing the allocation, to the timeslot, of an executable program corresponded to the timeslot to which a program whose execution has been suspended belongs, (2) a "TS_SWITCH" code showing the setting of the next timeslot as the execution target, or (3) a "MICRO-SLEEP" code showing power reduction.

In LP-state storage register 424 is stored (1) program information, and (2) timeslot-setting information.

2-2 Program-State Information

In the program-state information is stored, for each program, an ID for specifying a program, a code showing a program-state, and a code showing, together with a program attribute, a timing for waking up or recovering a program.

There are six codes showing a program-state: "waiting", "suspended-waiting", "ready", "suspended-ready", "running", and "nonexistent".

The "waiting" code shows the relinquishing of a program execution period at the present time, and the execution of a program within the program execution timeframe of a normal timeslot at the next program execution time. The "suspended-waiting" code shows the relinquishing of a program execution period at the present time, and the setting of a time period (maximum=period of a single timeslot) not used as a result of the relinquishing, as the program execution period for the next program execution time.

The "ready" code shows a program to currently be in an executable state, and the "suspended-ready" code shows a program that was in a "suspended-waiting" state to currently be in an executable state.

Furthermore, when a state of a program is transferred to the "waiting", "suspended-waiting" or "suspended-ready" code as the result of a program execution period being relinquished, a TS_ID value of the allotment target timeslot at the time when the relinquishing occurred is attached to the code.

Here, the TS_ID value is not cleared until the program is executed, and thus this TS_ID value may sometimes also be attached to the "ready," code or the "suspended-ready" code.

The "running" code shows a program to currently be in an executable state, and furthermore that the program is currently being executed.

The "nonexistent" code shows a program to currently be outside the target range of the scheduling.

Here, "outside the target range of the scheduling" means that the program cannot currently even be a candidate program.

Here, a candidate program that is in a "waiting" or a "suspended-waiting" state is outside the target range of candidate scheduling.

Furthermore, the "recovery of a program" mentioned above refers to a program having a "TD" attribute changing from a "waiting" to a "ready" state, or a program having a "TD" attribute changing from a "suspended-waiting" to a "suspended-ready/" state at the above timing "e".

Furthermore, the "waking up of a program" refers to a program having a "TD" attribute changing from a "suspended-waiting" to a "suspended-ready" state at the above timing "n", or a program having an "ED/" attribute changing from a "waiting" or a "suspended-waiting" to a "ready/" or "suspended-ready" state, respectively.

Here, the timing of waking up or recovering a program is referring to collectively in the present invention as simply "wakeup timing"

The codes showing a program attribute includes (1) an "ED" code showing an event-driven program in the event-driven scheduling that is within a target range of the candidate scheduling when an event occurs, and that is not effected by the order determined by the time-driven scheduling, and (2) a "TD" code showing a program (i.e. a time-driven program) that waits for an allocated timeslot in the order determined by the time-driven scheduling before being executed, despite being within the target range of the candidate scheduling when an event occurs.

In other words, a program having an "ED" attribute is transferred from a "waiting" or a "suspended-waiting" state to a "ready" or a "suspended-ready" state, respectively, and is allocated a timeslot as a result the event-driven scheduling. On the other hand, a program having an "TD" attribute is transferred from a "waiting" state to "ready" state, and allocated a timeslot as a result the time-driven scheduling.

As an exception, however, there may be times when a time-driven program that is within the target range of the candidate scheduling when an event occurs, is allocated a timeslot in the event-driven scheduling and executed, without being effected by the order determined in the time-driven scheduling.

In other words, this exception arises when a time-driven program is transferred from a "suspended-waiting" state to a "suspended-ready" state, and is allocated a timeslot as a result of the event-driven scheduling.

The codes showing a wakeup timing include (1) an "e" code showing that it is necessary to urgently execute a program (i.e. without waiting to receive a zero-count signal), to the extent that a context already stored in the standby register group is deleted, and an "n" code showing the execution of a program after receiving a zero-count signal, upon the completion of the storage in the standby register group, once the save processing from the standby register group has been completed.

In setting flag register 421 are stored setting flag groups provided for each program.

These setting flag groups are for specifying a content of events and interrupts permitted by the programs, and apart from being provided for each program, these setting flag groups are the same as the setting flag group mentioned in the first embodiment, and thus a detailed description is omitted here.

In request detection unit 419, as shown in FIG. 15, are stored LP unique flag groups provided for each program, and a single common flag group.

An LP unique flag group is information relating to unique interrupts, and shows what type of execution request for a unique interrupt has currently occurred with respect to what program.

Although the LP unique flag groups appear to exist for each program, they are actually a single piece of bit string data, and each flag exists in a bit position corresponding to a content of a unique interrupt and a program that permits the interrupt.

In other words, when an interrupt having this content is permitted in a given program, an LP unique flag existing in the bit position that corresponds to a content of the interrupt and the program will have a 1-value (default value=0).

A data structure of the LP unique flags is similar to that of the completion notification flags mentioned in the first embodiment, and thus a detailed description is omitted here.

The common flag group is a collection of flags that show whether an execution request for a common interrupt has occurred.

Here, an "execution request for a common interrupt" refers to a request to execute an executable subroutine program in any of the programs. The common flag group is actually a single piece of bit string data, and unique bit positions exist for subroutine programs to be executed after interrupting any currently executed program.

In other words, in the case of a common interrupt request occurring with respect to a subroutine program, a flag in a bit position corresponding to the subroutine program will have a 1-value (default value=0).

Processor-state storage unit 425 stores switching-prohibited flag values and common interrupt flag values.

A switching-prohibited flag shows that register switching is currently unexecutable due to reasons such as, for example, not being able to immediately suspend a program because of a shared resource being accessed during the program execution. In this case, the switching-prohibited flag takes a 1-value (default value=0) for the duration that the register switching cannot be executed.

The value of this switching-prohibited flag is rewritable by a command issued by a currently executed program.

A common interrupt flag shows that processing of a common interrupt is currently being executed, and takes a 1-value (default value=0) for the duration that that the processing of the common interrupt is being executed.

3. Operation

The following description relates to processing for realizing efficient program execution in virtual multiprocessor 400, when programs are executed in a pseudo-parallel by a single processor.

Figure 17:
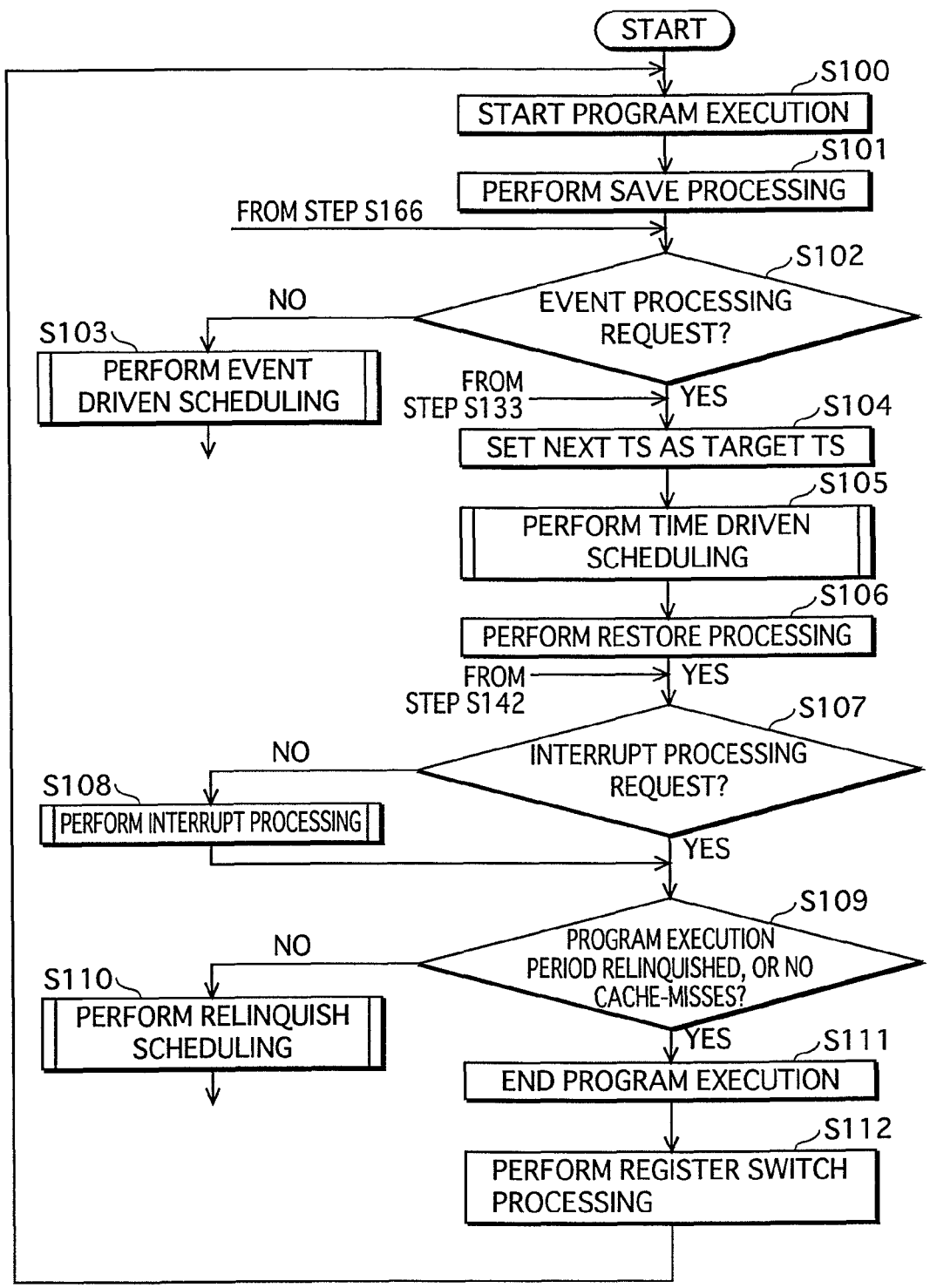
FIG. 17 is a flowchart that shows processing performed in the virtual multiprocessor of the second embodiment.

FIG. 17 is a flowchart that shows processing performed in virtual multiprocessor 400.

Processing execution unit 410 starts a program execution based on an instruction from processing control unit 411 (step S100).

Parallel with this program execution, scheduling control unit 413 performs save processing that targets register values stored in the standby register group (step S101), and request detection unit 419 judges whether an event-processing request has not occurred, based on an external signal received from external I/F 417 (step S102).

If an event-processing request has occurred (step S102=NO), request detection unit 419 outputs an event P_ID to scheduling control unit 413.

Scheduling control unit 413 performs event-driven scheduling based on the event P_ID (step S103).

Here, a content of processing performed after the event-driven scheduling is performed varies depending on a result of event-driven scheduling.

If an event-processing request has not occurred (step S102=YES), scheduling control unit 413 sets a next TS as the target TS (step S104), performs time-driven scheduling (step S105), and performs restore processing (step S106).

Then, request detection unit 419 judges whether an interrupt-processing request has not occurred (step S107), and if an interrupt-processing request has occurred (step S107=NO), request detection unit 419 outputs, in accordance with the type of interrupt, a unique P_ID, a unique SP_ID, a common SP_ID, and the like to scheduling control unit 413.

Upon receipt of these IDs, scheduling control unit 413 executes interrupt processing (step S108).

On the other hand, if an interrupt-processing request has not occurred (step S107=YES), scheduling control unit 413 judges, based on a wait-code and a cache-miss signal, whether a program execution period relinquishing or a cache-miss has not occurred (step S109), and if these have occurred (step S109=NO), scheduling control unit 413 performs relinquish scheduling (step S110).

Here, a processing content after the relinquish scheduling has been performed varies depending on the result of the relinquish scheduling.

On the other hand, if a program execution period relinquishing or a cache-miss has not occurred (step S109=YES), scheduling control unit 413 ends the program execution in processing execution unit 410 upon receipt of a zero-count signal from cycle counter 416 (step S111), performs register-switch processing (step S112), and then returns to step S100, in which processing execution unit 410 starts a program execution.

Figure 18:
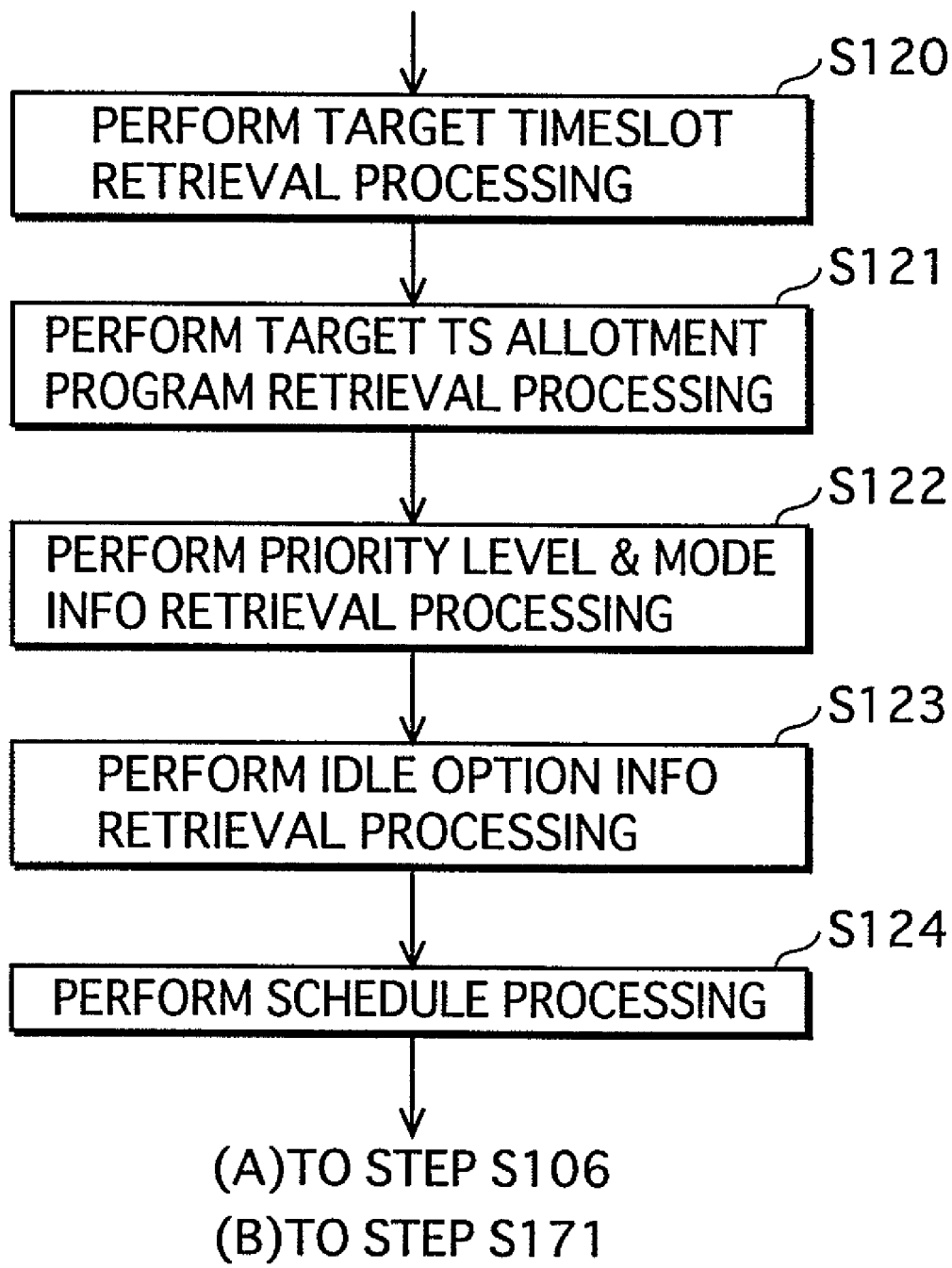
FIG. 18 is a flowchart that shows a content of time-driven scheduling performed by a scheduling control unit.

FIG. 18 is a flowchart that shows a content of time-driven scheduling performed by scheduling control unit 413.

Firstly, operations when a next TS is set as a target TS will be described.

As a continuation of step S104 processing in FIG. 18(A), scheduling control unit 413 performs target-timeslot-retrieval processing (step S120).

More specifically, scheduling control unit 413 refers to timeslot information stored in the next address in time-allocation-information storage register 402, specifies a next TS based on a TS_ID specifying a timeslot, and obtains a basic cycle value allotted to the timeslot.

Then, scheduling control unit 413 performs target-TS-allocation-program retrieval processing (step S121).

More specifically, scheduling control unit 413 refers to LP information corresponded to a next TS, specifies candidate programs shown by the LP information, and detects a priority level corresponded to these programs.

Then, scheduling control unit 413 performs priority level & mode information retrieval processing (step S122).

More specifically, scheduling control unit 413 refers to priority level & mode information corresponded to a next TS, judges whether one of 0, 1, 2 and 3 is shown as the priority level, and also whether one of INDEX mode and LEVEL mode is shown as the mode.

Furthermore, scheduling control unit 413 performs idle-option-information retrieval processing (step S123).

More specifically, scheduling control unit 413 refers to idle-option information corresponded to a next TS, and judges whether one of "SWITCH" and "MICRO-SLEEP" is shown.

Next, scheduling control unit 413 performs schedule processing (step S124).

More specifically, scheduling control unit 413 specifies four programs corresponded to the next TS obtained by the target-timeslot retrieval processing, and detects a priority level corresponded to each of these programs by target-TS-allocation-program retrieval processing.

Scheduling control unit 413 then chooses a candidate program from these four programs, based on a priority level and a mode obtained as a result of the priority level & mode information retrieval processing.

Furthermore, scheduling control unit 413 refers to program-state information corresponding to each of the candidate programs in LP-state storage register 424, detects whether each of the candidate programs is executable, and chooses an effective candidate program from the candidate programs.

If there is plurality of effective candidate programs, scheduling control unit 413 sets, as the allocation target to the next TS, the effective candidate program to which the highest priority level value is corresponded.

Furthermore, if no effective candidate program exists, scheduling control unit 413 determines the subsequent processing content based on the content of information obtained by performing the idle-option-information retrieval processing.

In other words, when the information content shows "MICRO-SLEEP", scheduling control unit 413 does not set any program as an allocation target to the next TS.

In this case, scheduling control unit 413 has clock mask unit 427 block the supply of a clock pulse to processing execution unit 410, in addition to having processing execution unit 410 perform NOP.

Furthermore, when the information content shows "SWITCH", scheduling control unit 413 sets, as a new next address, a value obtained by adding "1" to the next address (note: if next address=end address, then this value=head address value), and repeatedly performs the schedule processing from steps S120 to S124.

When the above processing is completed, scheduling control unit 413 transfers to step S107, in which request detection unit 419 judges whether an interrupt processing execution has not occurred.

Operations when a target TS is set as a current TS are described in a later section.

Figure 19:
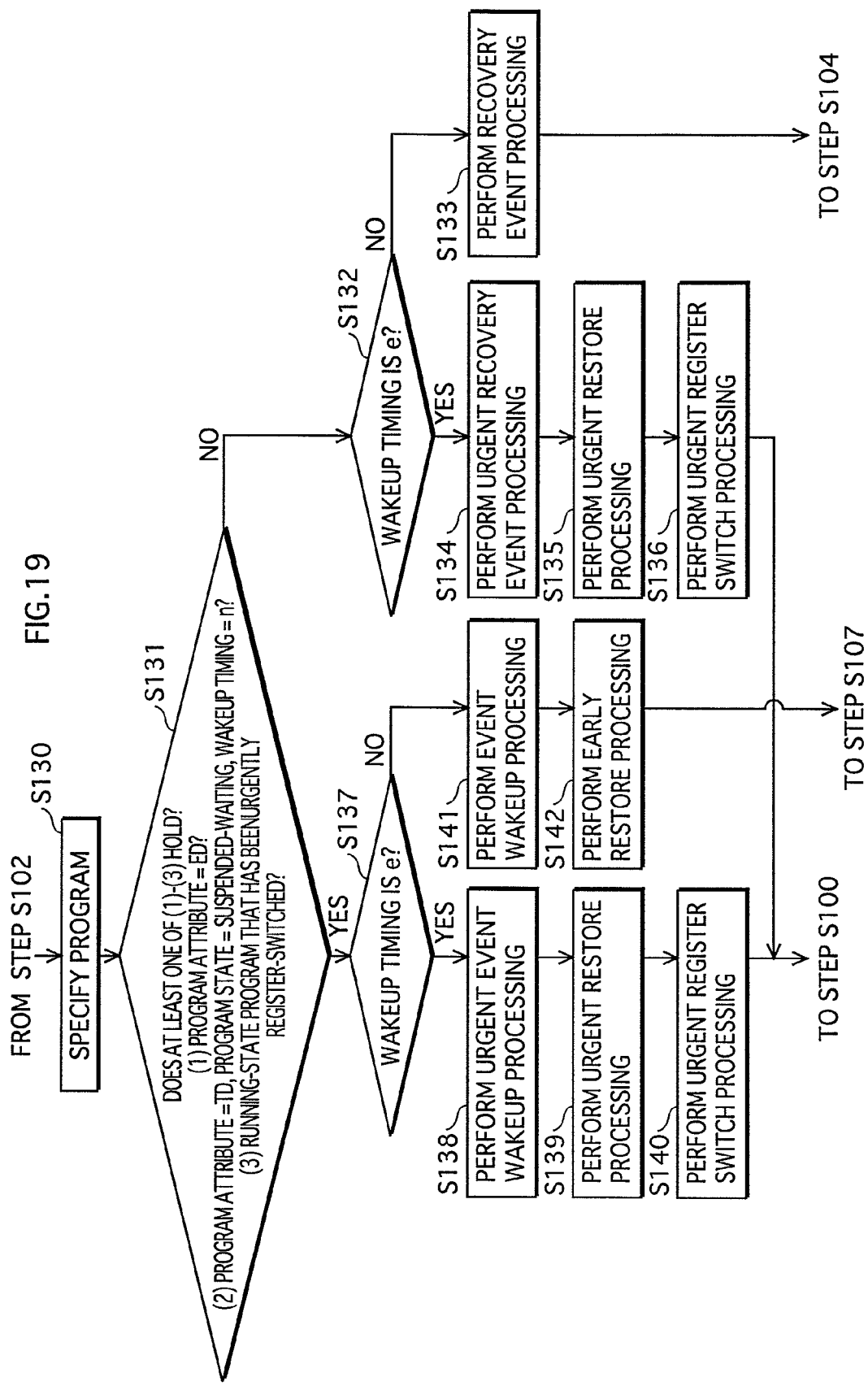
FIG. 19 is a flowchart that shows a content of event-driven scheduling performed by the scheduling control unit.

FIG. 19 is a flowchart that shows a content of the event-driven scheduling performed by scheduling control unit 413.

Scheduling control unit 413 specifies a program by an event P_ID received from request detection unit 419.

Furthermore, when a currently executed program is suspended as a result of urgent register-switching by event driven scheduling, scheduling control unit 413 specifies the program that has been suspended (step S130).

Furthermore, scheduling control unit 413 refers to LP-state storage register 424, and recognizes an attribute, a state, and a wakeup timing of the program.

Scheduling control unit 413 judges in step S131 whether at least one of the following (1) to (3) currently holds:

(1) program attribute is "ED/"?
(2) program attribute is "TD", program state is "suspended-waiting", wakeup timing is "n"?
(3) "running" state program that has been urgently register switched by event-driven scheduling?

If judged in the negative for all of the above (step S131=NO), scheduling control unit 413 refers to LP-state storage register 424, judges whether the program wakeup timing is "e" (step S132), and if not "e" (step S132=NO; i.e. wakeup timing="n"), scheduling control unit 413 performs recovery-event processing.

More specifically, if the state of the program shown in LP-state storage register 424 is "waiting", scheduling control unit 413 changes this state to "ready".

Scheduling control unit 413 then returns to step S105, in which time-driven scheduling is performed.

Furthermore, if judged in step S132 that the wakeup timing is "e" (step S132=YES), scheduling control unit 413 performs the urgent recovery-event processing (step S134), performs the urgent restoring processing (step S135), performs the urgent register-switch processing (step S136), and then returns to step S100.

Furthermore, if judged affirmative for (1) to (3) in step S131 (step S131=YES), scheduling control unit 413 refers to LP-state storage register 424, and judges whether the program wakeup timing is "e" (step S137). If not "e" (step S137=NO; wakeup timing="n"), scheduling control unit 413 performs the event-wakeup processing (step S141), performs the early restore processing (step S142), and returns to step S107.

Furthermore, if judged in step S137 that the wakeup timing is "e" (steps S137=YES), scheduling control unit 413 performs the urgent event-wakeup processing (step S138), performs the urgent restore processing (step S139), performs the urgent register-switch processing (step S140), and returns to step S100.

Figure 20:
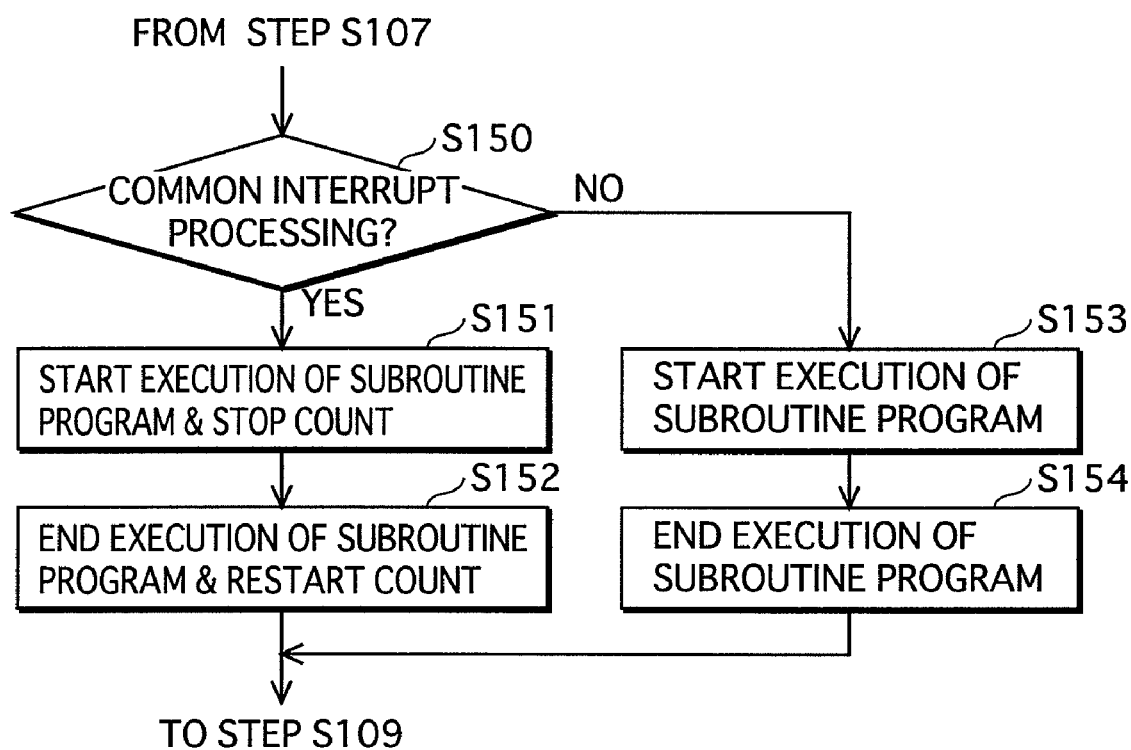
FIG. 20 is a flowchart that shows a content of interrupt processing.

FIG. 20 is a flowchart that shows a content of the interrupt processing performed in step S108.

Scheduling control unit 413 judges, based on a unique P_ID, a unique SP_ID and a common SP_ID received from request detection unit 419, whether a common-interrupt-processing request has occurred (step S150).

If a common-interrupt-processing request has occurred (step S150=YES; i.e. common SP_ID received from request detection unit 419), scheduling control unit 413 suspends the countdown in cycle counter 416 for the duration that a subroutine program specified by the common SP_ID is being executed (step S151~S152).

On the other hand, if a common-interrupt-processing request has not occurred (step S150=NO; i.e. unique P_ID and unique SP_ID received from request detection unit 419), scheduling control unit 413 does not suspend the countdown in cycle counter 416 for the duration that a subroutine program specified by the unique SP_ID is being executed (step S153~S154).

When the above processing is completed, scheduling control unit 413 moves to step S109.

Figure 21:
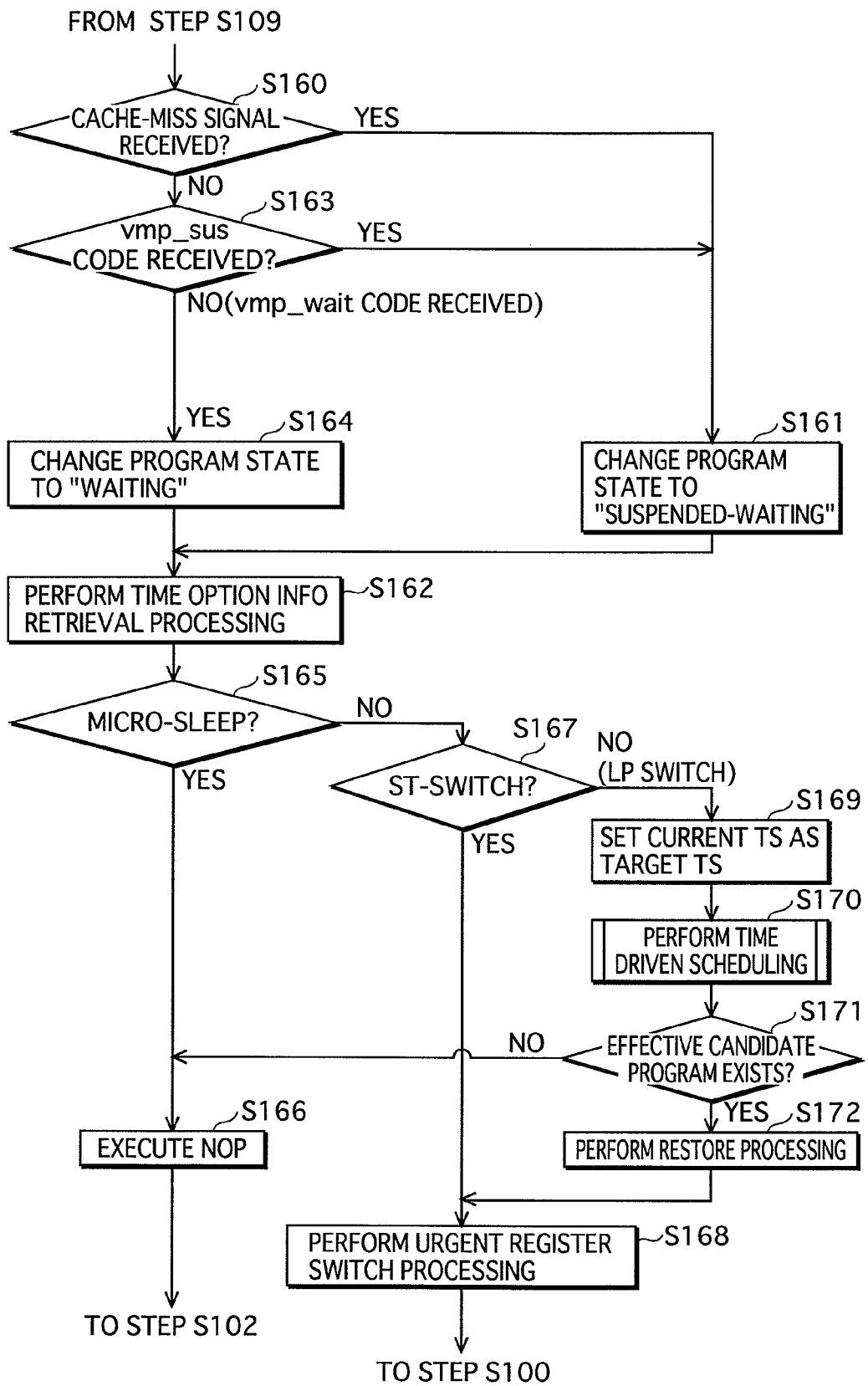
FIG. 21 is a flowchart that shows a relinquish scheduling content.

FIG. 21 is a flowchart that shows a content of the relinquish scheduling performed in step S110.

Scheduling control unit 413 judges whether a cache-miss signal has been received from DMA management unit 418 (step S160), and if a cache-miss signal has been received (step S160=YES), scheduling control unit 413 changes the state of a currently executed program to "suspended-waiting" (step S161), and performs time-option-information retrieval processing (step S162).

On the other hand, if a cache-miss signal has not been received (step S160=NO), scheduling control unit 413 judges whether a "vmp_sus" code has been received (step S163), and if a "vmp_sus" code has been received (step S163=YES), scheduling control unit 413 changes the state of a currently executed program to "suspended-waiting" (step S161), and performs time-option-information retrieval processing (step S162).

However, if judged that a "vmp_sus" code has not been received (step S163=NO; i.e. a "vmp_wait" code has been received), scheduling control unit 413 changes the state of a currently executed program to "waiting" (step S164), and performs the time-option-information retrieval processing (step S162).

Scheduling control unit 413 confirms the time-option information content by executing this time-option-information retrieval processing.

Scheduling control unit 413 then judges whether the time-option information content shows "MICRO-SLEEP" (step S165), and if judged to show shows "MICRO-SLEEP" (step S165=YES), unit 413 instructs processing execution unit 410 via processing control unit 411 to execute NOP (step S166), and returns to step S111.

Furthermore, if the time-option information content is not "MICRO-SLEEP" (step S165=NO), scheduling control unit 413 judges whether the time-option information content is "TS_SWITCH" (step S167), and if judged to be "TS_SWITCH" (step S167=YES), unit 413 performs urgent register-switch processing (step S168), and returns to step S100.

On the other hand, if the time-option information content is not "TS_SWITCH" (step S167=NO; i.e. time-option information content="LP_SWITCH"), scheduling control unit 413 sets a target TS as a current TS (step S169), and performs the time-driven scheduling (step S170).

The time-driven scheduling performed in step S170 and the time-driven scheduling performed in step S105 will now be described with reference to the differences.

There are two differences in the content of the two time-driven scheduling operations.

In the time-driven scheduling performed in step S170, (1) the target address is current TS rather than the next TS, and (2) as a result of performing the schedule processing, the processing moves to NOP execution when an effective candidate program does not exist, irrespective of the idle-option information.

More specifically, as a continuation of the step S169 processing in FIG. 18(B), scheduling control unit 413 performs target-timeslot retrieval processing (step S120).

In other words, scheduling control unit 413 refers to timeslot information stored in the current address in time-allocation-information storage register 402, specifies a current TS based on a TS_ID specifying a timeslot, and obtains a basic cycle value allotted to the timeslot.

Scheduling control unit 413 then performs target-TS-allocation-program retrieval processing (step S121), and priority level & mode information retrieval processing (step S122).

Next, scheduling control unit 413 performs idle-option-information retrieval processing (step S123), and schedule processing (step S124).

More specifically, scheduling control unit 413 specifies four programs corresponded to the current TS obtained by the target-timeslot retrieval processing, and detects a priority level corresponded to each of these programs by target-TS-allocation-program retrieval processing.

Scheduling control unit 413 then chooses candidate programs from these four programs, based on a priority level and a mode obtained as a result of the priority level & mode information retrieval processing.

Furthermore, scheduling control unit 413 refers to program-state information corresponding to each of the candidate programs in LP-state storage register 424, detects whether each of the candidate programs is executable, and chooses an effective candidate program from the candidate programs.

If there is plurality of effective candidate programs, scheduling control unit 413 sets, as the allocation target to the next TS, the effective candidate program to which the highest priority level value is corresponded.

Furthermore, if no effective candidate program exists, scheduling control unit 413 stores the fact that no effective candidate program exists.

The above processing is the time-driven scheduling performed in step S170, in which the target address is sets as the current address.

After executing this time-driven scheduling, scheduling control unit 413 judges whether there is an effective candidate program (step S171).

If there is no effective candidate program (step S171=NO), scheduling control unit 413 instructs processing execution unit 410 via processing control unit 411 to execute NOP (step S166), instructs clock mask unit 427 to block the clock-pulse supply to processing execution unit 410 for the duration of the NOP execution, and returns to step S102.

As a result of this instruction, supply of the clock pulse to processing execution unit 410 is blocked.

On the other hand, when there is an effective candidate program (step S171=YES), scheduling control unit 413 performs the restore processing (step S172), performs the urgent register-switch processing (step S168), and returns to step S100.

4. Program Execution During Processor Drive Time

The following description relates a program execution status when virtual multiprocessor 400 is driven.

4-1. Basic Program Execution

As described above, program execution is performed in virtual multiprocessor 400 based on a plurality of timeslots and programs that are corresponded to the timeslots.

FIGS. 22A and 22B depict these timeslots.

For the sake of convenience, each timeslot is written as "TSn" (n being an integer from 0 to 15), and the n-value is unique for each timeslot.

In the setting, sixteen timeslots are provided, and four of these timeslots (TS0~TS3) are time-driven timeslots that are used in normal scheduling.

In other words, programs allotted to each of timeslots TS0 to TS3 are executed sequentially, and when execution of a program allotted to TS3 is completed, the programs are again executed from a program allotted to TS0.

TS0 to TS2 are timeslots used for program execution premised on realtime processing that targets image, audio, and the like.

TS3 (TS_ID=3) is a timeslot used for program execution that is not premised on realtime processing.

The other timeslots (TS4~TS15) are event-driven timeslots that are woken up when an event occurs.

As shown in FIG. 22A, each timeslot has corresponded a basic cycle value, and a time period equating to this basic cycle value forms a program execution timeframe of each timeslot.

As shown in FIG. 22B, it is not generally possible to exactly match the switch timing with the basic cycle of a timeslot, and the switching normally occurs a few cycles over the basic cycle.

By performing the basic-cycle-adjustment processing in virtual multiprocessor 400, the time period by which the execution timeframes are exceeded in TS0 to TS3 is subtracted from the execution timeframe of TS3, and thus the execution periods can be orderly maintained.

Furthermore, when a program execution period allotted to a program scheduled for execution is relinquished in virtual multiprocessor 400, two types of information (i.e. time-option information and idle-option information) are available to determine a content of measures to be adopted in effecting efficient program execution or power reductions.

4-2. Program Execution: Based on Time-Option Information when Relinquishing Occurs As described above, time-option information is information relating to timeslots, and is for determining a program execution content subsequent to the execution period of a currently executed program being relinquished due to the program becoming unexecutable.

FIGS. 23A to 23D depict a program execution state based on time-option information when a program execution period is relinquished (i.e. program execution state that results from time-option-information retrieval processing).

For the sake of convenience, each program is written as "LPm" (m being an integer from 0 to 31), and the m-value is unique for each program.

As shown in FIG. 23A, when there are efficient candidate programs in time-driven scheduling timeslots TS0 to TS3, the programs are executed sequentially within the execution timeframe of each of the programs.

Here, LP0, LP1, LP2 and LP3 are allotted to TS0, TS1, TS2 and TS3, respectively.

As shown in FIG. 23B, when the relinquishing of the program execution period is triggered by a "vmp_wait" code outputted by processing execution unit 410 during the execution of LP1 in the execution timeframe of TS1, and also when the time-option information of TS1 shows "LP_SWITCH", the following program execution is conducted as a result of the above processing being executed in various functional units.

LP4 is executed instead of LP1 until the execution timeframe of TS1 is used up, LP4 here being an effective candidate program that is corresponded to the same TS1, is in an executable state, and has the highest priority level of the candidate programs.

At this time, register values of a context corresponding to LP2 and stored in a standby register group are at once discarded, and register values of a context corresponding to LP4 are stored in the standby register group.

A time period until t2 is required to conduct the discarding, the restoring of LP4, and start the executing of LP4.

Normally, this time period t2 is equivalent to approximately thirty cycles of pulse output by cycle counter 416.

When there are no effective candidate programs in TS1, it is not possible to conduct program execution in this timeslot, and in this case, scheduling control unit 413 performs controls to have program execution conducted that is similar to when the timeslot information of TS1 (described below) shows "MICRO-SLEEP".

Here, a timeslot such as TS1, that falls outside the execution target range because of there being no effective candidate program, is referred to as a "sleeping timeslot".

The following program execution is conducted when a program execution period is relinquished and the time-option information shows "TS_SWITCH".

As shown in FIG. 23C, the register switching is conducted quickly, and LP2, which is allotted to TS2, is moved up and executed.

LP2 was already stored in the standby register group at this time, and thus it is possible to execute LP2 quickly.

Furthermore, as shown in FIG. 23D, when a program execution period is relinquished, and the time-option information of TS1 shows "MICRO-SLEEP", meaningless program execution (i.e. NOP execution) that has no connection with the program originally executed is conducted until the execution timeframe of TS1 is used up.

Here, the clock output to processing execution unit 410 is blocked for the duration of the NOP execution, and as a result, drive power is reduced.

4-3. Program Execution: Based on Idle-Option Information when Relinquishing Occurs As described above, idle-option information relates to timeslots, and is for determining a program execution content when there exist no effective candidate programs in a given timeslot.

FIGS. 24A to 24C depict a program execution status based on idle-option information there are no effective candidate programs in a time-driven timeslot.

FIG. 24A shows a program execution status when there is at least one effective candidate program in each time-driven timeslot.

The following description is premised on the above situation, and relates to program execution when there are no effective candidate programs in TS1.

As shown in FIG. 24B, when there exist no effective candidate programs in TS1, and when the idle-option information of TS1 shows "SWITCH", LP2, which is allotted to TS2 instead of TS1, is executed.

As shown in FIG. 24C, furthermore, when there exist no effective candidate programs in TS1, and when the idle-option information of TS1 shows "MICRO-SLEEP", NOP execution is conducted until the execution timeframe of TS1 is used up.

Here, the clock pulse output to processing execution unit 410 (i.e. the CPU) is blocked for the duration of the NOP execution, and as a result, drive power is reduced.

4-4. Program Execution: Wait-State Cancellation

A currently executed program changes to an unexecutable suspended-state ("suspended-waiting") that is triggered by the output of a "vmp_sus" code.

Furthermore, a currently executed program changes to an executable suspended-state ("suspended-ready") when suspended by another program as a result of urgent register switching.

A timeslot allocated to such a programs during execution is referred to as a "suspended timeslot", and as described above, a P_ID of the program is stored so as to be related to a TS_ID.

A program in the above unexecutable suspended-state becomes an effective candidate program when the waiting-state of the program is cancelled. A program suspended by another program becomes an effective candidate program when the program changes to an executable suspended-state. The following description relates to a temporarily suspended program becoming an effective candidate program, and an execution of a suspended timeslot being restarted from an intermediate position.

FIGS. 25A and 25B depict program execution in this situation.

FIG. 25A shows a program execution status when TS3 of the four timeslots TS0 to TS3 is already a suspended timeslot, and when TS0 become a new suspended timeslot after LP0 allocated to TS0 ceases to be effective, this being triggered by a "vmp_sus" code outputted from processing execution unit 410.

At this time, in TS0, a time period t3 equating to a set execution timeframe remains unused.

When a "vmp_sus" code is received, scheduling control unit 413 updates the program state of LP0 to "suspended-waiting" and retains a time period t4, which remains unused in the execution timeframe, in the context as an actual count value.

Then, as shown in FIG. 25A, only TS1 and TS2 are repeatedly targeted for execution.

FIG. 25B shows a program execution status when the wait-state of LP0 allotted to the suspended timeslot TS0 is cancelled (i.e. cancellation of an unexecutable suspended-state "suspended-waiting"), and when the wakeup timing of LP0 in LP-state storage register 424 shows "n" (i.e. to be woken up normally).

In this case, as shown in FIG. 25B, when the waiting is cancelled (i.e. cancellation of an unexecutable suspended-state occurs), scheduling control unit 413 updates the program state of LP0 to "suspended-ready", but waits for a zero-count signal without immediately executing LP0, and then executes LP0 at a timing that does not cause the suspension of program execution in other TS.

In this way, register values already stored in the standby register group are used when the cancellation of an unexecutable suspended-state occurs, and the storage is not wasted.

At this time, scheduling control unit 413 has LP0 executed for only the time period t4 of the actual count value retained in the context.

In the above case, the execution of LP0 is performed by event-driven scheduling.

Following this, LP0 allotted to TS0, which becomes the execution target as a result of normal time-driven scheduling, is executed for only time period t3.

The following description relates to a program execution status when waiting is cancelled (i.e. cancellation of an unexecutable suspended-state) in the case that the wakeup timing of LP0 in LP-state storage register 424 shows "e" in the above case.

4-5. Program Execution: Urgent Restore Event

Similar to FIG. 25A, FIG. 26A shows a program execution status when TS3 of the four timeslots TS0 to TS3 is already a suspended timeslot, and when TS0 is a new suspended timeslot after LP4 allocated to TS0 has ceased to be effective, this being triggered by a "vmp_sus" code outputted from processing execution unit 410.

At this time, in TS0, all of a set execution timeframe t5 has not been used.

Again, similar to FIG. 25A, when a "vmp_sus" code is received, scheduling control unit 413 updates the program state of LP0 to "suspended-waiting" and retains a time period t6, which remains unused in the execution timeframe, in the context as an actual count value.

FIG. 26B shows a program execution status when the wait-state of LP0 allotted to the sleeping timeslot TS0 is cancelled (i.e. cancellation of unexecutable suspended-state occurs), and when the wakeup timing of LP0 in LP-state storage register 424 shows "e" (i.e. to be woken up urgently).

In this case, as shown in FIG. 26B, when the waiting is cancelled (i.e. when an unexecutable suspended-state is cancelled), scheduling control unit 413 updates the program state of LP0 to "suspended-ready", and has LP0 executed immediately.

Here, "immediately" refers to program execution in the overhead (t2) required for the restoring, register switching, and the like.

More specifically, at the point in time that the waiting is cancelled (i.e. the unexecutable suspended-state is cancelled), scheduling control unit 413 discards register values already stored in a standby register group, performs urgent restore processing to store register values of a context corresponding to LP0 into the standby register group, performs urgent register-switch processing, and immediately has LP0 executed in the t6 time period, in addition to updating the program state of LP1 to "suspended-ready", and retaining a time period t7, which remains unused in the execution timeframe of TS1, in the context of LP1 as an actual count value.

In a register group that becomes the standby register group as a result of the register-switch processing being executed, there exist register values of a context corresponding to LP1 that had been executed up until then. However, scheduling control unit 413 saves these register values, executes restore processing following the execution of LP1, performs register-switch processing after the completion of the LP0 execution, and immediately has LP1 executed in the t7 time period.

Here, the execution of LP1 is also conducted by event-driven scheduling. More specifically, program execution is restarted by event-wakeup processing (wakeup timing="n").

4-6. Program Execution: Event-Processing

As shown in FIG. 27A, when an event-processing request does not occur, TS0, TS1, TS2 and TS3 sequentially become the execution target, and LP0, LP1, LP2 and LP3 are sequentially executed.

FIG. 27B shows a program execution status when an event-processing request occurs to execute LP4 in TS4, which is a timeslot for events, and when a wakeup timing of LP4 in LP-state storage register 424 shows "n" (i.e. to be woken up normally).

In this case, as shown in FIG. 27B, when an event-processing request occurs, scheduling control unit 413 updates the program state of LP4 from "waiting" to "ready", but waits, without executing LP4 immediately, for a register group, which was the current register group when the event-processing request occurred, to become a standby register group, and for this register group to be released, and when this happens, scheduling control unit 413 stores register values of a context corresponding to LP4 in this register group, and has LP4 executed when this register group becomes the current register group.

As a result, register values already stored in a standby register group are used at the time that an event-processing request occurs, and the storage is not wasted.

FIG. 27C shows a program execution status when an event-processing request occurs to execute LP4 in TS4, which is a timeslot for events, and also when a wakeup timing of LP4 in LP-state storage register 424 shows "e" (i.e. to be woken up urgently).

In this case, as shown in FIG. 27C, when an event-processing request occurs, scheduling control unit 413 updates the program state of LP4 to "ready", and has LP4 executed immediately during t2.

More specifically, at the time that an event-processing request occurs, scheduling control unit 413 discards register values already stored in a standby register group, stores register values of a context corresponding to LP4 in the standby register group, executes urgent register-switch processing, and immediately has LP4 executed, in addition to updating the program state of LP1 to "suspended-ready", and retaining a time period (i.e. an actual count value), which remains unused in the execution timeframe of TS1, in the context of LP1.

In a register group that becomes the standby register group as a result of the register-switch processing being executed, there exist register values of a context corresponding to LP1 that had been executed up until then. Scheduling control unit 413 temporarily saves these register values, restores these register values to the standby register group, immediately performs register-switch processing after the execution of LP4 is completed, and has LP1 executed in the above time period that remained unused.

Here, the execution of LP1 is also conducted by event-driven scheduling. More specifically, execution is restated by event-wakeup processing (wakeup timing="n").

4-7. Program Execution: Common-Interrupt-Processing

FIGS. 28A and 28B depict a program execution status when a common-interrupt-processing request occurs.

As shown in FIG. 28A, when a common-interrupt processing request does not occur, the four timeslots from TS0 to TS3 sequentially become the execution target timeslot, and LP0, LP1, LP2 and LP3 are sequentially executed.

As shown in FIG. 28B, when a common-interrupt processing request occurs during the execution of LP2 in TS2, scheduling control unit 413 jumps to a common-interrupt-processing dedicated subroutine program during the execution of LP2, and executes common-interrupt processing. When the common-interrupt processing has been completed, scheduling control unit 413 returns to LP2 and restarts the program execution.

At this time, scheduling control unit 413 does not include the program execution period of the subroutine in the program execution period of the interrupted LP2.

More specifically, scheduling control unit 413 stops the countdown in cycle counter 416 for the duration of common-interrupt processing in the subroutine.

As a result, a time period, which is obtained by adding time period t10, in which the program was executed in the subroutine, to execution timeframe t9 of TS2, becomes the execution period of LP2.

Here, the execution period of the common-interrupt processing is not included in the original execution period of the interrupted LP2 in order to avoid any unfair reduction in the execution period of only the program allotted to a timeslot that happens to be interrupted, despite the common-interrupt processing being required by all of the programs.

4-8. Program Execution: Unique-Interrupt Processing

FIGS. 29A to 28C show the execution of programs relating to a unique-interrupt processing request.

As shown in FIG. 29A, when a unique-interrupt processing request does not occur, the four timeslots TS0 to TS3 are sequentially selected as the execution target timeslot, and the four programs LP0 to LP3, allotted respectively to these timeslots, are sequentially executed.

As shown in FIG. 29B, in the case that a unique-interrupt processing request corresponding to LP3 occurs during the execution of LP2 in TS2, scheduling control unit 413 jumps to and executes a subroutine dedicated to the requested unique-interrupt processing when LP3 is next executed, and returns to and executes LP3 when this processing is completed.

In this case, scheduling control unit 413 includes the execution period of the subroutine in the execution period of the interrupted LP3.

That is, scheduling control unit 413 does not stop the countdown in cycle counter 416 while the unique-interrupt processing is being executed.

Here, LP3 is the only program that requires this unique-interrupt processing, and thus the execution period of the unique-interrupt processing is included in the execution period of the interrupted LP3 in order to avoid any unfair reduction in the execution period of programs that do not require this processing.

Furthermore, as shown in FIG. 29C, in the case that a unique-interrupt processing request corresponding to LP3 occurs during the execution of LP3 in TS3, scheduling control unit 413 immediately jumps to and executes the subroutine dedicated to the requested unique-interrupt processing, and returns to and executes LP3 when this processing is completed.

In this case, scheduling control unit 413 again includes the execution period of the unique-interrupt processing in the execution period of the interrupted LP3 for the reasons given above.

Tasks can be executed efficiently according to the second embodiment as described above, because the saving, judging and restoring of contexts is performed in parallel with the program execution, and thus the time required for the saving, judging and restoring does not intervene in the execution period of the programs, even when a plurality of programs are executed in a pseudo-parallel manner by a single virtual multiprocessor 400.

More than one program is provided per timeslot, and so even if one of the programs becomes unexecutable, another of the programs can be executed instead, and the execution period of programs can thus be used effectively.

Furthermore, power consumption can be reduced when a program becomes unexecutable, by having processing execution unit 410 execute NOP during the execution period of the unexecutable program in order to stop the driving.

Although, in the second embodiment, scheduling control unit 413 is described as including the time period required to execute a subroutine for unique-interrupt processing in the execution period of an interrupted program, the invention is not limited to this structure and may be structured as shown in FIG. 30A to 30C.

As shown in FIG. 30A, when a unique-interrupt processing request does not occur, the four timeslots TS0 to TS3 are sequentially selected as the execution target timeslot, and the four programs LP0 to LP3, allotted respectively to these timeslots, are sequentially executed.

Here, a single cycle of program execution is completed when LP0 to LP3 have each been executed once.

As shown in FIG. 30B, when a unique-interrupt processing request corresponding to LP2 occurs during the $k^{th}$ execution of LP2, scheduling control unit 413 does not, at this time, includes an execution period t13 of the subroutine dedicated to the requested unique-interrupt processing in the execution period of the interrupted program (LP2).

In other words, scheduling control unit 413 stops the countdown in cycle counter 416 for the execution period t13 of the subroutine.

Then, as shown in FIG. 30C, in the $k+1^{th}$ cycle of program execution, scheduling control unit 413 has LP2 executed for a time period obtained by subtracting the execution period t13 from an execution timeframe t12 of TS2.

More specifically, scheduling control unit 413 outputs a value equivalent to a time period obtained by subtracting t12 from t13 to cycle counter 416, instead of the basic cycle value (t12) of TS2.

In the $k+2^{th}$ cycle, LP2 is executed normally, as shown in FIG. 30A.

Figure 31:
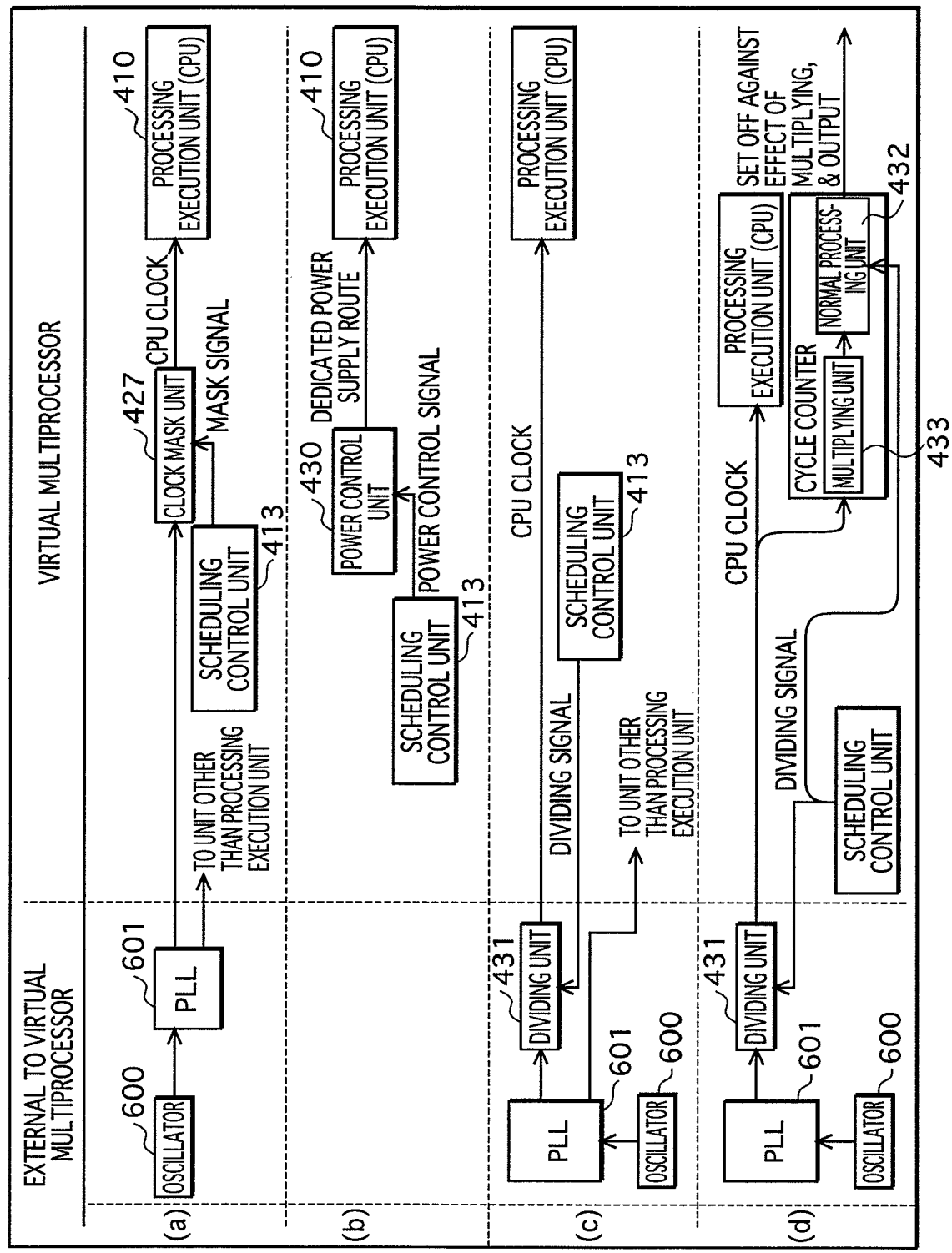
FIG. 31A shows a structure of functional units for reducing power consumption according to the second embodiment.
FIG. 31B shows a further exemplary structure of functional units for reducing power consumption by a method other than that of the second embodiment.
FIG. 31C shows a further exemplary structure of functional units for reducing power consumption by a method other than that of the second embodiment.
FIG. 31D shows a further exemplary structure of functional units for reducing power consumption by a method other than that of the second embodiment.
Figure 32:
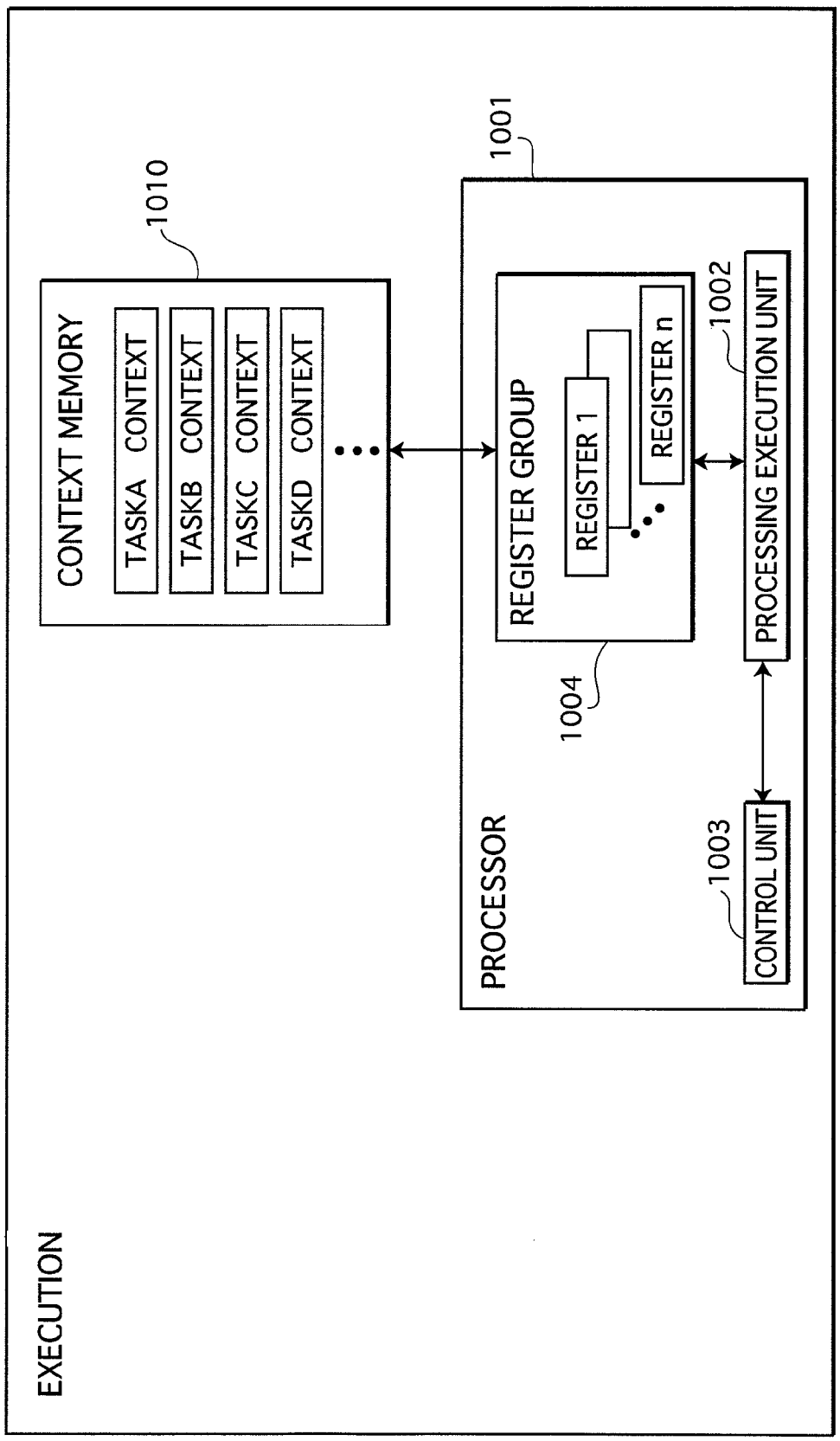
FIG. 32 is a functional block diagram of a conventional processor.
Figure 33:
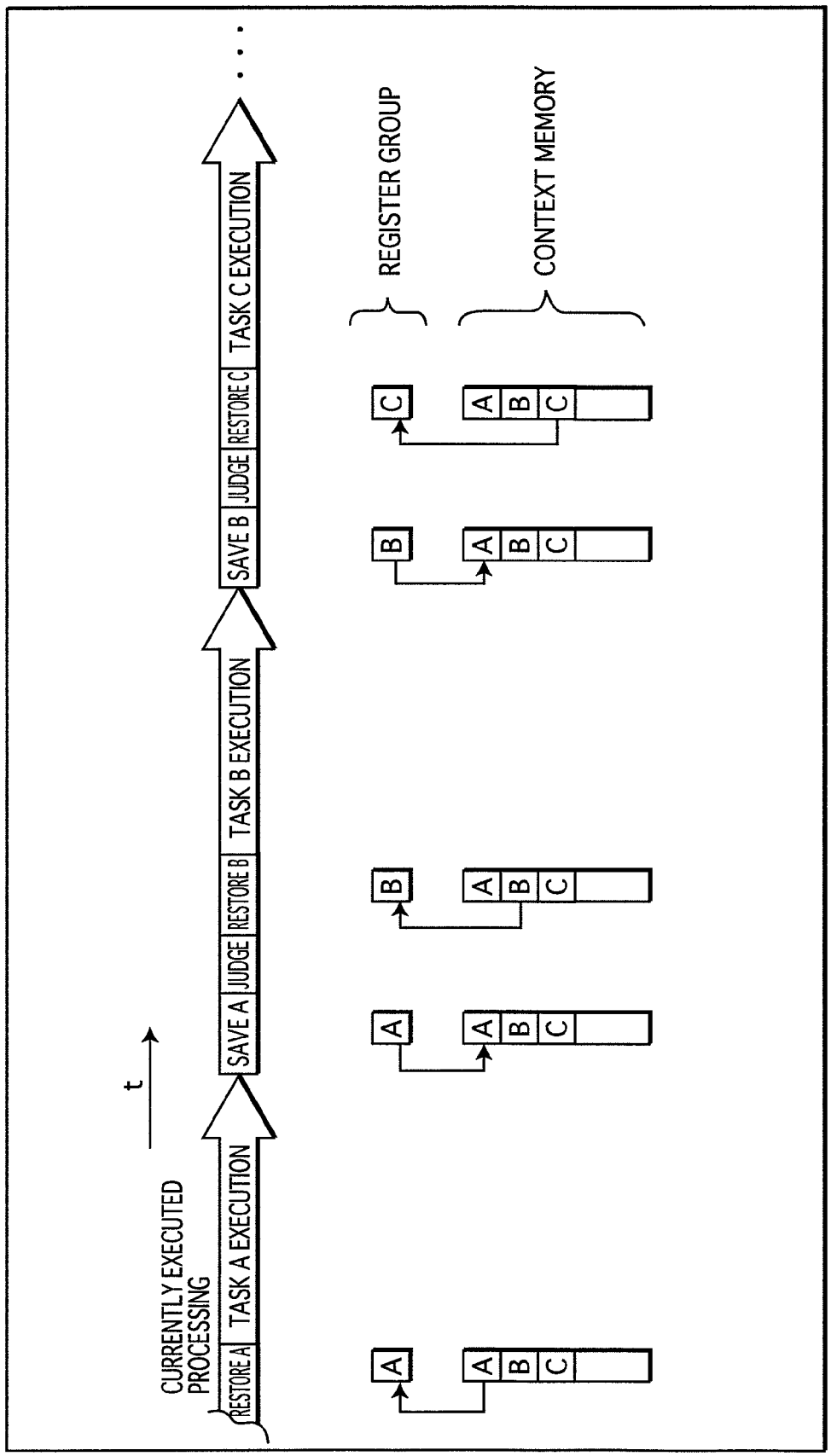
FIG. 33 shows the execution of tasks in the conventional processor, and the input/output of contexts between a register group and a context memory.

Although, according to the second embodiment as shown in FIG. 31A, the power consumption of processing execution unit 410 is reduced by clock mask unit 427 blocking a signal route of a clock pulse to processing execution unit 410 for the duration that clock mask unit 427 receives a mask signal from scheduling control unit 413, the invention is not limited to this structure and may be structured as follows.

As shown in FIG. 31B, the power consumption of processing execution unit 410 may be set to "0", by disposing a power control unit 430 on a power supply route to processing execution unit 410, and having power control unit 430 block this power supply route for the duration that power control unit 430 receives a power control signal (i.e. instead of the mask signal) from scheduling control unit 413.

Also, as shown in FIG. 31C, the drive frequency of processing execution unit 410 may be lowered and power consumption reduced, by disposing a dividing unit 431 formed from a divider and the like on a signal route of a clock pulse between an oscillator 600 and processing execution unit 410, and having dividing unit 431 divide a frequency of this clock pulse by a factor of 4, for example, for the duration that dividing unit 431 receives a dividing signal (i.e. instead of the mask signal) from scheduling control unit 413.

Furthermore, as shown in FIG. 31D, the drive frequency of processing execution unit 410 may be lowered and power consumption reduced, by disposing dividing unit 431 on a signal route of a clock pulse between oscillator 600 and virtual multiprocessor 400, and having dividing unit 431 divide the frequency of this clock pulse by a factor of 4, for example, for a duration that dividing unit 431 receives a dividing signal (i.e. instead of the mask signal) from scheduling control unit 413.

In this case, cycle counter 416 may, in addition to a normal processing unit 432, have a multiplying unit 433 formed from a multiplier and the like, and the influence of the dividing by dividing unit 431 may be set-off by having cycle counter 416 multiply the frequency of the clock pulse by a factor of 4, for example, and conduct the countdown.

Here, the factor by which the frequency of the clock pulse is divided/multiplied is, of course, not limited to "4".

According to the second embodiment, when an output frequency (number of outputs is stored for a predetermined period dating back from the present time) of an event P_ID exceeds a predetermined threshold value, request detection unit 419 delays the outputting of the event P_ID until the output frequency is less than or equal to the threshold value. However, request detection unit 419 may stop the output of the event P_ID (i.e. ignore the event-processing request) when the output frequency exceeds the threshold value.

Also, according to the second embodiment, scheduling control unit 413 instructs DMA management unit 418 to write data required for executing a program that corresponds to a context stored in a standby register group into a cache-memory, although alternatively, scheduling control unit 413 may instruct garbage collection to be executed by a functional unit for executing garbage collection.

In the second embodiment, there is a section that relates to which program to execute first when two or more programs change from "ready" to "suspended-ready" at a given time; that is, when a plurality of programs exist within the candidate range of event-driven scheduling (i.e. within the target range of the scheduling). In this case, the programs may be executed based on priority levels assigned to the programs, starting from the program having the highest priority level.

For example, if an inverse relationship exists between priority levels and program ID values, the program within the scheduling target range that has the smallest ID value will be targeted for execution first.

Furthermore, although the description in the second embodiment is based on the premise that the number of programs (LP) is greater than the number of register groups, the present invention is not limited to this structure, and thus the number of programs may be less than or equal to the number of register groups.

In this case, a context memory need not be provided, and restoring and saving steps are not required.

When there are two programs, LP0 is corresponded to a first register group, and LP1 is corresponded to a second register group.

For example, when LP0 is to be executed, the scheduling control unit 413 selects the first register group as the current register group, without performing operations to restore a register value group from the context memory.

Even if there are three programs and three register groups, the register group selected as the current register group is the execution target register group, and the other register groups are standby register groups.

Here, LP2 is corresponded to a third register group.

When LP2 is to be executed, the third register group is selected as the current register group.

Even after the selection target has been switched, it is not necessary to perform operations to save a register value group to the context memory.

Furthermore, in the second embodiment, context memory 500 is constituted by SRAM, but may be DRAM. Moreover, context memory 500 is not limited to these types of memory, and may be a register that allows for quick access, an external storage apparatus that allows for quick access, or the like.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A processor for sequentially executing a plurality of programs using a plurality of register value groups stored in a memory that correspond one-to-one with the plurality of programs, the plurality of programs stored in a computer readable storage media, the processor comprising:

a plurality groups;

a select/switch unit selecting one of the plurality of register groups as an execution target register group on which a program execution is based, and to switch the selection target every time a first predetermined period elapses;

a restoring unit restoring, every time the switching is performed, one of the plurality of register value groups into one of the plurality of register groups that is not selected as the execution target register group;

a saving unit saving, prior to the restoring, register values in one of the plurality of register groups targeted for restoring, by overwriting a register value group in the memory that corresponds to the register values;

a program execution unit executing, every time the switching is performed, a program corresponding to a register value group in the execution target register group, wherein the first predetermined period is specified, based on table information in which a plurality of count values are arranged in an order, every time the selection is performed, using the count values in the order, the program execution unit starts the executing when the select/switch unit performs a switch operation, a first obtaining unit obtaining sequence information that shows a sequence of the register value groups corresponding to the programs, wherein the restoring unit determines, based on the sequence information, the one of the plurality of register value groups to be restored, and performs the restoring;

a first detecting unit operable to detect an occurrence of a suspend-cause that results in the program execution being suspended;

a second detecting unit operable to detect a cancellation of the suspend-cause, wherein when the occurrence of a suspend-cause relating to a program for execution is detected, the program execution unit relinquishes, until the suspend-cause is cancelled, an execution period to be allotted for execution of the program, there is a plurality of the suspend-causes, and the suspend-cause effective as a trigger of the relinquishing is unique for each program, and the program execution unit only performs the relinquishing when an effective suspend-cause of a currently executed program occurs;

a second obtaining unit obtaining suspend information that corresponds (i) information specifying one of the plurality of suspend-causes with (ii) information showing whether the specified suspend-cause has occurred, wherein the register value groups each include setting information that corresponds (i) information specifying one of the plurality of suspend-causes with (ii) information showing whether the specified suspend-cause is effective, and the program execution unit refers comparatively to the suspend information and the setting information, and judges whether to perform the relinquishing.

2. The processor of claim 1, wherein
the suspend information is bit string data in which a unique bit position is determined for each suspend-cause, and in which each bit position has a value that shows whether a suspend-cause corresponding to the bit position has occurred,
the setting information is bit string data in which a unique bit position is determined for each suspend-cause, and in which each bit position has a value that shows whether a suspend-cause corresponding to the bit position is effective, and
the program execution unit only refers to a bit position of a suspend-cause in the suspend information that corresponds to a bit position in the setting information that has a value showing the suspend-cause to be effective.

3. A processor for sequentially executing a plurality of programs using a plurality of register value groups stored in a memory that correspond one-to-one with the plurality of programs, the plurality of programs stored in a computer readable storage media, the processor comprising:
a plurality of register groups;
a select/switch unit selecting one of the plurality of register groups as an execution target register group on which a program execution is based, and to switch the selection target every time a first predetermined period elapses;
a restoring unit restoring, every time the switching is performed, one of the plurality of register value groups into one of the plurality of register groups that is not selected as the execution target register group;
a saving unit saving, prior to the restoring, register values in the one of the plurality of register groups targeted for restoring, by overwriting a register value group in the memory that corresponds to the register values;
a program execution unit executing, every time the switching is performed, a program corresponding to a register value group in the execution target register group, wherein the first predetermined period is specified, based on table information in which a plurality of count values are arranged in an order, every time the selection is performed, using the count values in the order,
the program execution unit starts the executing when the select/switch unit performs a switch operation,
a first obtaining unit obtaining sequence information that shows a sequence of the register value groups corresponding to the programs, wherein
the restoring unit determines, based on the sequence information, a register value group to be restored, and performs the restoring;
a first detecting unit operable to detect an occurrence of a suspend-cause that results in the program execution being suspended; and
a second detecting unit operable to detect a cancellation of the suspend-cause, wherein
when the occurrence of a suspend-cause relating to a program for execution is detected, the program execution unit relinquishes, until the suspend-cause is cancelled, an execution period to be allotted for execution of the program, the execution period having been determined based on the first predetermined period, and
when the relinquishing is performed, the program execution unit stops the execution of the program.

4. The processor of claim 3, wherein
there is a plurality of the suspend-causes,
the suspend-cause effective as a trigger of the relinquishing is unique for each program, and
the program execution unit only performs the relinquishing when an effective suspend-cause of a currently executed program occurs.

5. The processor of claim 3, wherein
the program execution unit notifies the restoring unit at a time of performing the relinquishing, and
the restoring unit performs the restoring while ignoring an order in the sequence of a register value group corresponding to the program that has been targeted for the relinquishing, by not targeting the register value group for restoring until the suspend-cause is cancelled.

6. The processor of claim 5, wherein
when notified of the relinquishing, the restoring unit sets the ignored register value group as a priority restore target candidate in a second performing of the restoring by the restoring unit after the notification,
if the suspend-cause is cancelled before the start of the second performing of the restoring, the restoring unit determines the ignored register value group as the restore target, and
if the suspend-cause is not cancelled before the start of the second performing of the restoring, the restoring unit continues to ignore the register value group until the suspend-cause is cancelled.

7. The processor of claim 5, wherein
when a plurality of register value groups are ignored by the restoring unit, and the suspend-cause is cancelled with respect to two or more of the plurality of register value groups, the restoring unit sets, as the restore target when the restoring is next performed, whichever of the two or more register value groups was ignored later.

8. The processor of claim 3, wherein the program execution unit notifies the select/switch unit at a time of performing the relinquishing, and the select/switch unit performs the switching when the notification is received.

9. The processor of claim 3, wherein the suspend-cause is a cache-miss occurring at a time of a program execution.

10. The processor of claim 3, wherein the suspend-cause is a state of waiting for a processing result from an external apparatus that was requested to perform processing at a time of a program execution.

11. The processor of claim 3, wherein the suspend-cause is a state of waiting for a release of a shared resource, when the shared resource is required at a time of a program execution.

12. The processor of claim 3, wherein the program execution unit has a CPU for use in program execution, and stops the CPU during an execution period of the relinquishing.

13. The processor of claim 3, wherein the program execution unit has a CPU for use in program execution, and reduces a drive frequency of the CPU during an execution period of the relinquishing.

14. A processor for sequentially executing a plurality of programs using a plurality of register value groups stored in a memory that correspond one-to-one with the plurality of programs, the plurality of programs stored in a computer readable storage media, the processor comprising:
a plurality groups;
a select/switch unit selecting one of the plurality of register groups as an execution target register group on which a program execution is based, and to switch the selection target every time a first predetermined period elapses;
a restoring unit restoring, every time the switching is performed, one of the plurality of register value groups into one of the plurality of register groups that is not selected as the execution target register group;
a saving unit saving, prior to the restoring, register values in the one of the plurality of register groups targeted for restoring, by overwriting a register value group in the memory that corresponds to the register values;

a program execution unit executing, every time the switching is performed, a program corresponding to a register value group in the execution target register group, wherein the first predetermined period is specified, based on table information in which a plurality of count values are arranged in an order, every time the selection is performed, using the plurality of count values in the order, the program execution unit starts the executing when the select/switch unit performs a switch operation, a first obtaining unit obtaining sequence information that shows a sequence of the register value groups corresponding to the programs, wherein the restoring unit determines, based on the sequence information, a register value group to be restored, and performs the restoring;

a first detecting unit operable to detect an occurrence of a suspend-cause that results in the program execution being suspended; and a second detecting unit operable to detect a cancellation of the suspend-cause, wherein when the occurrence of a suspend-cause relating to a program for execution is detected, the program execution unit relinquishes, until the suspend-cause is cancelled, an execution period to be allotted for execution of the program, the program execution unit has a CPU for use in program execution, and adjusts the drive frequency of the CPU in accordance with a program execution load when the plurality of programs are executed, such that a free processing time period does not occur due to a processing capacity of the CPU being too high with respect to the program execution load.

* * * * *